United States Patent
Sakoda

(10) Patent No.: US 10,660,087 B2
(45) Date of Patent: *May 19, 2020

(54) RADIO COMMUNICATION SYSTEM, RADIO COMMUNICATION APPARATUS, RADIO COMMUNICATION METHOD, AND COMPUTER PROGRAM

(71) Applicant: SONY CORPORATION, Tokyo (JP)

(72) Inventor: Kazuyuki Sakoda, Chiba (JP)

(73) Assignee: SONY CORPORATION, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 14/864,475

(22) Filed: Sep. 24, 2015

(65) Prior Publication Data

US 2016/0088619 A1    Mar. 24, 2016

Related U.S. Application Data

(63) Continuation of application No. 13/756,639, filed on Feb. 1, 2013, now Pat. No. 9,185,698, which is a
(Continued)

(30) Foreign Application Priority Data

Oct. 24, 2003   (JP) .................................. 2003-364230
Jun. 24, 2004   (JP) .................................. 2004-187106

(51) Int. Cl.
*H04W 48/08*     (2009.01)
*H04W 72/04*     (2009.01)
(Continued)

(52) U.S. Cl.
CPC ....... *H04W 72/0446* (2013.01); *H04W 48/08* (2013.01); *H04W 74/0816* (2013.01); *H04W 16/14* (2013.01); *H04W 72/1242* (2013.01)

(58) Field of Classification Search
CPC .. H04W 72/0446; H04W 84/12; H04W 84/18
See application file for complete search history.

(56) References Cited

U.S. PATENT DOCUMENTS 5,577,168 A   11/1996  Haas et al.
5,940,764 A   8/1999   Mikami
(Continued)

FOREIGN PATENT DOCUMENTS

EP    0 859 490 A2    8/1998
EP    1 061 694 A2    12/2000
(Continued)

OTHER PUBLICATIONS

Armin Heindl, et al., "The Impact of Backoff, EIFS, and Beacons on the Performance of IEEE 802.11 Wireless LANs", Computer Performace and Dependability Sympsium, XP010378556, Mar. 2000, pp. 103-112.

(Continued)

*Primary Examiner* — Hassan A Phillips
*Assistant Examiner* — Prenell P Jones
(74) *Attorney, Agent, or Firm* — Xsensus LLP

(57) ABSTRACT

An autonomously dispersed type wireless network is suitably formed with communication stations avoiding collision of beacons transmitted one to another. In the event that the range of reach of airwaves change and a receivable state is created and beacons collide, a communication station changes the beacon transmission position of itself in response to receiving a beacon from another station at a timing immediately prior to transmission to its own beacon. Also, in the event that beacon collision is exposed due to emergence of a new communication which can perform reception from two systems out of airwave range of each other, the newly-participating station requests one of the (Continued)

communication stations of which the beacons are colliding to change the beacon transmission timing.

6 Claims, 26 Drawing Sheets

Related U.S. Application Data continuation of application No. 13/472,990, filed on May 16, 2012, now Pat. No. 8,400,993, which is a continuation of application No. 13/079,519, filed on Apr. 4, 2011, now Pat. No. 8,199,737, which is a continuation of application No. 10/569,426, filed as application No. PCT/JP2004/014921 on Oct. 8, 2004, now Pat. No. 7,995,548.

(51) Int. Cl.
*H04W 74/08* (2009.01)
*H04W 16/14* (2009.01)
*H04W 72/12* (2009.01)

(56) References Cited

U.S. PATENT DOCUMENTS

| | | | |
|---|---|---|---|
| 5,940,765 A | 8/1999 | Haartsen | |
| 6,540,309 B1* | 4/2003 | Jordan | B60T 8/321 |
| | | | 303/122.07 |
| 6,549,594 B1* | 4/2003 | Chen | H04L 25/0202 |
| | | | 375/355 |
| 7,126,937 B2 | 10/2006 | Crosbie et al. | |
| 7,245,604 B2* | 7/2007 | Benveniste | H04L 47/14 |
| | | | 370/338 |
| 7,339,943 B1* | 3/2008 | Mammen | H04L 49/3018 |
| | | | 370/414 |
| 7,457,646 B2* | 11/2008 | Mahany | G06F 1/1626 |
| | | | 455/574 |
| 7,593,738 B2* | 9/2009 | Anderson | G01S 19/03 |
| | | | 342/357.4 |
| 7,639,661 B2 | 12/2009 | Iwami et al. | |
| 7,664,130 B2 | 2/2010 | Sakoda et al. | |
| 7,688,772 B2* | 3/2010 | Sinivaara | H04W 52/0216 |
| | | | 370/318 |
| 7,715,337 B2 | 5/2010 | Watanabe et al. | |
| 7,787,437 B2 | 8/2010 | Sakoda | |
| 7,948,939 B2 | 5/2011 | Sugaya et al. | |
| 7,995,548 B2 | 8/2011 | Sakoda | |
| 8,391,257 B2 | 3/2013 | Sakoda | |
| 8,621,547 B1* | 12/2013 | Harvey | G01R 1/071 |
| | | | 725/135 |
| 2001/0048692 A1 | 12/2001 | Karner | |
| 2002/0115474 A1* | 8/2002 | Yoshino | H04W 16/24 |
| | | | 455/562.1 |
| 2003/0003990 A1* | 1/2003 | Von Kohorn | H04N 7/0884 |
| | | | 463/25 |
| 2003/0012176 A1* | 1/2003 | Kondylis | H04W 28/16 |
| | | | 370/348 |
| 2003/0067906 A1 | 4/2003 | Young | |
| 2003/0108094 A1* | 6/2003 | Lai | H04B 3/23 |
| | | | 375/222 |
| 2003/0145092 A1 | 7/2003 | Funato et al. | |
| 2003/0179731 A1* | 9/2003 | Noguchi | H04L 29/06 |
| | | | 370/331 |
| 2003/0179742 A1 | 9/2003 | Ogier et al. | |
| 2003/0193918 A1 | 10/2003 | Cain et al. | |
| 2003/0193978 A1 | 10/2003 | Kurtz et al. | |
| 2004/0032847 A1* | 2/2004 | Cain | H04B 7/2643 |
| | | | 370/338 |
| 2004/0156386 A1* | 8/2004 | Atarashi | H04B 1/69 |
| | | | 370/441 |
| 2004/0264396 A1* | 12/2004 | Ginzburg | H04W 52/0232 |
| | | | 370/311 |
| 2005/0243782 A1* | 11/2005 | Sakoda | H04L 47/10 |
| | | | 370/338 |
| 2006/0064725 A1* | 3/2006 | Rabinowitz | G01S 5/0036 |
| | | | 725/68 |
| 2007/0133697 A1* | 6/2007 | Spock | H04L 27/2662 |
| | | | 375/260 |
| 2007/0161385 A1* | 7/2007 | Anderson | G01S 19/03 |
| | | | 455/502 |

FOREIGN PATENT DOCUMENTS

| | | |
|---|---|---|
| EP | 1 061 694 A3 | 12/2000 |
| JP | 7-177558 | 7/1995 |
| JP | 7-177558 A | 7/1995 |
| JP | 9-135254 | 5/1997 |
| JP | 9-135254 A | 5/1997 |
| JP | 2000-517132 | 12/2000 |
| JP | 2000-517132 A | 12/2000 |
| JP | 2003-249936 | 9/2003 |
| JP | 2003-249936 A | 9/2003 |
| WO | WO 98/09469 | 3/1998 |
| WO | WO 02/041586 A2 | 5/2002 |
| WO | WO 02/054790 A2 | 7/2002 |
| WO | WO 02/082751 A2 | 10/2002 |
| WO | WO 02/087173 A1 | 10/2002 |
| WO | WO 03/075515 A1 | 9/2003 |

OTHER PUBLICATIONS

European Office Action dated Jan. 20, 2012, issued in European Patent Application 04 792 190.3.
European Office Action dated Jul. 14, 2015 issued in corresponding Application No. 10155540.7 (6 pages).
Extended Search Report dated Feb. 15, 2018 in European Patent Application No. 17205501.4.

* cited by examiner

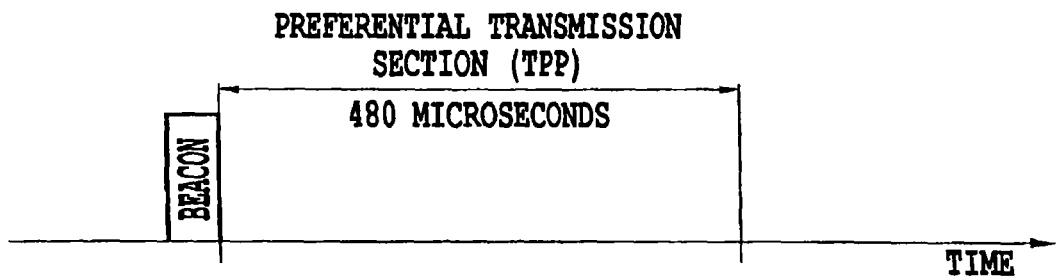
*Fig. 5*
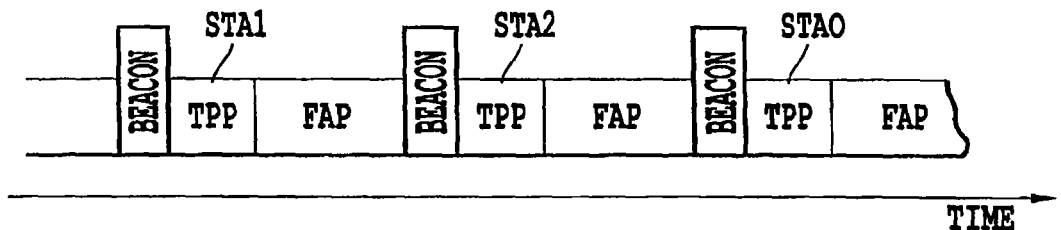
*Fig. 6*
| TA | Type | NBOI | TOIS | ALERT | TxNUM | Serial |
*Fig. 7*
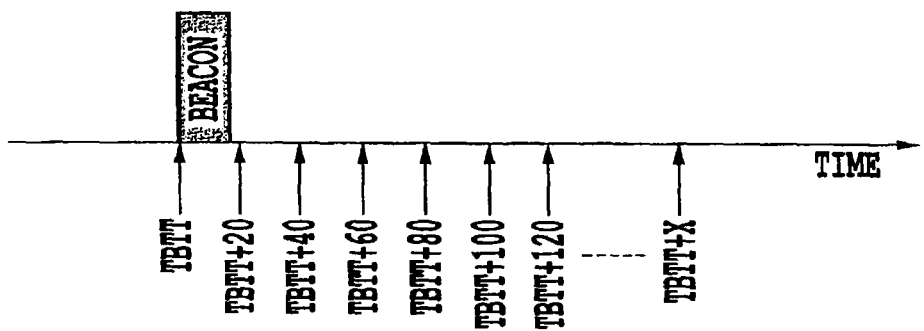
*Fig. 8*

| Type | ALERT Field body |
|---|---|
*Fig.22*
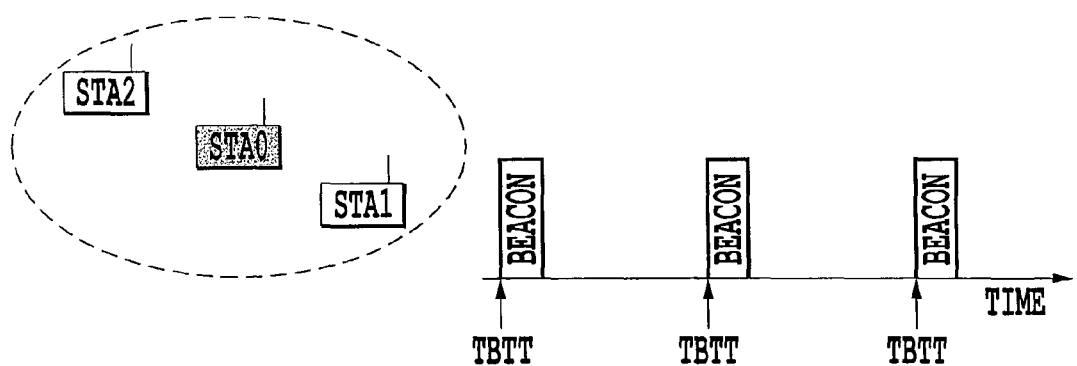
*Fig.23*
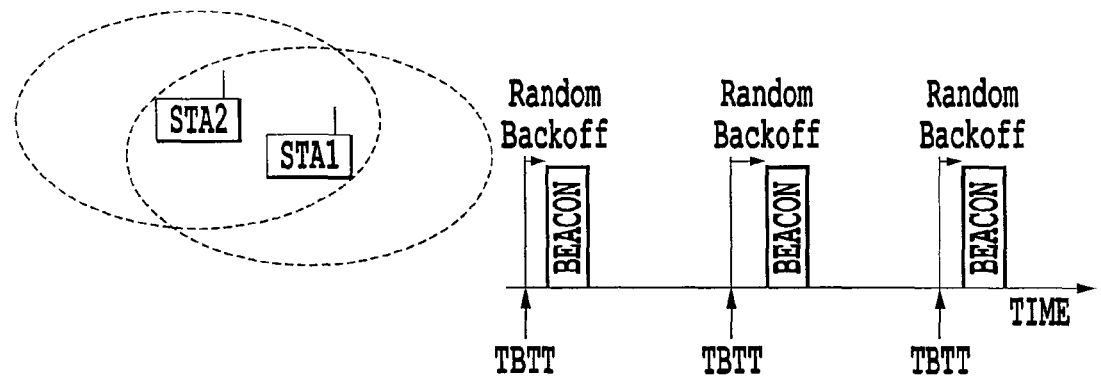
*Fig.24*

RADIO COMMUNICATION SYSTEM, RADIO COMMUNICATION APPARATUS, RADIO COMMUNICATION METHOD, AND COMPUTER PROGRAM

CROSS-REFERENCE TO RELATED APPLICATION

This application is a continuation of U.S. application Ser. No. 13/756,639, filed Feb. 1, 2013, the contents of which are incorporated herein by reference. U.S. application Ser. No. 13/756,639 is a continuation of U.S. application Ser. No. 13/472,990, filed May 16, 2012, which is a continuation of Ser. No. 13/079,519, filed Apr. 4, 2011, now U.S. Pat. No. 8,199,737, issued Jun. 12, 2012. U.S. application Ser. No. 13/079,519 is a continuation of U.S. application Ser. No. 10/569,426, filed Nov. 13, 2006, now U.S. Pat. No. 7,995,548, issued Aug. 9, 2011, the contents of which are incorporated herein by reference, and which is the National Stage of PCT/JP04/14921, filed Oct. 8, 2004, and claims priority to Japanese Patent Applications 2003-364230, filed Oct. 24, 2003 and 2004-187106, filed Jun. 24, 2004.

TECHNICAL FIELD

The present invention relates to a wireless communication system, a wireless communication device, a wireless communication method, and a computer program, for performing mutual communication between multiple wireless stations such as with a wireless LAN (Local Area Network), and more particularly relates to a wireless communication system, a wireless communication device, a wireless communication method, and a computer program, wherein a wireless network is structured by the communication stations operating in an autonomous distributed manner without any controlling-station/controlled-station relations.

More specifically, the present invention relates to a wireless communication system, a wireless communication device, a wireless communication method, and a computer program, wherein an autonomous distributed wireless network is formed by the communication stations notifying one another at predetermined frame cycles with beacons describing network information and the like, and particularly relates to a wireless communication system, a wireless communication device, a wireless communication method, and a computer program, wherein an autonomous distributed wireless network is formed while avoiding collision of beacons which the communication stations transmit one to another.

Also, the present invention relates to a wireless communication system, a wireless communication device, a wireless communication method, and a computer program, wherein the communication stations autonomously perform communication operations in increments of predetermined time intervals, and more particularly relates to a wireless communication system, a wireless communication device, a wireless communication method, and a computer program, wherein the communication stations periodically transmit and receive signals each predetermined time interval while avoiding collision with signals of other stations.

BACKGROUND ART

The wireless LAN is gathering attention as a system to free users from LAN cabling. With a wireless LAN, the greater part of cables can be omitted from the workspace such as offices and the like, so communication terminals such as personal computers (PCs) can be moved with relative ease. In recent years, increased speed and reduced process of wireless LAN systems has led to marked increase in demand thereof. Particularly, as of recent, introduction of the personal area network (PAN), wherein a small-scale wireless network is configured with multiple electronic devices which people have nearby and communication of information is performed, is being considered. Differing wireless communication systems and wireless communication devices have been stipulated, using frequency bandwidths which do not require licensing by the regulatory authorities, such as the 2.4 GHz band and the 5 GHz band, for example.

An example of a commonplace standard relating to wireless networks is IEEE (The Institute of Electrical and Electronic Engineers) 802.11 (see Non-patent Document 1, for example), Hiper LAN/2 (see Non-patent Document 2 or Non-patent Document 3, for example), IEEE 802.15.3, Bluetooth communication, and so forth. Under the IEEE 802.11 Standard, various wireless communication methods exist according to the communication method and frequency band used, such as the IEEE 802.11a Standard, IEEE 802.11b Standard, and so on.

In order to configure a local area network using wireless techniques, with a commonly-used method, a device serving as a control station, that is called an "access point" or "coordinator" is set up within the area, and a network is formed under the centralized control of this control station.

With a wireless network in which an access point has been set up, an access control method based on band reservation is widely employed wherein, in the event of transmission of information from a certain communication device, first, the band necessary for transmission of that information is reserved at the access point so that transmission path usage is implemented such that no collision with information transmission from other communication devices. That is to say, setting up the access point allows synchronous wireless communication wherein communication devices within the wireless network are synchronized with each other.

However, there is the problem with a wireless communication system which has an access point in that asynchronous communication between transmitting and receiving communication devices always necessitates wireless communication via the access point, meaning that the usage efficiency of the transmission path is halved.

As opposed to this, "Ad-hoc communication", wherein communication terminals directly perform asynchronous wireless communication, is being proposed as another method for configuring a wireless network. For small-scale wireless networks configured of a relatively small number of clients which are in the proximity of each other in particular, ad-hoc communication wherein arbitrary terminals can directly perform asynchronous wireless communication without using a predetermined access point is thought to be appropriate.

A central control station does not exist in an ad-hoc wireless communication system, and accordingly is suitable for configuring a home network made up of home electronic appliances, for example. Features of an ad-hoc network are that the network does not readily fail since even in the event that one device malfunctions or the power thereof is turned off, the routing is automatically changed, data can be transmitted over relatively long distances while maintaining a high-speed data rate by hopping packets multiple times between mobile stations, and so forth. Various development examples of ad-hoc systems are known (see Non-patent Document 4, for example).

For example, IEEE 802.11 wireless LAN systems have an ad-hoc mode for operating peer-to-peer in an autonomous distributed manner without a control station begin provided. Under this operating mode, at the beacon transmission time each terminal counts a random period, and in the event that the device has not received a beacon from another terminal by the time that the period ends, transmits its own beacon.

Now, conventional wireless networking will be described in detail with reference to the example of IEEE 802.11.

Networking with IEEE 802.11 is based on the concept of BSS (Basic Service Set). There are two types of BSS; one being a BSS defined by an infrastructure mode wherein a master such as an AP (Access Point: control station) exists, and an IBSS (Independent BSS) defined by an ad-hoc mode configured only of multiple MTs (Mobile Terminals).

Infrastructure Mode

The operations of IEEE 802.11 when in the infrastructure mode will be described with reference to FIG. 23. With an infrastructure mode BSS, an AP to perform coordination within the wireless communication system is indispensable.

The AP handles the range where the airwaves reach around itself as a BSS, thus configuring a "cell" as it is called in a so-called cellular system. An MT nearby the AP is contained in the AP, and participates in the network as a member of the BSS. That is to say, the AP transmits control signals called beacons at appropriate time intervals, the MT capable of receiving these beacons recognizes that an AP is nearby, and further, a connection is established with the AP.

With the example shown in FIG. 23, the communication station the STA0 operates as the AP, and the other communication stations the STA1 and the STA2 operate as MTs. Now, as indicated in the chart to the right side of the drawing, the communication station the STA0 serving as the AP transmits beacons a predetermined time intervals. The transmission point-in-time of the next beacon is notified within the beacon by a parameter format known as Target Beacon Transmit Time (TBTT). Upon the time of the TBTT coming, the AP operates beacon transmission procedures.

Conversely, by receiving the beacon, MTs nearby the AP can recognize the next beacon transmission time by decoding of the internal TBTT field, so in some cases (in cases wherein there is no need for reception), the receiving device may turn off the power and go to sleep until the next or until several TBTTs in the future.

In the infrastructure mode, only the AP transmits beacons a predetermined frame cycles. On the other hand, the nearby MTs succeed in participating in the network by receiving the beacons form the AP, and do not transmit beacons themselves. Note that the focus of the present invention is to operate a network without a master control station such as an AP being directly involved, so the infrastructure mode will be discussed no further.

Ad-Hoc Mode

The operations of IEEE 802.11 when in the other ad-hoc mode will be described with reference to FIG. 24.

With IBSS in the ad-hoc mode, multiple MTs perform negotiation one with another, and subsequently autonomously define the IBSS. Upon defining the IBSS, at the end of the negotiation the MT group determines the TBTT every predetermined interval. Upon recognizing that the TBTT has arrived by referencing a clock within itself, following a random time delay each MT transmits a beacon in the event of recognizing that no one has transmitted a beacon yet.

In the example shown in FIG. 24, the manner in which two MTs make up an IBBS is illustrated. In this case, one of the MTs belonging to the IBSS transmits a beacon each time the TBTT arrives. This also includes cases wherein beacons transmitted from the MTs collide.

There are also cases with IBSS wherein the MTs turn off the power of the transmitting/receiving device and go to sleep as necessary. However, the sleep state is not directly related to the essence of the present invention, and accordingly description thereof will be omitted in the present specification.

Transmission/Reception Procedures Under IEEE 802.11

Next, transmission/reception procedures under IEEE 802.11 will be described.

It is know that with wireless LAN networks under an ad-hoc environment, a hidden terminal problem generally occurs. A hidden terminal is a terminal which can be heard from one communication station which is the other part of communication therewith in a case of communication being carried out between certain communication stations, but cannot be heard by other communication stations, and since negotiation cannot be performed between hidden terminals, there is the possibility that transmission operations may collide.

CSMA/CA according to RTS/CTS procedures is known as a methodology for solving the hidden terminal problem. IEEE 802.11 also employs this methodology.

Now, CSMA (Carrier Sense Multiple Access with Collision Avoidance: Carrier Sense Multiple Access) is a connection method for performing multiple access based on carrier detection. Since receiving signals of information transmitted from a local station is difficult in wireless communication, collision is avoided by starting information transmission from the local station following confirming that there is no information transmission from other communication devices with the CSMA/CA (Collision Avoidance) method rather than CSMA/CD (Collision Detection). The CSMA method is an access method suitable for asynchronous data communication such as file transfer and electronic mail.

With the RTS/CTS method, transmission of data is started in response to a communication station which is the data originator transmitting a transmission request packet RTS (Request To Send), and a confirmation notification packet CTS (Clear To Send) being received form the communication station which is the data transmission destination. Upon a hidden terminal receiving at least one of an RTS or CTS, a transmission stop period is set of the local station for a period during which data transmission based on RTS/CTS procedures is predicted, whereby collision can be avoided.

FIG. 25 illustrates an operation example of RTS/CTS procedures. With the example shown in the drawing, an example is illustrated of a case wherein information (Data) is transmitted from a communication station the STA0 to a communication station the STA1 which mutually perform communication operations in an autonomously dispersed manner.

First, prior to actual information transmission, the STA0 confirms that the media is clear for a predetermined time, following which the RTS packet is transmitted to the STA1, which is the destination of the information, following CSMA procedures. In response o reception of the RTS packet, the STA1 transmits a CTS packet to the STA0 which gives feedback to the effect that the RTS has been received.

In the event that the CTS is successfully received, the STA0 which is the transmitting side determines that the media is clear, and promptly transmits the information (Data) packet. Also, upon successfully receiving the information, the STA1 returns an ACK, whereby one packet of RTS/CTS transmission/reception transaction ends.

In the event that another station has happened to have transmitted some sort of signal at the same time as the STA0 which is the information originator transmitting the RTS, the STA1 which is the information recipient cannot receive the RTS due to the signals colliding. In this case, the STA1 does not return a CTS. As a result, the STA0 can recognize that the earlier RTS has collided, since no CTS is received for a while. Then, procedures for resending the RTS with a random backoff are activated at the STA0. Basically, competition is carried out for wining transmission rights while bearing the risk of such collision.

Access Competition Method in IEEE 802.11

Next, the access competition method stipulated in IEEE 802.11 will be described.

With IEEE 802.11, four types of packet intervals (IFS: Inter Frame Space) are defined. Here, three of these IFSs will be described with reference to FIG. 26. The IFSs defined are, in order from the shorter, SIFS (Short IFS), PIFS (PCF IFS), and DIFS (DCF IFS).

With IEEE 802.11, CSMA is employed as a basic media access procedures (described above), however, it should be noted that a transmission right is granted to the transmitting device only in a case wherein a backoff timer is operated over a random time period while monitoring the media state before transmitting something, and there are no signals transmitted during this period.

In the case of transmitting normal packets following the CSMA procedures (DCF (called Distributed Coordination Function), following some sort of packet transmission ending, first, the media state is monitored by DIFS, and in the event that there are no transmission signals during this period, a random backoff is taken, and further, in the event that there are no transmission signals during this period as well, transmission rights are granted.

On the other hand, transmission of packets with extraordinarily high urgency, such as ACK, is permitted following SIFS packet intervals. This enables packets with high urgency to be transmitted before packets transmitted following normal CSMA procedures.

To summarize the above, the reason that differing types of packet interval IFSs are defined is that prioritizing is performed in the packet transmission competition, according to whether the IFS is SIFS, PIFS, of DIFS, i.e., according to the packet interval length. The purpose of using PIFS will be described later.

Band Guarantee (1) Under IEEE 802.11

In a case of access competition with CSMA, guaranteeing and securing a certain band is impossible. Accordingly, IEEE 802.11 has PCF (Point Coordination Function) to serve as a mechanism for guaranteeing and securing a band. However, PCF is based on poling, and does not operate under Ad-hoc but is only performed under management of an AP in the infrastructure mode.

FIG. 27 illustrates the way in which preferential communication is provided by PCF operations. In the drawing, the STA0 operates as an AP, and the STA1 and the STA2 participate in the BSS managed by the AP. This case assumes the STA1 transmitting information while guaranteeing band.

After transmitting a beacon for example, the STA0 serving as the AP performs poling by transmitting a CF-Poll message to the STA1 at a SIFS interval. The STA1 which has received the CF-Poll is granted data transmission rights, and transmission of data at the SIFTS interval is permitted, in response to this, the STA1 transmits data following SIFS. Upon the STA0 returning an ACK to the transmitted data, and one transaction ending, the STA0 polls the STA1 again.

In the example shown in FIG. 27, a case wherein this poling has failed for some reason is shown. At this time, upon recognizing that information is not transmitted from the STA1 following SIFS after poling the STA1 again, the STA0 deems the poling to have failed, and performs poling again following a PIFS interval. In the event that the poling retry succeeds, data is transmitted from the STA1, and an ACK is returned from the STA0.

Even in the event that the STA2 has a transmitted packet, for example, during this series of procedures, the transmission right never shifts to the STA2, since this would mean that the STA0 or the STA1 would be transmitting at a SIFS or PIFS interval before the DIFS time interval elapses. That is to say, the STA1, which has been polled by the STA0 serving as the AP, always has the transmission right.

Band Guarantee (2) Under IEEE 802.11

Further band guarantee means are being studied for IEEE 802.11, and implementation of a technique called Enhanced DCF (EDCF) is planned (the QoS enhancement in IEEE 802.11e). EDCF is arranged such that the width for which a random backoff value can be set is short for urgent traffic needing band guarantee, and the width for which the packet intervals IFS and backoff value shown in FIG. 26 can be set is longer for other traffic. Consequently, a mechanism is realized which enables transmission of urgent traffic in a statistical manner, though not as conclusive as with PCF.

FIG. 28 illustrates the manner in which preferential transmission is provided to traffic regarding which EDCF operations guarantee band. In the example shown in the drawings, a case is assumed wherein the STA1 attempts to transmit preferential traffic to the STA0, and the STA2 attempts to transmit non-preferential traffic to the STA0. Also, the standard IFS for both traffics is assumed to be time equivalent to DIFS.

Upon the media becoming clear from point-in-time T0, the STA1 and the STA2 both wait for the time of DIFS to elapse. The media is still clear following DIFS elapsing from T0 (point-in-time T1), so the STA1 and the STA2 both start to confirm that the media is clear at a time determined by random backoff.

With EDCF operations, the backoff value of the STA1 is short for preferential traffic, and the backoff value of the STA2 is long for non-preferential traffic. FIG. 28 illustrates the backoff values from point-in-time T1 of each of the communication stations with arrows. At point-in-time T2 where time of the backoff value of the STA1 has elapsed, the STA1 starts transmission of the RTS. On the other hand, the STA2 detects the RTS transmitted from the STA1, updates the backoff value, and prepares for the subsequent transmission.

Also, the STA0 returns a CTS at point-in-time T3 where SIFS has elapsed from reception of the RTS. The STA1 which has received the CTS starts data transmission at a point-in-time T4 where SIFS has elapsed from reception of CTS. The STA0 then returns an ACK at a point-in-time T5 where SIFS has elapsed from reception of data from the STA1.

At point-in-time T6 where returning of the ACK by the STA0 ends, the media is clear again. The STA1 and the STA2 both await elapsing of time of DIFS again. In the event that the media is still clear following elapsing of DIFS (point-in-time T7), the STA1 and the STA2 both start to confirm that the media is clear at a time determined by random backoff. Here also, the backoff value of the STA1 is set short due to preferential traffic, and RTS transmission is performed before the backoff value of the STA2 at point-in-time T8.

Due to the above-described procedures, order of access rights is provided to the STA1 and the STA2 competing for the access right, according to the degree of preference of the traffic being handled. Also, though not shown in the drawing, the backoff value of the STA2 also gradually becomes shorter, so a situation wherein the STA2 never gets access rights does not occur.

[Non-Patent Document 1]

International Standard ISO/IEC 8802-11:1999(E) ANSI/IEEE Std. 802.11, 1999 Edition, Part 11: Wireless LAN Medium Access Control (MAC) and Physical Layer (PHY) Specifications

[Non-Patent Document 2]

ETSI Standard ETSI TS 101 761-1 V1.3.1 Broadband Radio Access Networks (BRAN); HIPERLAN Type 2; Data Link Control (DLC) Layer; Part 1: Basic Data Transport Functions

[Non-Patent Document 3]

ETSI TS 101 761-2 V1.3.1 Broadband Radio Access Networks (BRAN); HIPERLAN Type 2; Data Link Control (DLC) Layer; Part 2: Radio Link Control (RLC) sublayer

[Non-Patent Document 4]

"Ad Hoc Mobile Wireless Network" by C. K. Tho (published by Prentice Hall PTR)

DISCLOSURE OF INVENTION

Problems to be Solved by the Invention

As described above, while the transmission/reception procedures according to IEEE 802.11 enable the problems of access competition and band guarantee to be solved, there are several problems which remain, which are listed below.
(1) Existence of Point Coordinator As described above, IEEE 802.11 provides a mechanism for QoS communication by PCF. However, PCF operates under the presence of an AP which centrally governs media access. With a network having an AP, malfunctioning at the AP causes a problem that all communication becomes unavailable. Also, there is the problem that MTs which are at locations where communication with the AP cannot be made, cannot participate in the network.
(2) Problem of Increased Probability of Collision With EDFC With the mechanism of EDCF in IEEE 802.11, links with higher preference basically can be preferentially passed even without a Point Coordinator such as an AP. However, in the event that multiple stations simultaneously start transmission with high preference, collisions frequently occur since the backoff is set short, leading to the problem of lowered communication efficiency. Also, there are cases where traffic with low preference is set with long IFSs, and under an environment wherein traffic with lower preference is dominant, the transmission right competition is performed following elapsing of long IFSs for all communication stations, leading to the problem that the overhead is great and communication efficiency drops. Moreover, in a case wherein there is no control station such as an AP, there is no say to suppress requests for traffic exceeding the capacity load of the network, leading to the program not requests form higher order layers cannot be fulfilled at all links. In cases where multiple video streams and the like are provided, this emerges as a great problem.
(3) Problem of Beacon Collision At the time of configuring a network, a predetermined control station or communication stations operating in an autonomously dispersed manner perform notification at predetermined intervals with beacons describing network information and the like. There is the problem of beacon collision in such systems. For example, with IEEE 802.11, this problems occurs in the case of performing beacon transmission from multiple stations in the same area and on the same channel, in both the infrastructure mode and the Ad-hoc mode.

In the Ad-hoc mode, the beacon transmission stations are defined with random backoff to begin with, so beacon collision is unavoidable from the beginning. Also, with the infrastructure mode, while there is no problem in the event that only a single BSS exists, multiple beacons coexist in a case wherein multiple BSSs enter the airwave range due to the network relocating or a nearby airwave-blocking object moving. In the event that the beacon transmission time overlaps here, a problem occurs in that the nearby stations cannot receive the beacons.

The present invention has been made in light of the above-described technical problems, and accordingly, it is a primary object thereof to provide a superior wireless communication system, wireless communication device, wireless communication method, and computer program, wherein a wireless network is formed by communication stations operating in an autonomous distributed manner without a device serving as a control station being disposed.

It is a further object of the present invention to provide a superior wireless communication system, wireless communication device, wireless communication method, and computer program, wherein an autonomous distributed network with guaranteed quality of communication can be constructed without involvement of a specified control station.

It is a further object of the present invention to provide a superior wireless communication system, wireless communication device, wireless communication method, and computer program, wherein data transmission can be performed while avoiding collision in an autonomous distributed network without involvement of a specified control station.

It is a further object of the present invention to provide a superior wireless communication system, wireless communication device, wireless communication method, and computer program, wherein beacon collision can be appropriately avoided among multiple communication stations in a network configured by communication stations performing notification with beacons.

It is a further object of the present invention to provide a superior wireless communication system, wireless communication device, wireless communication method, and computer program, wherein an autonomous dispersed wireless network can be suitably formed while avoiding collision of beacons which the communication stations transmit one to another.

It is a further object of the present invention to provide a superior wireless communication system, wireless communication device, wireless communication method, and computer program, wherein the communication stations each can autonomously perform suitable autonomous communication operations in time interval units.

It is a further object of the present invention to provide a superior wireless communication system, wireless communication device, wireless communication method, and computer program, wherein a communication station can perform periodic signal transmission and reception at each predetermined time interval, while avoiding collision with signals of other stations.

Means for Solving the Problems

The present invention has been made in light of the above problems, and a first aspect thereof is an autonomous dispersed type wireless communication system for constructing a network by communication stations transmitting beacons describing network-related information to each other at predetermined time intervals, with no particular control station installed; wherein collision of beacons transmitted from two or more communication stations within the network is detected; and wherein collisions are resolved by changing the transmission timing of at least one of the beacons, in response to detection of the collision.

Note however, that "system" as used here refers to a logical collection of multiple devices (or functional modules for realizing certain functions), and whether each of the devices and functional modules are in a single housing is of no particular concern.

Under an autonomous dispersed communication environment, each communication station performs notification of beacon information at predetermined time intervals, thereby announcing its own existence to other neighboring (i.e., within a communicable range) communication stations, and also notifies the network configuration. Also, the communication stations perform scanning operations for each channel and receive beacon signals, thereby detecting penetration of the communication range of a neighboring station, and also enables knowing the network configuration by analyzing the information described in the beacon.

Also, each communication station includes and transmits, in beacon signals, neighboring device information relating to beacon transmission timing. In this case, the communication station can obtain not only network information of the neighboring station from which beacons can be directly received, but also beacon information relating to a station the next over, i.e., a hidden terminal, which the local station cannot receive beacons from but the neighboring station can.

With such an autonomous dispersed network, communication station newly participating first perform scanning operations, i.e., continuously attempt signal reception for a period equal to or lower than a super frame, and confirm existence of beacons transmitted by the nearby stations. In the event that no beacons are received from the nearby stations in this process, the communication station sets an appropriate beacon transmission timing. On the other hand, in the case that beacons transmitted from nearby stations are received, the neighboring device information described in each of the received beacons is referred to so as to set a timing at which none of the already-existing stations transmit beacons, as the beacon transmission timing of the local station.

Under conditions wherein the communication stations are each stationary and the airwave permeation range does not change, beacon collision can be avoided by the above-described procedures. On the other hand, in the event that the airwave permeation range changes due to the communication station moving or the like, cases can occur wherein beacons transmitted by the communication stations collide.

For example, in a case wherein communication stations of two systems out of range of the airwaves of each other set the same transmission timing completely independent of each other, but then move into an airwave permeation range so that airwaves of each are receivable, a state wherein the beacons of the stations collide occurs.

Or, a case is also conceivable wherein, following communication stations of two systems out of range of the airwaves of each other setting the same transmission timing completely independent of each other, a new communication station which is capable of reception from both systems emerges, thereby exposing collision of beacons transmitted by each of the communication stations.

According to the present invention, upon detection of collision of beacons transmitted from two or more communication stations within a communication range, collision of beacons is avoided by autonomous actions of each of the communication stations, by changing the transmission timing of at least one of the beacons.

Here, the communication station which changes the beacon transmission timing notifies nearby stations with a beacon describing a warning to the effect that the beacon transmission timing is to be changed, performs a scanning operation for at least a predetermined period, discovers a timing which is not being used for beacon transmission by nearby stations, and determines this to be a new beacon transmission timing.

In a case wherein communication stations of two systems out of range of the airwaves of each other set the same transmission timing completely independent of each other, but then move into an airwave permeation range so that airwaves of each are receivable, collision of the beacons of each other can be recognized between the communication stations.

In such a case, collision can be avoided by one of the communication stations autonomously moving the beacon transmission timing of itself. For example, in response to receiving a beacon of another station at a timing which may result in collision immediately prior to transmission of a beacon from itself, the communication station changes the beacon transmission position of itself. Or, in response to receiving a beacon of another station at a timing which may result in collision immediately following transmission of a beacon from itself, the communication station changes the beacon transmission position of itself.

Or, an arrangement may be made wherein, instead of one communication station autonomously changing the beacon transmission timing, a communication station requests the other station to change the beacon transmission timing upon recognizing collision of beacons from receiving beacons of another station at a timing close to that of its own beacon transmission timing.

Also, in a case wherein, following communication stations of two systems out of range of the airwaves of each other setting the same transmission timing completely independent of each other, a new communication station which is capable of reception from both systems emerges, thereby exposing collision of beacons transmitted by each of the communication stations, the newly-participating station may request one of the communication stations with which beacons are colliding to change the beacon transmission timing. Changing the beacon transmission timing as used here includes stopping beacon transmission, as well as moving the beacon transmission timing.

Now, with the wireless communication network according to the present information, the communication stations win preferential usage periods for traffic due to having transmitted beacons. An arrangement may be made wherein the communication stations each transmit a regular beacon just once, and also transmit one or more auxiliary beacons made up of signals similar to the regular beacon, at the predetermined time intervals.

For example, traffic priority is set in the auxiliary beacons transmitted by the communication stations, and notification is made with the beacons describing priority-related information. In this case, an arrangement may be made wherein, in the event that beacon collision occurs, the priority of each others beacons is referred, and the originator of the beacon with the lower priority changes it s own beacon transmission timing. Changing the beacon transmission timing as used here includes stopping beacon transmission, as well as moving the beacon transmission timing.

Also, in the event that a communication station with which beacons are colliding is equivalent to a hidden station, beacons cannot be directly received, so the priority cannot be compared with the beacon of the local station.

In such a case, the communication station transmits a beacon stop request toward nearby stations, specifying the number of beacons which the communication station wants to place within the predetermined time interval, and the priorities thereof. On the other hand, the communication stations which have received the beacon stop request detect beacons with priority of or lower than that specified in the predetermined time interval, of a number equal to that specified, and transmit a beacon stop request to each of the beacon-originating communication stations. Due to such remote operations, the communication station can obtain the desired beacon transmission timing from hidden terminals, in the same way as with neighboring stations which can mutually receive beacons.

Also, a second aspect of the present invention is a wireless communication system for constructing a network by communication stations performing periodic communication operations at each predetermined time interval, with no controlling-station/controlled-station relations; wherein, in the event of performing periodic signal transmission/reception at each the predetermined time interval, a communication station attempts reception of transmission signals from other stations at least at one of prior to the periodic signal transmission/reception and following the periodic signal transmission/reception, so as to detect whether or not there is collision between the periodic signal transmission/reception and transmission signals of other stations.

With the wireless communication system according to the second aspect of the present invention, under an autonomous dispersed communication environment wherein each communication station autonomously performs periodic communication operations at predetermined time intervals, a communication station is permitted to obtain a reserved band or preferential usage period at a suitable timing within the predetermined time interval, and perform periodic communication operations at each predetermined time interval.

In the case of performing periodic transmission/reception operations at each predetermined time interval, the communication station attempts reception of a transmission signal from another station prior to periodic signal transmission/reception or following signal transmission/reception, so as to detect whether or not there is collision between the periodic signal transmission/reception and the signal transmission of the other station. Specifically, receiving transmitted signals of the other station at a timing near that of the periodic signal transmission/reception timing of the local station enables collision at the periodic signal transmission/reception timing to be detected. Also, receiving periodic transmitted signals of the other station at a timing near that of the signal transmission/reception timing of the local station enables collision at the periodic signal transmission/reception timing to be detected.

Also, an arrangement may be made wherein, a communication station performs scanning processing for at least a predetermined period in response to detection of collision of the periodic transmission/reception signals, thereby attempting confirmation of the state of cyclic signal transmission of other stations.

Now, the communication station may attempt reception of a transmission signal from another station prior to periodic signal transmission/reception, wherein, in response to detection of collision between the periodic signal transmission/reception and the signal transmission of the other station, the signal transmission timing of the local station is delayed, so as to avoid collision with the signals of the other station, thereby avoiding collision.

In such a case, the communication station may transmit signals with description to the effect that the periodic signal transmission timing has been changed to avoid collision. The other station with which collision has occurred receives signals with description to the effect that the periodic signal transmission timing has been changed to avoid collision, and can detect collision with the periodic signals which were to be transmitted following transmission by the local station.

Also, the communication stations may notify each other with beacons with description of the schedule of signals to be periodically transmitted/received. In this case, the communication stations can extract the periodic signal transmission/reception point-in-time of each other. In the event of detecting collision in a periodic signal transmission/reception section based on information described in a beacon received from a nearby station, the colliding signal transmission/reception timing can be changed.

Also, the communication station may set an order of preference to signals periodically transmitted /received, and make notification with beacons describing has a preferential order along with a schedule of signals periodically transmitted/received. Upon detecting collision in a periodic signal transmission/reception section based on information described in beacons received from nearby stations, collision can be avoided by changing the timing of the periodically transmitted/received signals with lower preferential order.

Also, a communication station may describe relative point-in-time information from the beacon transmission point-in-time of the communication station in a part of signals periodically transmitted/received. In this case, upon receiving periodically-transmitted signals transmitted by other stations, the communication station can extract the transmission point-in-time of the transmitting station of the signal, based on the relative point-in-time information from the beacon transmission point-in-time described in the signals periodically transmitted, and detect collision. Stopping transmission of other signals performed at the point-in-time allows collision to be avoided.

Also, an arrangement may be made wherein the communication station describes, in a part of signals periodically transmitted, information to the effect that the signals are being periodically scheduled and transmitted. Further, information may be described in a part of the signals periodically transmitted, indicating the preferential order of the signals. In such a case, the communication station can change the periodic signal transmission/reception timing with lower priority order, in response to detection of collision of periodic signal transmission/reception.

Also, the communication station may attach a random offset to the transmission point-in-time for the periodic signal transmission/reception. The communication station may describe information relating to the random offset of the transmission point-in-time in part of the signals periodically transmitted/received.

Also, the communication station may extract a time span in which collision with periodic signal transmission/reception of other stations will not occur by performing a scanning operation prior to newly generating periodic signal transmission/reception, and set the new periodic signal transmission/reception timing to the time span in which collision with periodic signal transmission/reception of other stations will not occur.

Also, at the time of performing a scanning operation for obtaining information relating to a network, the communication station may extract a time span in which information necessary for obtaining the information is transmitted, and attempt signal reception in the extracted time slot, so as to efficiently perform scanning operations.

Also, at the time of acquiring one or more periodic signal transmission/reception sections and performing transmission/reception with a desired communication station, the communication station may monitor the signal reception state in periodic signal transmission/reception sections. Also, periodic signal transmission/reception sections, regarding which marked deterioration in the signal reception state has been detected, may be released, since it can be estimated that collision with other signals is occurring.

Also, the communication station may performs signal transmission/reception based on access procedures following the CSMA method involving signal detection for a predetermined time on a transport path and standby for a random back-off period, in a time span other than periodic signal transmission/reception sections of nearby stations.

Also, a third aspect of the present invention is a wireless communication system for constructing a network by communication stations transmitting beacons describing network-related information to each other at predetermined time intervals, with no controlling-station/controlled-station relations; wherein, in the event of performing periodic signal transmission/reception at each the predetermined time interval, a communication station describes relative point-in-time information from the beacon transmission point-in-time of the communication station, in a part of signals periodically transmitted/received, and collision between beacons of nearby stations and signals transmitted and received by other stations is detected based on relative point-in-time information described in signals received from nearby stations.

With the wireless communication system according to the third aspect according to the present invention, a network is constructed by communication stations periodically notifying each other with beacons. A communication station is permitted to obtain a reserved band or preferential usage period at a suitable timing within the predetermined time interval, and perform periodic communication operations at each predetermined time interval.

Now, collision can be detected between communication stations can be detected by the communication stations, which periodically perform communication operations ever predetermined time interval, describing relative point-in-time information from the beacon transmission point-in-time in a part of the singles periodically transmitted/received. Specifically, the communication station may extract the transmission point-in-time of beacons of nearby stations, based on relative point-in-time information described in the signals received from the nearby stations, and detect collision with beacons of the nearby stations in the event that a signal has been transmitted from the local station at the same point-in-time.

Also, the communication station may extract the transmission point-in-time of beacons of nearby stations, based on relative point-in-time information described in the signals received from the nearby stations, and detect collision with beacons of the nearby stations in the event that signals cannot be received from the other station at the same point-in-time.

Also, the communication station may avoid collision in response to detection of collision of signals. For example, the communication station may avoid collision by stopping transmission of other signals performed at the beacon signal transmission point-in-time that has been extracted.

Also, a fourth aspect of the present invention is a computer program described in a computer-readable format so as to execute, on a computer system, processing for performing wireless communication operations under an autonomously dispersed communication environment constructed by communication stations transmitting beacons describing network-related information to each other at predetermined time intervals, with no controlling-station/controlled-station relations, the program comprising: a beacon signal generating step for generating beacon signals describing information relating to a local station; a beacon signal analyzing step for analyzing beacon signals received from nearby stations; a timing control step for controlling the beacon transmission timing; and a collision avoiding step for avoiding beacon collisions occurring with other stations.

Also, a fourth aspect of the present invention is a computer program described in a computer-readable format so as to execute, on a computer system, processing for performing communication operations at each predetermined time interval, under a communication environment with no controlling-station/controlled-station relations, the program comprising: a signal transmission/reception step for performing periodic signal transmission/reception at each the predetermined time interval; and a collision detecting step for attempting reception of transmission signals from other stations at least at one of prior to the periodic signal transmission/reception and following the periodic signal transmission/reception, so as to detect whether or not there is collision between the periodic signal transmission/reception and transmission signals of other stations.

Also, a fifth aspect of the present invention is a computer program described in a computer-readable format so as to execute, on a computer system, processing for performing wireless communication operations under a communication environment constructed by communication stations transmitting beacons describing network-related information to each other at predetermined time intervals, with no controlling-station/controlled-station relations, the program comprising: a beacon signal generating step for generating beacon signals describing information relating to a local station; a beacon signal analyzing step for analyzing beacon signals received from nearby stations; a signal transmission/reception step for describing, in a part of signals, relative point-in-time information from the beacon transmission point-in-time, and performing periodic signal transmission/reception at each the predetermined time interval; and a collision detecting step for detecting collision between a beacon from a nearby station and signals transmitted/received by other stations, based on the relative point-in-time information described in the signals received from the nearby station.

The computer programs according to the fourth through sixth aspects of the present invention define computer programs described in a computer-readable format so as to realize predetermined progressing of a computer system. In other words, installing the computer programs according to the fourth through sixth aspects of the present invention in a computer system causes the computer system to exhibit cooperative actions, and to operate as a wireless communication device. Activating a plurality of such wireless communication devices and configuring a wireless network yields the same advantages as those of the wireless communication system according to the first through third aspects of the present invention.

Advantages

According to the present invention, a superior wireless communication system, wireless communication device, wireless communication method, and computer program, wherein a network is formed by communication stations operating in an autonomous distributed manner without a device serving as a control station being disposed, can be provided.

Also, according to the present invention, a superior wireless communication system, wireless communication device, wireless communication method, and computer program, wherein data transmission can be performed while avoiding collision in an autonomous distributed wireless network without involvement of a specified control station, can be provided.

Also, according to the present invention, a superior wireless communication system, wireless communication device, wireless communication method, and computer program, wherein beacon collision can be appropriately avoided among multiple communication stations in a network configured by communication stations performing notification with beacons, can be provided.

Also, according to the present invention, a superior wireless communication system, wireless communication device, wireless communication method, and computer program, wherein an autonomous dispersed wireless network can be suitably formed while avoiding collision of beacons which the communication stations transmit one to another, can be provided.

Also, according to the present invention, a superior wireless communication system, wireless communication device, wireless communication method, and computer program, wherein the communication stations each can autonomously perform suitable communication operations at predetermined time interval units, can be provided.

Also, according to the present invention, a superior wireless communication system, wireless communication device, wireless communication method, and computer program, wherein a communication station can perform periodic signal transmission and reception at each predetermined time interval, while avoiding collision with signals of other stations, can be provided.

According to the present invention, QoS communication can be provided even under a dispersed control environment where no Point Coordinator such as a control station exists. Also, each of the communication stations can autonomously understand the network load even under a dispersed control environment, so in the event that traffic exceeding the capacity load of the network is requested, just traffic with low preferential order can be eliminated according to the preferential order which the upper layer of the communication protocol requests.

Also, according to the present invention, situations wherein beacon collision continuously occurs can be avoided even in cases of beacon collision due to networks crossing or the like, and the presence of each node existing in the network can be understood in a sure manner, so the suppression in occurrence of connection cut-offs and the like can be markedly improved.

Other objects, features, and advantages of the present invention will become more apparent from the later-described embodiments of the present invention and detailed description made with reference to the appended drawings.

BRIEF DESCRIPTION OF THE DRAWINGS

FIG. 5 is a diagram illustrating the manner in which a beacon transmission station is given preferential rights within a super frame cycle.

FIG. 6 is a diagram illustrating the configuration of a super frame cycle.

FIG. 7 is a diagram illustrating an example of the format of a beacon frame transmitted in the autonomously dispersed type wireless communication system according to the present embodiment.

FIG. 8 is a diagram for describing TBTT offset.

FIGS. 14A-14D are diagrams illustrating the manner in which collision of beacons transmitted by the communication stations is exposed due to power of a new communication station being turned on.

FIG. 22 is a diagram schematically illustrating the configuration of an ALERT field.

FIG. 23 is a diagram for describing the operations in a wireless network based on IEEE 802.11 in the infrastructure mode.

FIG. 24 is a diagram for describing the operations in a wireless network based on IEEE 802.11 in the ad-hoc mode.

BEST MODE FOR CARRYING OUT THE INVENTION

Embodiments of the present invention will now be described in detail with reference to the drawings.

A. System Configuration

The communication transmission path serving as the basis for the present invention is wireless, with multiple communication stations configuring a network. The communication serving as the basis for the present invention is storage exchange type traffic, with information being transferred in increments of packets. Also, while the following description assumes that each communication station handles a single channel, this can be expanded to an arrangement wherein multiple frequency channels are used, i.e. multi-channel transmission media is used.

The wireless network system according to the present invention is an autonomously dispersed system configuration wherein a coordinator is not provided, and transmission control effectively using channel resources by transmission (MAC) frames having a loose time-division multiple-access structure is performed. Also, the communication stations can also perform ad-hoc communication wherein information is directly asynchronously transmitted following access procedures based on CSMA.

With such an autonomously dispersed wireless communication system wherein a control station is not provided in particular, each communication station notifying beacon information on the channel notifies other neighboring (i.e. within communication range) communication stations of its own existence, and also notifies the network configuration. A communication station transmits a beacon at the head of a transmission frame cycle, so the transmission frame cycle is defined by the beacon interval. Also, each communication station performs a scanning operation on the channel for a period equivalent to the transmission frame cycle, thereby discovering beacon signals transmitted from nearby stations, and analyzes the information described in the beacons to find out the network configuration (or to participate in the network). Each of the communication stations notify each other of the transmission/reception timing within each others transmission frame cycle by exchanging beacon signals, thereby realizing loose time-division multiple-access while performing random access to the media in an autonomously dispersed manner according to CSMA procedures.

Figure 1:
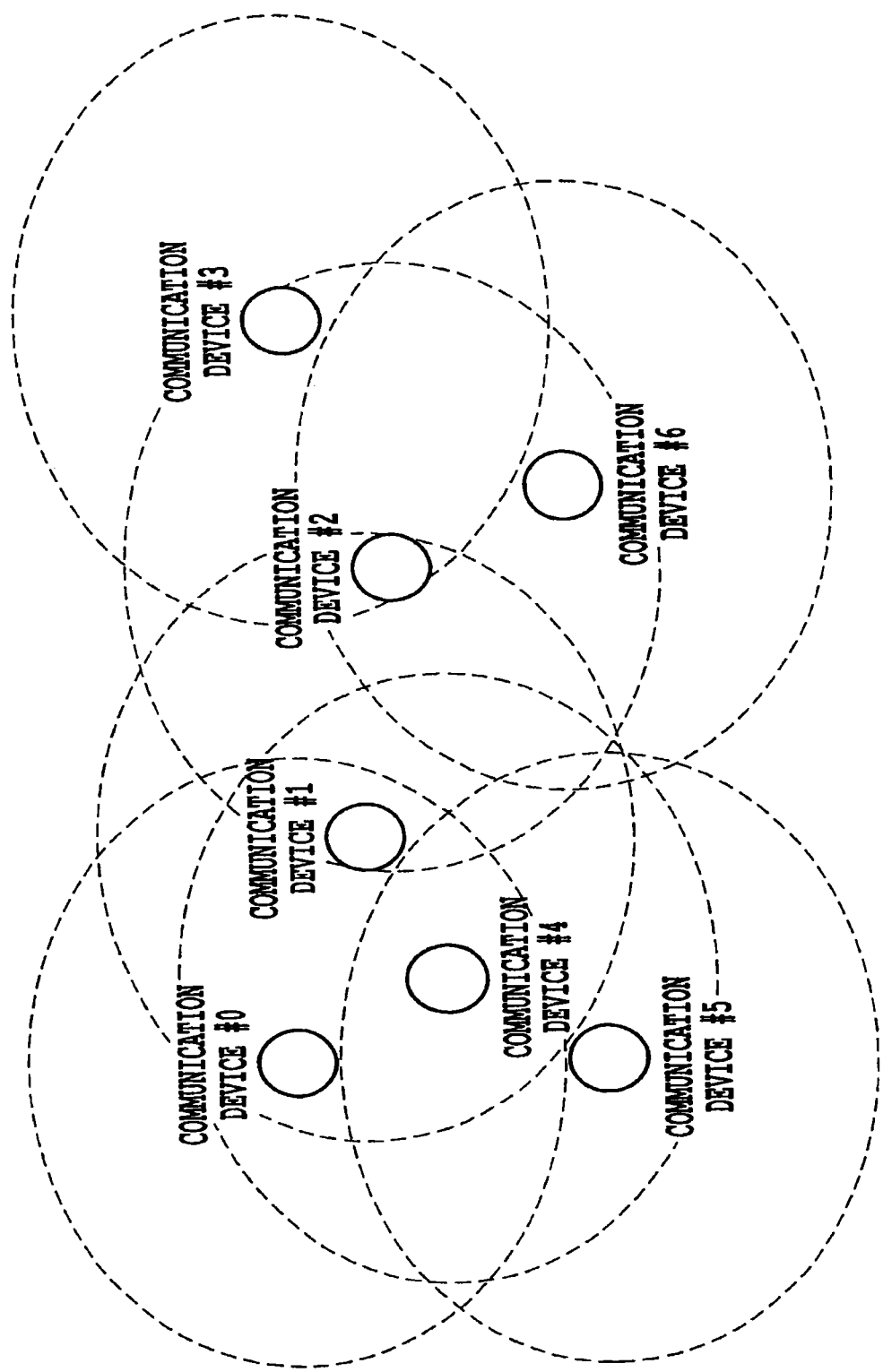
FIG. 1 is a diagram illustrating a placement example of communication devices configuring a wireless communication system according to an embodiment of the present invention.

FIG. 1 illustrates a placement example of communication devices configuring the wireless communication system according to one embodiment of the present invention. With this wireless communication system, no particular communication station is provided, with each communication station operating in an autonomously dispersed manner, thereby forming an ad-hoc network. The drawing illustrates the say in which communication device #0 through communication device #6 are distributed in the same space.

Also, the drawing illustrates the communication range of each of the communication devices with dotted lines, defining ranges wherein not only can a communication device communicate with other communication devices in that range, but signals transmitted therefrom cause interference therein. That is to say, the communication device #0 is in a range capable of communication with the neighboring communication device #1 and communication device #4, the communication device #1 is in a range capable of communication with the neighboring communication devices #0, #2, and #4, the communication device #2 is in a range capable of communication with the neighboring communication devices #1, #3, and #6, the communication device #3 is in a range capable of communication with the neighboring communication device #2, the communication device #4 is in a range capable of communication with the neighboring communication devices #0, #1, and #5, the communication device #5 is in a range capable of communication with the neighboring communication device #4, and the communication device #6 is in a range capable of communication with the neighboring communication device #2.

In the event of performing communication between certain communication devices, there are communication device which can be heard from one communication device which is the other part of communication, but cannot be heard from the other communication device, i.e., "hidden terminals".

Figure 2:
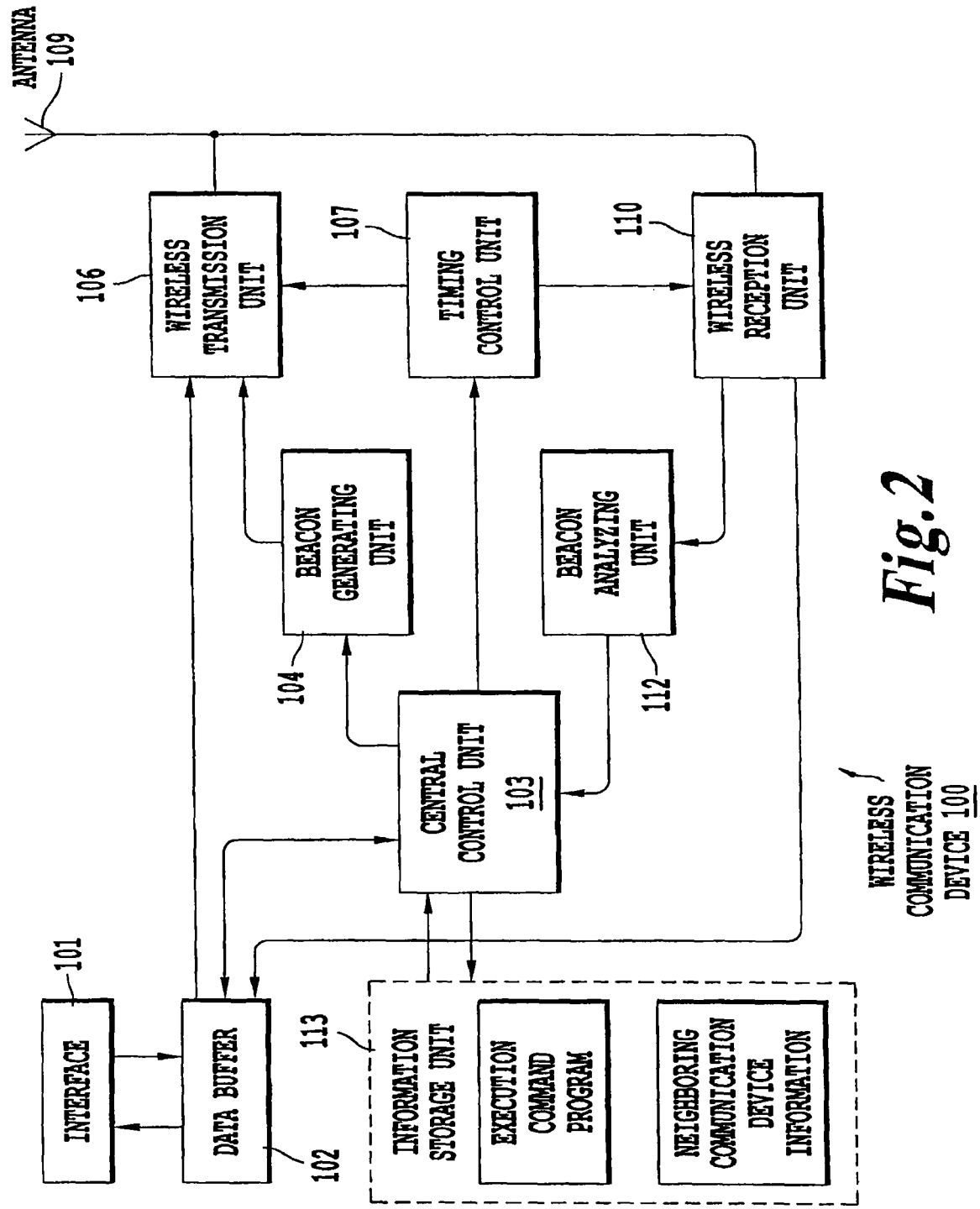
FIG. 2 is a diagram schematically illustrating the function configuration of a wireless communication device operating as a communication station in a wireless network according to an embodiment of the present invention.

FIG. 2 schematically illustrates the functional configuration of a wireless communication device operating as a wireless station in a wireless network according to an embodiment of the present invention. The wireless communication device shown in the drawing can configure a network while avoiding collision by performing effective channel access within the same wireless system in an autonomously dispersed communication embodiment with no control station disposed.

As shown in the drawing, the wireless communication device 100 is configured of an interface 101, a data buffer 102, a central control unit 103, a beacon generating unit 104, a wireless transmission unit 106, a timing control unit 107, an antenna 109, a wireless reception unit 110, a beacon analyzing unit 112, and an information storage unit 113.

The interface 101 exchanges various types of information with external equipment (e.g., a personal computer (not shown) or the like) connected to the wireless communication device 100.

The data buffer 102 is used to temporarily store data sent from devices connected via the interface 101, an data received over the wireless transmission path, before being sent via the interface 101.

The central control unit 103 centrally performs management of the series of information transmission and reception at the wireless communication device 100, and access control of the transmission path. Operation control such as collision avoidance processing at the like at the time of beacon collision, for example, is performed at the central control unit 103. Processing means for avoiding collision include moving the beacon transmission position of the local station, stopping beacon transmission from the local station, requesting other stations to change the beacon transmission position (to move the beacon transmission position or to stop), but the details of these processing procedures will be described later.

The beacon generating unit 104 generates beacon signals periodically exchanged between neighboring wireless communication devices. In order for the wireless communication device 100 to operate a wireless network, the beacon transmission station of the local station and the beacon reception position from nearby stations and so forth are stipulated. This information is stored in the information storage unit 113, and also is described in beacon signal and notified to the nearby wireless communication devices. The configuration of beacon signals will be described later. The wireless communication device 100 transmits beacons at the head of transmission frame cycles, so the transmission frame cycle at the channel which the wireless communication device 100 uses is defined by beacon intervals.

The wireless transmission unit 106 performs predetermined modulation processing for wireless transmission of data temporarily stored in the data buffer 102 and of beacon signals. Also, the wireless reception unit 110 performs signal reception processing of information and beacons and the like sent from other wireless communication devices at a predetermined time.

As for the wireless transmission/reception method at the wireless transmission unit 106 and the wireless reception unit 110, various types of communication methods suitable for relatively close-distance communication, that can be applied to a wireless LAN, for example, can be applied. Specifically, the UWB (Ultra Wide Band) method, OFDM (Orthogonal Frequency Division Multiplexing) method, CDMA (Code Division Multiple Access) method, and so forth, can be applied.

The antenna 109 performs wireless transmission of signals to another wireless communication device on a predetermined frequency channel, and collects signals transmitted from other wireless communication device. With the present embodiment, a single antenna is provided, and transmission and reception are not executable in parallel.

The timing control unit 107 performs timing control for transmission and reception of the wireless signals. For example, the beacon transmission timing form the local station at the head of the transmission frame cycle, beacon reception timing from other wireless communication devices, data transmission/reception timing with other communication device, and scanning operation cycle, and so forth, are controlled.

The beacon analyzing unit 112 analyzes beacon signals received from neighboring stations, and analyzes the existence and so forth of the neighboring wireless communication devices. For example, information such as the beacon reception timing of neighboring stations and neighboring beacon reception timing and so forth are stored in the information storage unit 113 as neighboring device information.

The information storage unit 113 stores execution procedure commands (programs describing collision avoidance processing procedures and so forth) for the series of access control operations executed at the central control unit 103, neighboring device information obtained as the results of analyzing received beacons, and so forth.

With the autonomously dispersed type network according to the present embodiment, each communication station notifies beacon information at predetermined time intervals on a predetermine channel, thereby notifying other neighboring (i.e., within communication range) communication stations of own existence, and notify the network configuration. The beacon transmission cycle is defined as a super frame here, and is 80 milliseconds, for example.

A communication station newly participating detects that it has penetrated a communication range while listening to beacon signals from nearby station by performing scanning operations, and also can know the network configuration by analyzing the information described in the beacons. The beacon transmission timing of the local station is then set to a timing at which no beacons are transmitted from nearby stations, while loosely synchronizing with the beacon reception timing.

Now, the beacon transmission procedures for each communication station according to the present embodiment will be described with reference to FIG. 3.

Each communication station loosely synchronizes while listening to beacons emitted nearby. In the event that a new communication station emerges, the new communication station sets its own beacon transmission timing so as to not collide with the beacon transmission timing of already-existing communication stations.

In the event that there are no communication stations nearby, the communication station 01 can start transmitting beacons at an arbitrary timing. The beacon transmission interval is 80 milliseconds (described above). In the example shown at the top tier in FIG. 3, B01 is a beacon transmitted from the communication station 01.

Hereafter, communication stations newly participating in the communication range set their own beacon transmission timings so as to not collide with the already-existing beacon placement. At this time, each communication station acquires a preferential usage region (TPP) immediately following beacon transmission (described later), so it is more preferably that the beacon transmission timing of the communication devices be uniformly scattered through the transmission frame cycle, rather than being concentrated, from the perspective of transmission efficiency. Accordingly, with the present embodiment, the beacon transmission is started at approximately the center of the longest time span of the beacon interval within the basic hearing range of the local station.

Figure 3:
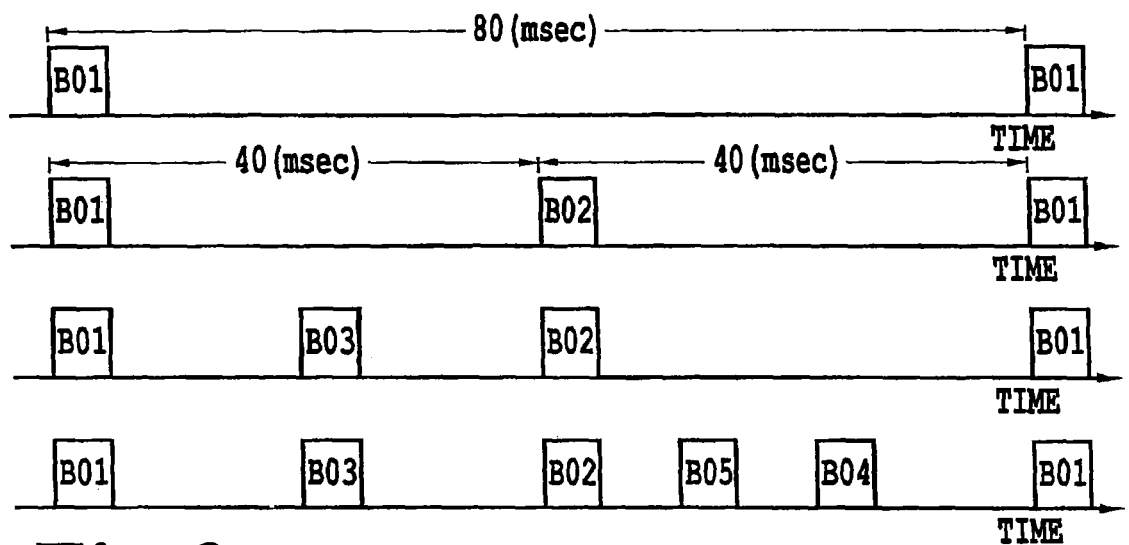
FIG. 3 is a diagram for describing the procedures for each of the communication stations to transmit beacons in an autonomously dispersed network according to the present invention.

For example, let us say that a new communication station 02 appears on a channel where only the communication station 01 exists, as shown at the top tier in FIG. 3. At this time, the communication station 02 receives beacons from the communication station 01 so as to recognize the existence thereof and the beacon position, sets its own beacon transmission timing at approximately the center of the beacon interval of the communication station 01 as shown in the second tier in FIG. 3, and starts beacon transmission.

Further, let us say that a new communication station 03 appears. At this time, the communication station 03 receives at least one of the beacons transmitted from the communication station 01 and the communication station 02, and recognizes the presence of these already-existing communication stations. Then, as shown in the third tier in FIG. 3, transmission is started at a timing at approximately the center of the bacon intervals transmitted from the communication station 01 and the communication station 02.

Hereafter, each time a neighboring communication station newly participates following the same algorithm, the beacon interval narrows. For example, as shown in the lowest tier in FIG. 3, the communication station 04 which appears next sets the beacon transmission timing at a timing at approximately the center of the bacon intervals set by the communication station 02 and the communication station 01, and moreover, the communication station 05 which appears next sets the beacon transmission timing at a timing at approximately the center of the bacon intervals set by the communication station 02 and the communication station 04.

Note that there is also a usage method wherein the beacon transmission timings of each of the communication stations are placed in a concentrated manner, and the reception operations are stopped for the remainder of the super frame cycle, so as to reduce electric power consumption of the device. In this case, processing for concentrating the beacon transmission timings and so forth is performed between the communication stations performing communication, and beacons are concentrated at one place or multiple places within the super frame cycle, and transmitted.

Or, an arrangement may be made wherein the beacon transmission timing is set in accordance with a data transmission capacity unique to the communication station. In this case, communication stations with a great amount of transmission data can set the beacon transmission timing to a point-in-time such that the interval to the next beacon is long, and communication stations with little transmission data set the beacon transmission timing to a point-in-time such that the interval to the next beacon is short.

However, in order to prevent beacons from saturating the band (transmission frame cycle), a smallest beacon interval $B_{min}$ is stipulated, and placement of two or more beacon transmission timings within the $B_{min}$ is not permitted. For example, in a case wherein the minimum beacon interval $B_{min}$ is stipulated to 5 milliseconds in an 80-millisecond transmission frame cycle, only 16 communication stations can be contained in a range wherein airwaves reach.

Figure 4:
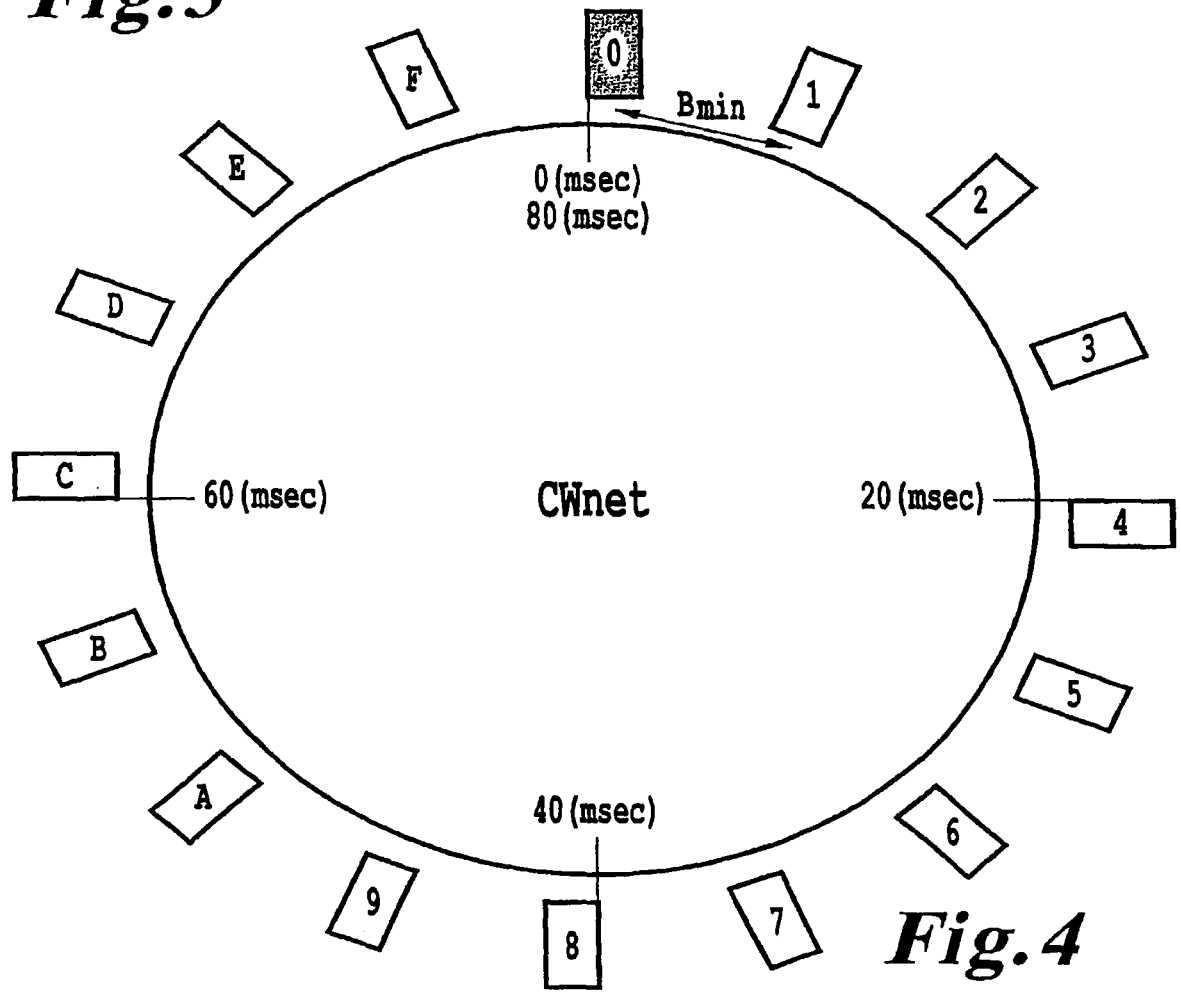
FIG. 4 is a diagram illustrating a configuration example of beacon transmission timings which can be placed within a super frame cycle.

FIG. 4 illustrates a configuration example of beacon transmission timing which can be placed within a super frame. Note that with the example shown in the drawing, the transition of time within the 80-millisecond super frame is represented as a clock where a needle moves on a circuit in the clockwise direction.

With the example shown in FIG. 4, a total of 16 positions 0 through F from 0 to F are configured as "slots" as points-in-time where beacon transmission can be performed, i.3., where beacon transmission timings can be placed. As described with reference to FIG. 3, beacon placement is performed following the algorithm wherein the beacon transmission timing of newly-participating stations are sequentially set at approximately the center timing of beacon intervals set by already-existing communication stations. In the event that $B_{min}$ is stipulated to 5 milliseconds, only up to 16 beacons can be placed in a single super frame. That is to say, no more than 16 communication stations can participate in the network.

Now, though not shown in FIG. 3 and FIG. 4, each beacon is transmitted at a point-in-time having a slight intentional time offset from the TBTT (Target Beacon Transmission Time) which is the transmission point-in-time of each beacon. This is referred to as "TBTT offset". With the present embodiment, the TBTT offset value is determined by a pseudo-random number. This pseudo-random number is determined by a uniquely defined pseudo random sequence TOIS (TBTT Offset Indication Sequence), with the TOIS being updated each super frame cycle.

Due to setting the TBTT offset, even in a case wherein two communication stations have placed the beacon transmission timing at the same slot in the super frame, the actual beacon transmission point-in-time can be shifted, so even though the beacons may collide in one super frame cycle, the communication stations can listen to each others beacons (or a neighboring communication station listen to both beacons) in another super frame cycle, so the communication stations can recognize that their beacons have collided. The communication stations include the TOIS to be set for each super frame cycle in the beacon information, and notify the nearby stations (to be described later).

Also, with the present embodiment, even in a case that the communication stations are in a power saving state wherein the electric power for the transmitting/receiving devices is to be turned off when data transmission/reception is unnecessary, and transmission/reception is not being performed, each communication station is required to perform reception operations for a predetermined period before and following transmission of signals from the local station, i.e., to perform communication operations for detecting collision called "Listen Before Send", "Listen After Send". Transmission signals as used here include both normal data frame transmission and beacon transmission.

Also, even in the case of not performing data transmission/reception, the communication stations are required to perform scanning operations by consecutively operating the receiving device over one super frame once every several seconds, to confirm whether there is no change in the presence of nearby beacons and whether there is no shifting on the TBTT of the nearby stations. Note that this scanning operation may be performed for detecting abnormal situations such as cases wherein detection is made that beacons or preferential transmission periods are colliding, communication is cut off during a certain preferential transmission period, and so forth (to be described later).

For the scanning operation, basically a full scan is performed wherein the reception device is operated consecutively throughout one super frame, but not necessarily restricted to this. For example a partial scan may be performed wherein the reception device is operated only within a "time span wherein a beacon is transmitted" which the communication station recognizes. With the present embodiment wherein beacon transmission timing placement is performed such as shown in FIG. 4, the time span wherein a beacon is transmitted means before/after or immediately after each TBTT, but is not restricted to this in the other embodiments.

Shifting in TBTT can be confirmed by receiving beacons of other stations and so forth. With the present embodiment, that stipulating within $-B_{min}/2$ milliseconds from the TBTT group recognized by the local station as TBTT is defined as being "fast", and that stipulating within $+B_{min}/2$ milliseconds as TBTT is defined as being "slow". The communication station corrects the point-in-time so as to match the slowest TBTT. Note however, that so long as the same rule is stipulated throughout the system, the point-in-time may be corrected so as to match the fastest TBTT. Thus, by all communication stations within the system setting the point-in-time to match the slowest (or fastest) TBTT, the corrected point-in-time is propagated over the network. Consequently, even communication stations which cannot directly communicate can share the same reference point-in-time.

B. Transmission Prioritized Period TPP

Though the communication stations transmit beacons a constant intervals, a station which has transmitted the beacon is provided preferential rights to transmission for a certain amount of time (e.g., 480 microseconds) following transmitting the beacon. FIG. 5 illustrates the way in which preferential rights are provided to a beacon transmitting station. With the present specification, this preferential section is defined as a Transmission Prioritized Period (TPP). Also, the remaining section of the super frame following the TPP is defined as a Fairly Access Period (FAP), and communication is performed by normal CSMA/CA between the communication stations during this period.

FIG. 6 illustrates the configuration of a super frame. As shown in the drawing, following beacon transmission from each communication station, a TPP is appropriated for the communication station which has transmitted that beacon, and following the duration of the TPP a FAP starts, with the FP ending at the beacon transmission from the next communication station.

Each communication station is permitted transmission in intervals of SIFS with regard to beacon and packet transmission within the TPP of the local station, and is permitted DIFS+backoff transmission for other packets. That is to say, each time a beacon is transmitted, an opportunity for preferentially transmitting data is obtained.

Also, while each communication basically transmits one beacon for each super frame cycle, in some cases, a communication station is permitted to transmit multiple beacons or beacon-like signals, and a TPP can be acquired each time these beacons are transmitted. In other words, a communication station can secure preferential transmission resources in accordance with the number of beacons transmitted per super frame. Now, a beacon which a communication station always transmits at the head of a super frame cycle will be called a "normal beacon", and the second and subsequent beacons transmitted at other timings or acquiring TPPs or other objects will be called "auxiliary beacons".

Figure 29:
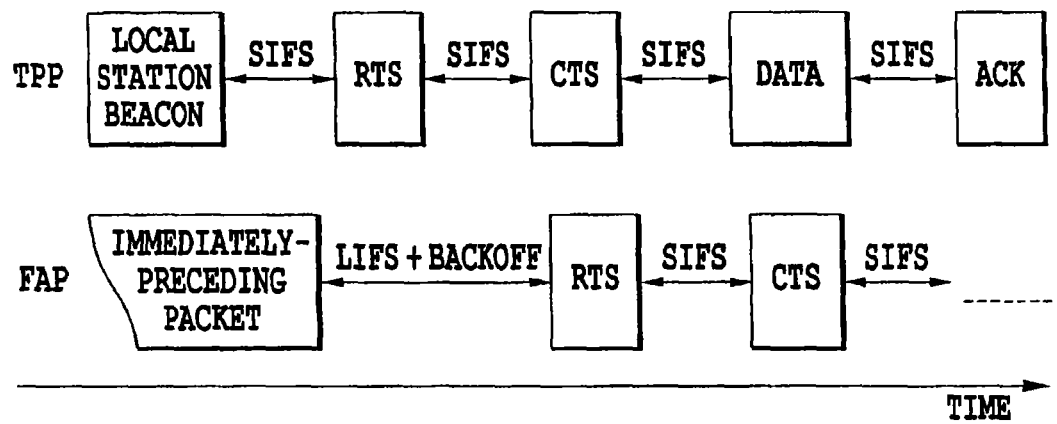
FIG. 29 is a diagram for describing operations for a communication station to start transmission in each of a TPP section and FAP section.

FIG. 29 illustrates the operations for a communication station to start transmission each of a TPP section and FAP section.

In a TPP section, following transmitting a beacon from the local station, a communication station can start transmission following a shorter bucket interval SIFS. In the example shown in the drawing, an RTS packet is transmitted from the beacon transmission station following the SIFS. The subsequently transmitted CTS, data, and ACK packets are also transmitted in SIFS frame intervals in the same way, so the series of communication procedures cannot executed without interruption from neighboring stations.

Conversely, with a FAP section, the beacon transmission station starts transmission after standing by for a LIFS+ random backoff, the same as with other nearby stations. In other words, all communication stations are uniformly provided with transmission rights by random backoffs. In the example shown in the drawing, following another station having transmitting a beacon, first, the media station is monitored for the duration of a DIFS, and in the event that the media is clear during this time, i.e., in the event that there are not transmission signals, a random backoff is performed, and further in the event that there are no signals transmitted during this time, a RTS packet is transmitted. Note that the series of packets of CTS, data, ACK, etc., transmitted owing to RTS signals, are transmitted at SIFS frame intervals, thereby allowing the series of transactions to be executed without being interrupted by neighboring stations.

According to the traffic management method of signals described above, transmission rights can be preferentially obtained by communication stations with higher order of preference setting shorter frame intervals.

However, the basic increment of a Transmission Prioritized Period TPP is fixed to a constant period equal to or smaller than the smallest beacon interval, and following this, transition is made to FAP, which is a period wherein all communication stations obtain communication rights under uniform conditions of common IFS and random backoff. Accordingly, in the event that a communication station needs a communication band exceeding the Transmission Prioritized Period TPP obtainable by one beacon transmission per super frame due to a request from the upper layer, the communication station can transmit auxiliary beacons besides the normal beacon for example, to further acquire TPPs. Note that in the event that the object is to secure band, consecutive arraying of Transmission Prioritized Periods TPPs is also permissible. In this case, TPPs can continue for a period exceeding the smallest beacon interval.

Figure 30:
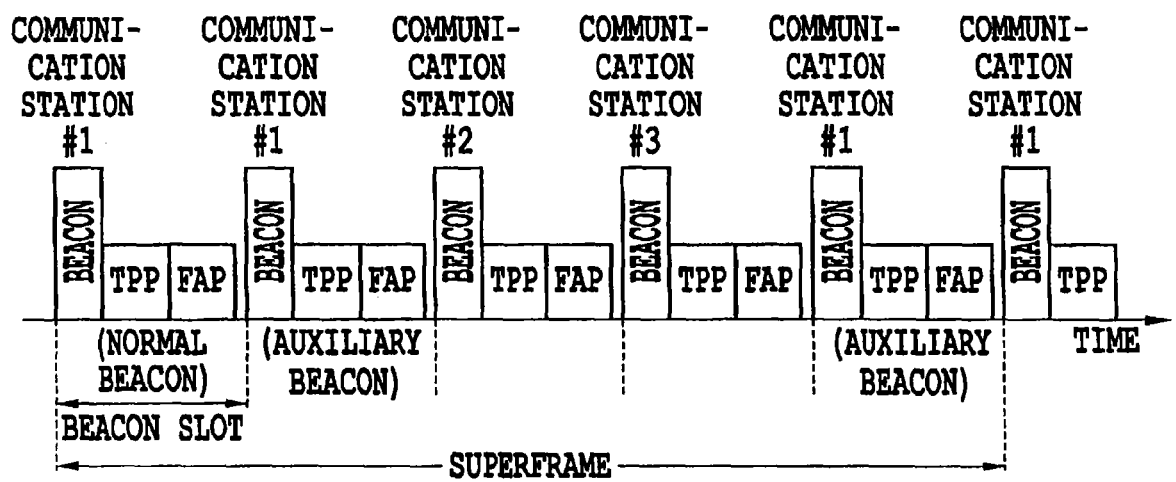
FIG. 30 is a diagram illustrating the manner in which a communication station increases preferential usage period by transmitting multiple virtual beacons called auxiliary beacons.

FIG. 30 illustrates the way in which a communication station transmits multiple virtual beacons called auxiliary beacons to increase the Transmission Prioritized Period. In the example shown in the drawings, the communication station #1 discovers a beacon slot open in the super frame and places its own auxiliary beacon there, thereby obtaining multiple TPPs in one super frame, in order to secure the communication band requested from the upper layer. Note that as described above, in FIG. 30 there are cases wherein the existing FAP is eliminated during the TPP of the communication station #1 with regard to sections wherein the communication station #1 has secured continuous TPPs, thereby using this a consecutive TPPs. In a system wherein a super frame is configured in an autonomously dispersed manner by exchange of NBOI information, an available beacon slot can be searched taking into consideration the hidden terminal problem, so the method for obtaining band using auxiliary beacons is simple.

Figure 31:
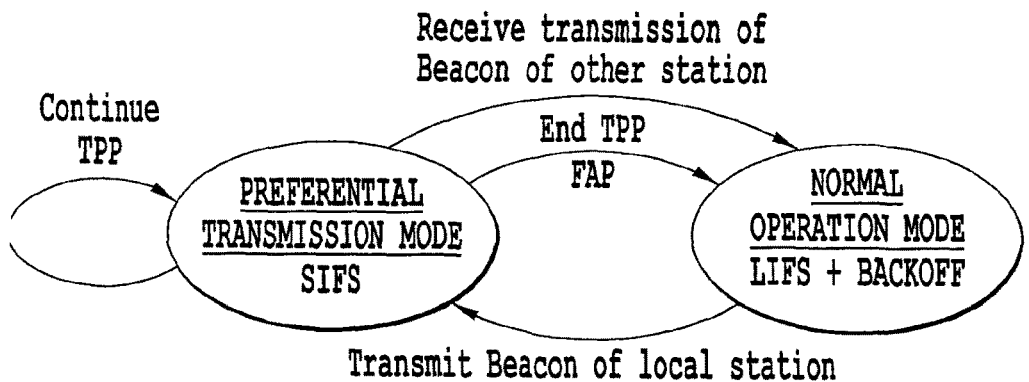
FIG. 31 is a diagram illustrating a state transition diagram of a wireless communication device operating as a communication station.

FIG. 31 is a state transmission diagram of a wireless communication device operating as a communication station in the present embodiment. In the example of the drawing, two states are defined; the "preferential transmission mode", equivalent to a TPP period wherein the local station has acquired preferential transmission rights, and the "normal transmission mode", equivalent to a FAP period wherein no local station has acquired preferential transmission rights.

Under the normal operation mode, the communication station starts transmission following standing by for PIFS+a random backoff.

Now, following the beacon transmission timing TBTT of the local station arriving and transmitting the beacon, the mode makes transition to the preferential transmission mode, whereby a Transmission Prioritized Period TPP is obtained.

In the preferential transmission mode, transmission rights can be acquired without interruption from neighboring stations, by transmitting in SIFS frame intervals.

The communication station continues in the preferential transmission mode for a Transmission Prioritized Period TPP of a length equivalent to the band amount required from the upper layer.

Then, upon the TPP ending and going to FAP, or upon receiving a beacon from another station, the mode returns from the preferential transmission mode to the normal operation mode.

Figure 32:
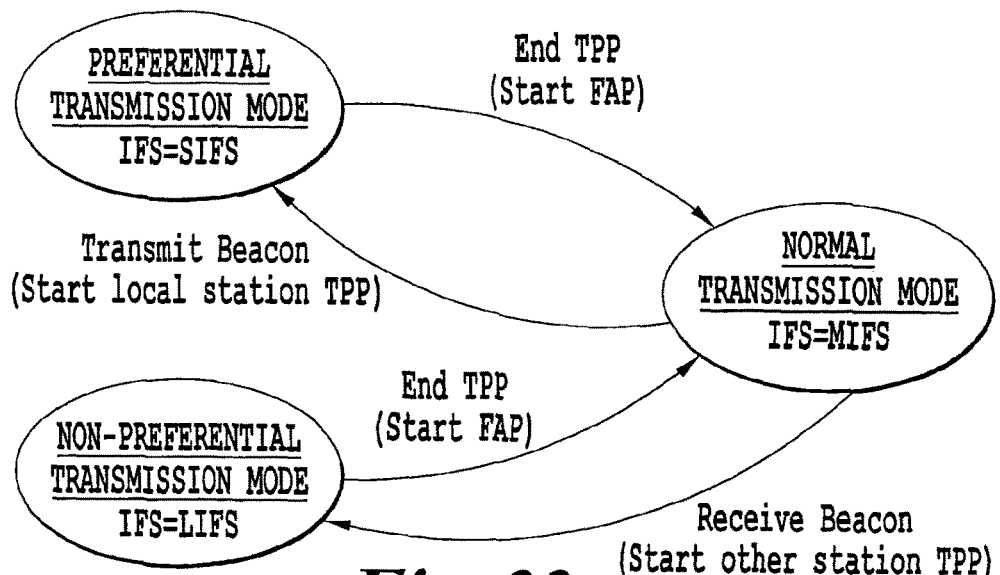
FIG. 32 is a diagram illustrating state transition of a wireless communication device operating as a communication station.

Also, FIG. 32 illustrates another example of the state transmission diagram of a wireless communication device operating as a communication station. In the example of the drawing, in addition to the "preferential transmission mode", equivalent to a TPP period wherein the local station has acquired preferential transmission rights, and the "normal transmission mode", equivalent to a FAP period wherein no local station has acquired preferential transmission rights, a "preferential transmission mode", equivalent to a Transmission Prioritized Period TPP of another station, is defined.

Under the normal operation mode, the communication station starts transmission following standing by for a normal frame period of PIFS plus a random backoff. During the FAP period, all communication stations within the system transmit according to PIFS+backoff.

Now, following the beacon transmission timing TBTT of the local station arriving and transmitting the beacon, the mode makes transition to the preferential transmission mode, whereby a Transmission Prioritized Period TPP is obtained.

In the preferential transmission mode, transmission rights can be acquired without interruption from neighboring stations, by transmitting with standby periods of SIFS which is frame intervals shorter than PIFS. The communication station continues in the preferential transmission mode for a Transmission Prioritized Period TPP of a length equivalent to the band amount required from the upper layer. Then, upon the TPP ending and going to FAP, the mode returns from the preferential transmission mode to the normal operation mode.

Also, upon receiving a beacon from another station and entering the preferential transmission period of that station, the mode makes transition to a non-preferential transmission mode. In the non-preferential transmission mode, transmission is started following standing by for a period wherein a random backoff is added to DIFS which is a frame interval even longer than the PIFS frame interval in the normal transmission mode.

Upon the TPP of the other station ending and making transition to FAP, the mode returns to the normal transition mode.

Note that while an example has been described above wherein a communication station consecutively attempts transmission in DIFS frame intervals during TPP periods of nearby stations as well, there are cases wherein no transmission is attempted during TPP periods of other stations, and the communication station goes into a power saving state by turning off the power or the like. Also, rather than consecutively attempting transmission in DIFS frame intervals, examples of application include attempting transmission following confirmation of the TPP being released by other means.

While normal beacons are transmitted for network configuration, auxiliary beacons are transmitted in order to acquire Transmission Prioritized Periods TPPs, so there is no need for all information included in a normal beacon (described later) to be described in an auxiliary beacon. Accordingly, there are cases wherein only information relating to TPP acquisition is included in the auxiliary beacon. In an extreme example, an auxiliary beacon can be configured of one bit (or around several bits) of information to the effect that the signal is being transmitted upon acquisition of a TPP.

Also, in an autonomously dispersed communication system, a framework for realizing Transmission Prioritized Period TPP acquisition by communication stations can be realized even without using auxiliary beacons. With a system wherein auxiliary beacons are not used, network operations (collusion avoiding operations) the same as those of a case of using auxiliary beacons to notify that a Transmission Prioritized Period TPP has been acquired can be realized by describing, in a part of the signals transmitted upon the communication station having obtained a Transmission Prioritized Period TPP, a message to the effect that the signals are being transmitted using a Transmission Prioritized Period TPP. The details of this point will be described later. The communication stations notify each other of the reception/transmission timing of each other within the super frame, based on beacon signal notification or description in a part of the signals such as the data frame, and randomly access the media by CSMA procedures in an autonomously dispersed manner, while realizing loose time-division multiple access.

While an example has been illustrated here wherein the beacon transmitting station starts the TPP immediately following beacon transmission, there is no need to be restricted to this, and an arrangement may be made wherein a TPP starting point-in-time is set at a relative position (point-in-time) from the beacon transmission point-in-time, for example.

Also, while description has been made in the above description that preferential transmission rights are provided only to the communication station during TPP, but the communication station called up by the communication station during TPP is also provided with a Transmission Prioritized Period TPP. Basically, transmission is given preference with TPP, but in the event that it is known that the local communication station has nothing to transmit but another station has information which it wants to transmit to the local station, a paging message or a polling message may be sent to the "other station".

On the other hand, in the case that the local station has transmitted a beacon but has nothing to transmit and does not know whether other stations have information to be transmitted to the local station, this communication station does not perform communication operations, relinquishes the preferential transmission rights granted by the TPP, and transmits nothing. As a result, another station start transmission in this TPP time span, following elapsing of a DIFS+ backoff or PIFS+backoff.

Taking into consideration the fact that TPPs immediately follow transmission of beacons as shown in FIG. 6, an arrangement is more preferable wherein the beacon transmission timings of the communication stations are scattered uniformly throughout the transmission frame cycle rather than an arrangement wherein the beacon transmission timings are concentrated, from the perspective of transmission efficiency. Accordingly, with the present embodiment, beacon transmission is basically started at approximately the center of the longest time span of beacon intervals in the range that can be heard by itself. Of course, there is also a usage method wherein the beacon transmission timings of the communication stations are placed in a concentrated manner and the reception operations are stopped in the remaining transmission frame cycle, so as to reduce the power consumption of the devices.

In the behavior at the time of collision in the wireless network according to the present embodiment, generally the same principle can be applied for beacon collision avoidance operations with regard to collision of normal beacons one with another, collision of normal beacons and auxiliary beacons, and collision of auxiliary beacons one with another. Moreover, signals periodically transmitted each super frame (data frames and so forth) by acquiring Transmission Prioritized Periods TPPs can also be handled in the same way as beacons with regard to collision detection and collision avoidance operations, due to the nature of being transmitted and received in super frame intervals. For example, the same advantages can be obtained with regard to processing of collision of Transmission Prioritized Periods with no auxiliary beacon transmission as well, by collision detection and collision avoidance procedures the same as with the case of beacons. Accordingly, in the following, collision of auxiliary beacons and Transmission Prioritized Periods TPPs, in addition to normal beacons, will be described as beacon collision, for the sake of ease of description.

C. Frame Format of Beacon

FIG. 7 illustrates an example of the format of a beacon frame transmitted with the autonomously dispersed wireless communication system according to the present embodiment.

With the example in the drawing, a beacon includes a TA (Transmitter Address) field, which is an address, uniquely indicating the originating station, a Type field indicating the type of the beacon, a NBOI/NBAI (Neighboring Beacon Offset Information/Neighboring Beacon Activity Information) field which is reception point-in-time information of beacons receivable from nearby stations, a TOIS (TBTT Offset Indication Sequence) field which is information indicating the TBTT offset value (Described above) in the super frame cycle in which the beacon has been transmitted, an ALERT field for storing TBTT changes and other sorts of information which should be passed on, a TxNum field which indicates the amount of resources which the communication device has secured preferentially, and a Serial field indicating an exclusive and unique serial No. assigned to the beacon in a case of transmitting multiple beacons within the super frame cycle.

In the Type field is described the type of the beacon in an 8-bit length bitmap format. With the present embodiment, whether the beacon is a "normal beacon" which the communication station transmits just once at the head of each super frame or an "auxiliary beacon" transmitted for obtaining preferential transmission rights, is indicated with values from 0 through 255 indicating priority, as information for identifying which the beacon is. Specifically, in the case of a normal beacon, which must be transmitted once every super frame, 255 indicating the greatest priority is assigned, and for auxiliary beacons, one of the values of 0 through 254 which is equivalent to the priority of the traffic, is assigned.

With a system wherein auxiliary beacons are not used, the Type field can be described in a part of the signals, to indicate the priority of reservation or preferential usage of signals (data frame or the like) periodically transmitted, in which the reserved usage period or a preferential usage period TPP is set.

The NBOI field is information describing the position (reception point-in-time) of beacons of nearby stations which the local station is capable of receiving in the super frame. With the present embodiment, information relating to the placement of the received beacon is described in a 16-bit length bitmap format, since a maximum of 16 slots for placing beacons are provided within a super frame, as shown in FIG. 4. That is to say, the normal beacon transmission point-in-time is mapped to the head bit (MSB) of the NBOI field as a reference, the positions (reception points-in-time) of beacons which the local station is capable of receiving are mapped to bits at relative positions from the normal beacon transmission point-in-time of the local station, 1 is written to bits corresponding to the normal and auxiliary beacon relative position (offset) and relative position (offset) of receivable beacons, and the bit positions corresponding to other relative positions are left at 0.

For example, under a communication environment wherein a maximum of 16 communication stations 0 through F are contained as shown in FIG. 4, in the event that a communication station 0 creates an NBOI field of "1100, 0000,0100,0000", this indicates that "beacons of communication station 1 and communication station 9 are receivable". That is to say, 1 is marked in the event that a beacon is receivable with regard to a bit corresponding to the relative position of a receivable beacon, and 0, i.e., a space, is assigned in the case that this is not received. Also, the reason that the MSB is 1 is that the local station transmits beacons, and 1 is also marked at the position matching the point-in-time of the local station transmitting auxiliary beacons as well.

Also, while the description above has been made assuming that the NBOI field is transmitted and received in a bitmap format corresponding to the point-in-time in the super frame, configuring the NBOI field in a bitmap format is not necessarily indispensable, and the object of the present invention can be achieved with an arrangement wherein this is configured of an information group indicating which time span in the super frame is used for communication, and is ultimately transmitted and received in a format such that the above-described processing can be performed.

Also, while description above has been made that the relative positions (points-in-time) of the transmitted and received beacons are marked, the point-in-time of the preferential transmission period can also be marked in the NBOI as a matter of course, whereby, in addition to detection of beacons one with another, collision of signals which are periodically transmitted using the Transmission Prioritized Period TPP with beacons, and collision of signals which are periodically transmitted one with another, can also be detected.

Also, the NBAI field is for reducing hidden terminals with regard to beacon reception; the NBAI field is set in the frame format of the beacon, and information identifying "beacons which the local station actually performs reception processing for" is described in the same format as the NBOI field. The NBAI field has bits placed based on the transmission point-in-time of the normal beacon of the local station in the same format as with the NBOI field, and information for identifying the TBTT which the local station actual performs reception processing for is described in bitmap format.

The communication stations do not receive beacons of other stations in the sleep mode state. Accordingly, in the sleep mode state, beacons are transmitted in the state that all zeroes are set to the NBAI bits (except for the point-in-time of the local station performing beacon transmission). On the other hand, upon the communication station entering a communication state with another station, operations for receiving normal beacons of the nearby stations are performed. In this case, beacons are transmitted in the state of ones set to the NBAI bits corresponding to the reception points-in-time (TBTT) of the normal beacons of the nearby stations.

In the event that a nearby station is transmitting an auxiliary beacon, 1 is set to the NABI bit corresponding to the reception point-in-time (TBTT) of the auxiliary beacon received, only in the event that the preferential transmission with the auxiliary beacon is determined to be made to the local station. Whether the preferential transmission with the auxiliary beacon is being made to the local station or not is determined based on whether or not a communication state has been established with the communication station transmitting the auxiliary beacon.

Further, in the event that the recipient of data transmitted in the TPP accessory to the auxiliary beacon for each auxiliary beacon is specified by some sort of means, the NBAI bit corresponding to the reception point-in-time (TBTT) of the auxiliary beacon is set to 1 only for an auxiliary beacon wherein the recipient of the data is determined to be the local station. That is to say, the communication station determines whether or not to set the NBAI bit to 1, according to whether or not the auxiliary beacon transmitted on the time span and the signal transmitted by the other station using TPP are transmitted to the local station (i.e., whether or not the local station needs to receive the signals).

On the other hand, the station which has received the beacon obtains an OR of the NBAI bits in the received beacon by shifting according to the beacon reception point-in-time according to the same procedures for compiling the Rx NBOI Table (described above), and determines whether or not to perform transmission forbidden processing in each TBTT set in the super frame.

In the event that the OR of the NBAI bit is 1, the communication station sets from the TBTT point-in-time or a point-in-time slightly prior to that through a certain period stipulated by the maximum length of TBTT offset+beacon length to a transmission forbidden state, so as to not obstruct beacon reception of other stations. However, in the event that the TBTT is the beacon transmission point-in-time of the local station, transmission forbidden processing is not performed, and the frame including beacon information is transmitted.

The TOIS field stores a pseudo-random sequence for determining the above-described TBTT offset, and indicates how much of a TBTT offset the beacon is being transmitted with. Providing a TBTT offset enables actual beacon transmission point-in-time to be shifted even in the event that two communication stations set beacon transmission timings to the same slot in a super frame, so even though the beacons may collide in one super frame cycle, the communication stations can listen to each others beacons (or a neighboring communication station listen to both beacons) in another super frame cycle, so the communication stations can recognize that their beacons have collided.

FIG. 8 shown the TBTT and actual beacon transmission point-in-time. As shown in the drawing, in the event that the TBTT offset is defined as being one point-in-time of TBTT, TBTT+20 microseconds, TBTT+40 microseconds, TBTT+60 microseconds, TBTT+80 microseconds, TBTT+100 microseconds, and TBTT+120 microseconds, which TBTT offset will be used for transmission is determined each super frame cycle, and the TOIS is updated.

Also, in the event that transmission cannot be performed at the point-in-time that the communication station intended, due to detection of collision with signals form another station or the like, all zeroes or the like are stored to the TOIS, and transmission is made to nearby stations capable of receiving beacons to the effect that the beacon transmission timing this time could not be performed at the intended point-in-time. Specific usage forms of the TOIS field will be described later.

The ALERT field stores information to be transmitted to nearby stations in an abnormal state. For example, in the event that there are plans to change the normal beacon TBTT to avoid beacon collision or the like, or in the event of requesting stopping of auxiliary beacon transmission to a nearby station, a description is made in the ALERT field to that effect. Specific usage forms of the ALERT field will be described later.

The number of auxiliary beacons which the station is transmitting in the super frame cycle is described in the TxNum field. Since the communication station is given a TPP, i.e., preferential transmission rights, following beacon transmission, the number of auxiliary beacons within the super frame cycle is equivalent to the percentage of time wherein resources are preferentially secured and transmission is performed.

The serial No. assigned to the beacon in a case of transmitting multiple beacons within the super frame is written to the Serial field. An exclusive and unique number is described for each of the beacons transmitted within the super frame, as serial Nos. of beacons. With the present embodiment, relative point-in-time information indicating what number in order TBTT the auxiliary beacon is being transmitted at, based on the normal beacon of the local station, is described in the Serial field as the serial No.

While normal beacons are transmitted for network configuration, auxiliary beacons are transmitted in order to acquire Transmission Prioritized Periods TPPs, so there is no need for all information included in a normal beacon (described later) to be described in an auxiliary beacon. Accordingly, there are cases wherein only information relating to TPP acquisition is included in the auxiliary beacon.

Also, with a system wherein auxiliary beacons are not used, collision of signals which are periodically transmitted/received using the Transmission Prioritized Period TPP with beacons, and collision of signals which are periodically transmitted/received one with another, can be handled in the same way as with collisions of beacons one with another, and periodically transmitted/received signals one with another, by describing, in a part of the signals transmitted upon the communication station having obtained a Transmission Prioritized Period TPP, information the same as that of the normal beacon.

For example, in the event of setting priority for Transmission Prioritized Period TPP, there is the need to include the Type field in auxiliary beacons and signals transmitted periodically using the Transmission Prioritized Period as well.

Also, in the case of providing a random offset to the transmission timing of signals transmitted periodically using the Transmission Prioritized Period TPP and in the case of employing a mechanism for changing the transmission timing of periodically transmitted/received signals to avoid collision, there is the need to include a TOIS field in auxiliary beacons and signals transmitted periodically using the Transmission Prioritized Period as well.

Also, in cases wherein the communication stations are to notify each other of the relative point-in-time position of the transmission timing of signals transmitted periodically using the Transmission Prioritized Period TPP as to the normal beacon (offset from the normal beacon), in order to detect collision with a beacon, there is the need to include a Serial field in auxiliary beacons and signals transmitted periodically using the Transmission Prioritized Period as well.

D. TBTT Settings for Normal Beacon

After turning on the electric power, a communication station first performs a scanning operation, i.e., attempts signal reception continuing over the duration of a super frame or longer, and confirms the presence of beacons transmitted by nearby stations. In the event that no beacons are received from nearby stations in this process, the communication station sets an arbitrary timing as the TBTT timing. On the other hand, in the event of receiving a beacon transmitted from nearby stations, the logical sum (OR) of the NBOI fields of the beacons received from the nearby stations is taken and referred, and finally a beacon transmission timing is extracted from a timing equivalent to a bit position which is not marked.

Basically, the communication station obtains the preferential usage period (TPP) immediately following transmission of beacon, so an arrangement is more preferable wherein the beacon transmission timings of the communication stations are scattered uniformly throughout the super frame cycle, from the perspective of transmission efficiency. Accordingly, based on the results of the OR of the NBOIs obtained from the beacons received from the nearby stations, the center of the section where the run length of the space is the longest is determined as the beacon transmission timing.

Now, in the event that the TBTT interval wherein the run length is longest, is smaller than the minimum TBTT interval (i.e., equal to or smaller than $B_{min}$), new communication stations cannot participate in this system.

Also, in another embodiment, there are cases wherein the beacon transmission point-in-time TBTT of the local station is set to an adjacent point-in-time, such as immediately following a beacon already transmitted, according to communication attributes and so forth. In this case, processing is added such as taking into consideration ordering of the beacon transmission points-in-time among the communication stations which are to actually perform communication.

Figure 9:
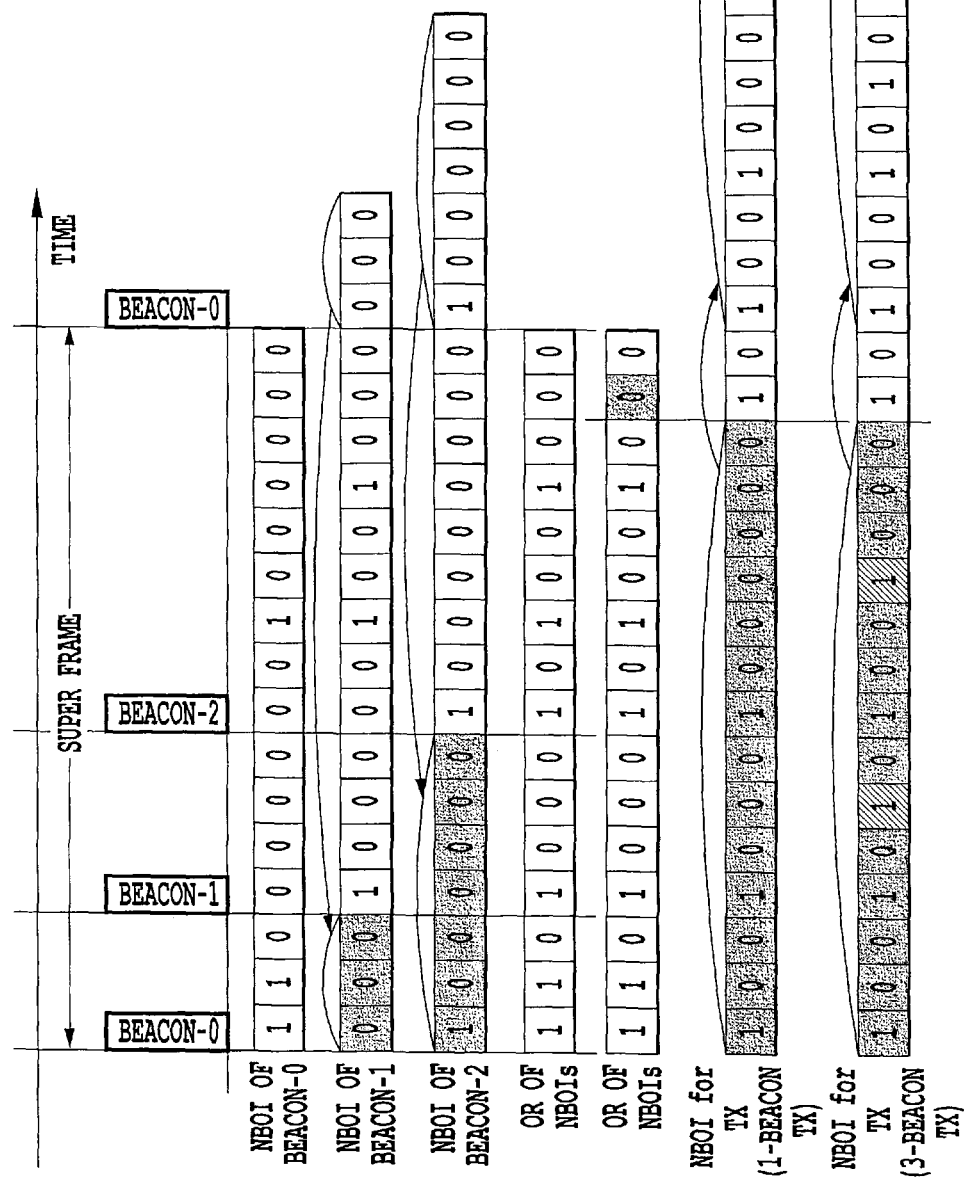
FIG. 9 is a diagram for describing procedures for a newly-participating communication station to set TBTTs for itself based on the NBOIs of beacons obtained from beacons received from nearby stations.

FIG. 9 illustrates the way in which the TBTT of a communication station newly participating is set based on the NBOIs of the beacons received from nearby stations. The example shown in the drawing is described from the perspective of a newly-appearing communication station A, with a communication environment wherein nearby the communication station A are a communication station 0, communication station 1, and communication station 2. Let us say that the communication station A is capable of receiving beacons from the three stations 0 through 2 within a super frame by performing a scanning operation.

The beacon reception points-in-time of the nearby stations are handled as relative positions to the normal beacon of the local station, which is described in the NBOI field in bitmap format (described above). At the communication station A, the NBOI fields of the three beacons received from the nearby stations are shifted according to the reception point-in-time of the beacons so as to match the corresponding bit position on the time axis, and the OR is obtained of the NBOI bits for each timing, thereby integrating the NBOIs for reference.

The sequence obtained as a result of integrating and referencing the NBOI files of the nearby stations is "1101, 0001,0100,1000" indicated by "OR of NBOIs" in FIG. 9. 1 indicates the relative position of a timing regarding which a TBTT has already been set in the super frame, and 0 indicates the relative position of a timing regarding which a TBTT not yet been set. In this sequence, the place where the spaces (zeroes) form the longest run length is a candidate for placing a new beacon. With the example shown in FIG. 9, the longest run length is 3, so there are two candidates. The communication station A has set of these the 15th bit as the normal beacon TBTT for itself.

The communication station A sets the point-in-time of the 15th bit as the normal beacon TBTT for itself (i.e., head of the super frame for itself), and starts beacon transmission. At this time, the NBOI field which the communication station A transmits lists the reception points-in-time of the beacons of the communication stations 0 through 2 from which beacon reception can be made in a bitmap format wherein bit positions equivalent to relative positions from the transmission point-in-time of the normal beacon of the local station are marked. This is as indicated by "NBOI for TX (1 Beacon TX)" in FIG. 9.

At the time of the communication station A obtaining preferential transmission rights by transmission of an auxiliary beacon or the like, the longest run length of spaces (zeroes) in the sequence indicated by "OR of NBOI" obtained by integrating the NBOI fields of the nearby stations is then further searched, and the transmission point-in-time of the auxiliary beacon (Transmission Prioritized Period) is set to the place of the spaces that has been found.

In the example shown in FIG. 9, a case is assumed for transmitting two auxiliary beacons (i.e., acquiring two Transmission Prioritized Periods), and the auxiliary beacon transmission timings (setting timings for Transmission Prioritized Periods) are set to the points-in-time of the 6th bit and 11th bit of the "OR of NBOIs". In this case, the NBOI field which the communication station A transmits is further marked at the place where the local station performs auxiliary beacon transmission (relative position to the normal beacon) in addition to the normal beacon of the local station and the relative positions of the beacons received from the nearby stations, as shown in NBOI for TX (3 Beacon TX)".

In the event of the communication stations each setting their own beacon transmission timing TBTTs with the above-described processing procedures and transmitting beacons, beacon collision can be avoided under conditions that the communication stations are stationary and that the range of reach of the airwaves does not change. Also, QoS communication can be provided wherein resources are preferentially allocated to communication between certain communication stations for a certain time span, by setting Transmission Prioritized Periods by transmitting auxiliary beacons (or signals like multiple beacons) within the super frame according to the order of preference of the transmission data. Also, each communication station can autonomously know the degree of saturation of the system by referring the number of beacons (NBOI field) received from the nearby stations, so preferential traffic can be contained while taking into consideration the degree of saturation of the system at each communication station, even though the system is autonomously controlled. Further, the beacon transmission points-in-time are placed so as to not collide, due to the communication stations referring to the NBOI files of the received beacons, so frequent collision can be avoided even in cases wherein multiple communication stations contain preferential traffic.

E. Beacon Collision Scenarios and Collision Avoidance Procedures

Under the conditions that the communication stations are stationary and that the range of reach of the airwaves does not change, beacon collision can be avoided (described above). Conversely, if the range of reach of the airwaves changes due to the communication stations moving or the like, there will be cases wherein the beacons transmitted from the communication stations collide.

FIGS. 10A-10D illustrate the way in which beacons collide due to change in the range of reach of the airwaves. The drawings illustrate a case wherein systems configuring networks approach each other.

Figure 10A:
FIGS. 10A-10D are diagrams illustrating the way in which beacons collide due to change in the range of reach of airwaves.
Figure 10B:
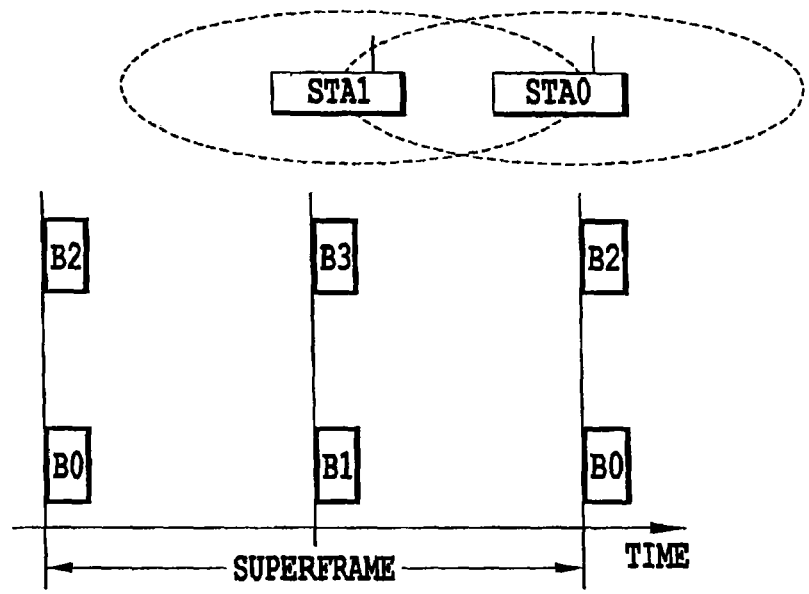

At FIG. 10A, communication stations the STA0 and the STA1 exist in a range where airwaves from communication stations the STA2 and the STA3 cannot reach, with the STA0 and the STA1 performing communication. Also, the STA2 and the STA3 perform communication completely independent from these. In this case, the beacon transmission timings are set for each communication station in a independent manner for each system, but as shown in FIG. 10B, beacon transmission timings which unfortunately match have been set between the stations which do not recognize each other.

Figure 10C:
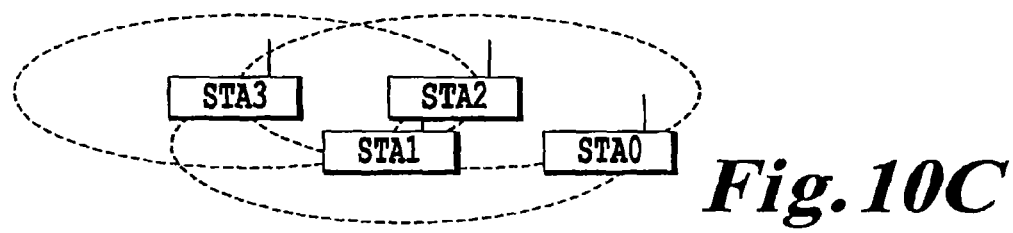
Figure 10D:
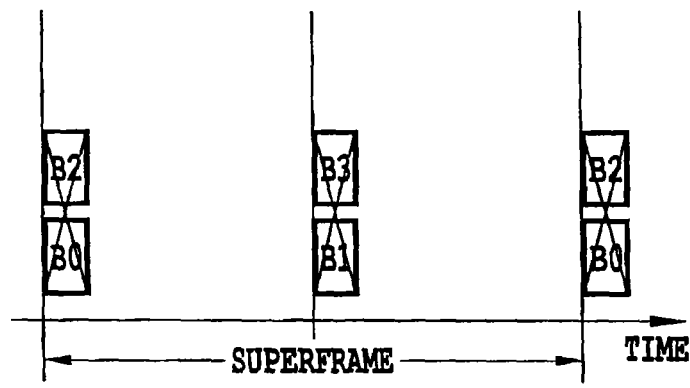

Subsequently, upon (the range of reach of the airwaves of) the communication stations moving to where each of the communication stations can transmit/receive, as shown in FIGS. 10C-10D, a situation occurs in which the beacons of the stations collide.

Figure 11:
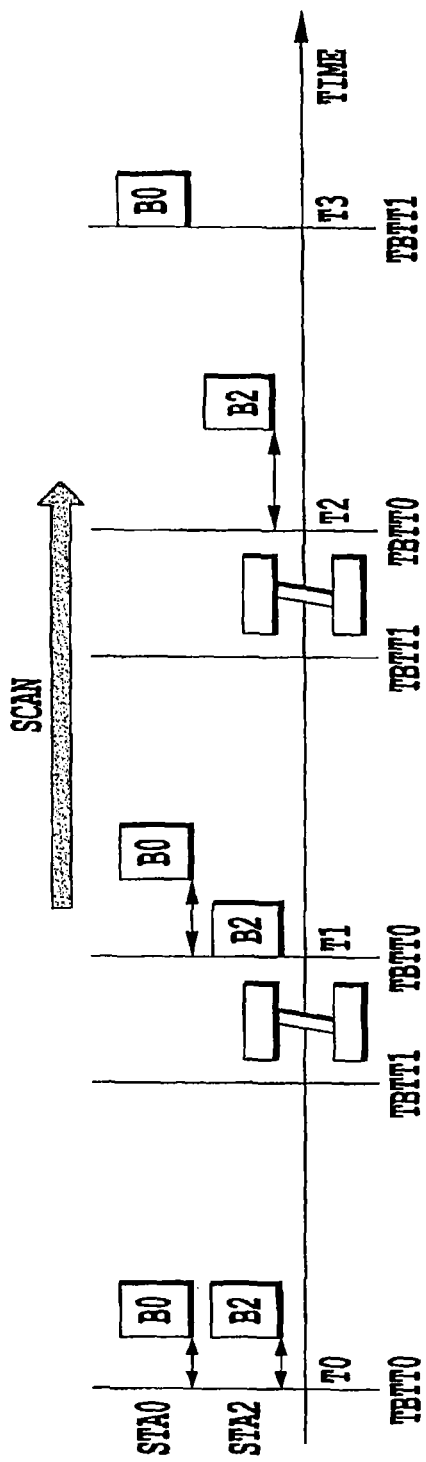
FIG. 11 is a diagram illustrating an example of TBTT changing procedures.

In such a case, there is the need for at lease one of the stations which has caused the collision to change the beacon transmission point-in-time to avoid collision. FIG. 11 shows an example of collision detection and TBTT changing procedures. The example shown here is a case wherein the TBTT of the beacon transmitted by the STA0 and the TBTT of the beacon transmitted by the STA2 have perfectly matched the point-in-time TBTT0.

At point-in-time T0, the beacon transmission TBTT for both the STA0 and the STA2 arrives, so each transmit beacons at a point-in-time shifted from the point-in-time T0 by a TBTT offset. At point-in-time T0, the TBTT offset of the STA0 and the TBTT offset of the STA2 happen to be the same, so the beacons collide, and neither the STA0 nor the STA2 is capable of detecting that the beacons are colliding. It should be noted that the communication stations are not capable of activating transmission operations and reception operations simultaneously.

The next super frame comes, and the TBTT for both the STA0 and the STA2 arrives at point-in-time T1, so beacon transmission processing is activated again. Now, let us say that while the TBTT offset at the STA2 is zero, the TBTT offset selected at the STA0 is a relatively large value. By shifting the actual beacon transmission point-in-time by TBTT offset, even though the beacons may collide in one super frame cycle, the communication stations can listen to the beacons of each other in another super frame cycle.

In the example shown in the drawing, the STA0 operates the receiving device before and after beacon transmission, and accordingly can recognize that the STA2 is transmitting beacons at a TBTT point-in-time close to that of itself. In the same way, the STA2 operates the receiving device before and after beacon transmission, and accordingly can recognize that the STA0 is transmitting beacons at a TBTT point-in-time close to that of itself. Whether or not a beacon has been received close to the TBTT of it self is determined based on whether or not a beacon has been received within the range of the local beacon TBTT±$B_{min}$/2.

Now, the STA0 determines to change its own TBTT, i.e., beacon transmission position, the reason being that a beacon of another station has been received immediately prior to transmission of its own beacon. On the other hand, at the STA2, a beacon of another station has been received close to the TBTT point-in-time of its own beacon, but the beacon was received following transmission of its own beacon, so no TBTT change is performed.

Also, even in the event that the STA0 and the STA2 are not performing data transmission/reception and are in a power saving state, both are required at the time of signal transmission to perform reception operations for a predetermined period before and following transmission of signals from the local station, i.e., Listen Before Send and Listen After Send, and such reception operations enable the communication stations to recognize the beacons of each other.

In the case of changing the beacon transmission position, the STA0 makes notification to the nearby stations that it is going to change the TBTT, using the ALERT field of the beacon to be transmitted (the alert field is a field for storing information to be transmitted to the nearby stations in an abnormal situation). Further, the STA0 executes scanning for at least one super frame, to collect information for determining the new TBTT.

With the example shown in FIG. 11, the STA0 recognizes beacon collision near the point-in-time T1, and immediately activates TBTT changing processing, but this processing may be executed after a delay of one or two super frames, due to delay in processing within the communication station.

Upon the STA0 finding an available TBTT by the procedures described with reference to FIG. 9, the TBTT 1 is set as the new TBTT, and does not perform beacon transmission at point-in-time T2 but instead performs beacon transmission at point-in-time T3 instead, and subsequently performs beacon transmission at the timing of TBTT1 with a TBTT offset.

On the other hand, the STA2 transmits its beacon at point-in-time T2 as if nothing had happened, and subsequently continues to transmit its beacon at the timing of TBTT0 with a TBTT offset. With the example shown in FIG. 11, the STA2 does not change TBTT, but there are cases wherein the STA2 performs scanning processing to know the state of the network, having recognized that the networks have crossed from reception of the beacon of the STA0.

In the event that a communication station recognizes a beacon notifying in the ALERT field that the TBTT is to be changed, or recognizes that no beacon is being transmitted near the TBTT of beacons received so far, a scan is executed to tell where the new TBTT of the beacon has been determined at (not shown).

Figure 12:
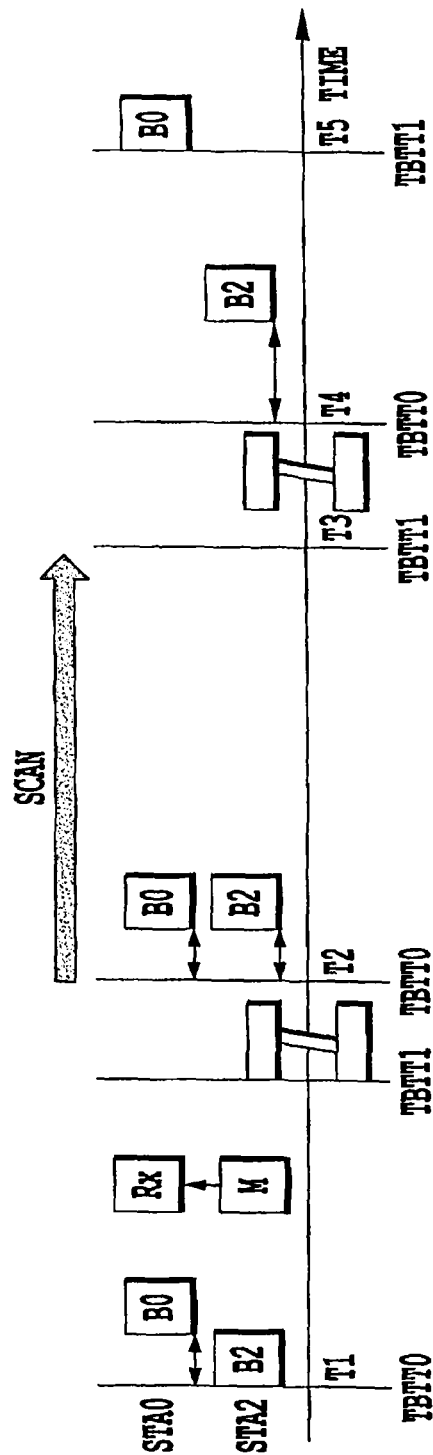
FIG. 12 is a diagram illustrating a modification of the TBTT changing procedures shown in FIG. 11.

Also, an arrangement may be made wherein, at the time of reception of a beacon of another station immediately following the beacon transmission point-in-time of the local station, a request is made to the originator of the beacon received immediately following to change the beacon transmission point-in-time. FIG. 12 illustrates an example of TBTT changing procedures wherein one station of colliding beacons sends a beacon transmission point-in-time changing request to the other station.

Upon the TBTT for both the STA0 and the STA2 arriving at point-in-time T1, beacon transmission processing is activated for both. Now, let us say that while the TBTT offset at the STA2 is zero, the TBTT offset selected at the STA0 is a relatively large value. In this case, the STA0 operates the receiving device before and after signal transmission such as beacons, and accordingly can recognize that the STA2 is transmitting beacons at a TBTT point-in-time close to that of itself. In the same way, the STA2 operates the receiving device before and after beacon transmission, and accordingly can recognize that the STA0 is transmitting beacons at a TBTT point-in-time close to that of itself.

Now, the STA2 transmits a message to the STA0 "to the effect of you are requested to change your TBTT". The STA0 operates the receiving device for a certain while before and following signal transmission such as a beacon even in a power saving state (described above), and accordingly can receive this message.

In response to having received a TBTT change request message, the STA0 makes notification to the nearby stations to the effect that the TBTT will be changed, using the ALERT field of the beacon transmitted. Further, the STA0 executes scanning for at least one super frame, to collect information for determining the new TBTT.

Upon the STA0 finding an available TBTT by the procedures described with reference to FIG. 9, the TBTT 1 is set as the new TBTT, and does not perform beacon transmission at point-in-time T4 but instead performs beacon transmission at point-in-time T5 instead, and subsequently performs periodic beacon transmission at the timing of TBTT1 with a TBTT offset.

On the other hand, the STA2 transmits its beacon at point-in-time T2 as if nothing had happened, and subsequently continues to transmit its beacon at the timing of TBTT0 with a TBTT offset. With the example shown in FIG. 12, the STA2 does not change TBTT, but there are cases wherein the STA2 performs scanning processing to know the state of the network, having recognized that the networks have crossed from reception of the beacon of the STA0.

Note that with the above-described processing, the rule is that at the time of beacons colliding, a communication station which has received a beacon from another station immediately prior to its own beacon transmission point-in-time is to change its own beacon transmission point-in-time, however, a reverse arrangement may be made wherein a communication station which has received a beacon from another station immediately following its own beacon transmission point-in-time is to change its own beacon transmission point-in-time.

Next, operations relating to a communication station detecting collision of signals in an autonomously dispersed wireless network according to the present embodiment will be described in further detail. FIG. 33 through FIG. 37 illustrate several examples of collision detecting procedures with regard to an example wherein beacons have collided between communication stations which are transmitting and receiving data. Following detection of collision, the already-described procedures are used to activate the TBTT changing procedures as necessary.

Figure 33:
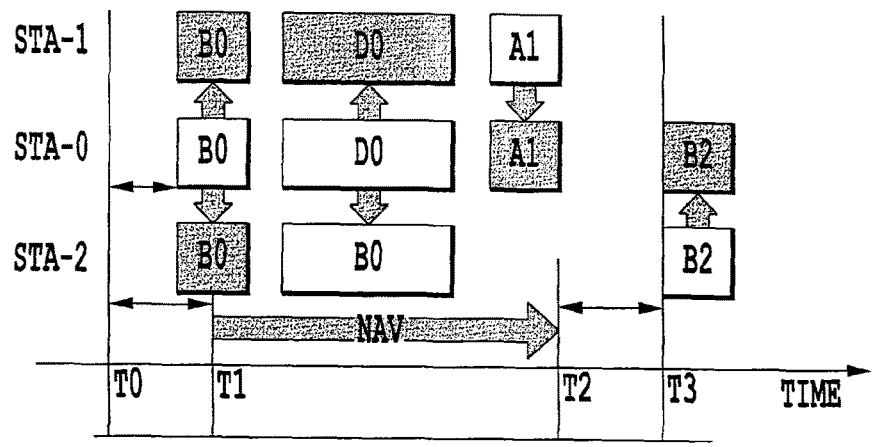
FIG. 33 is a diagram for describing collision detection means in a case wherein beacons of communication stations transmitting and receiving data have collided.

FIG. 33 illustrates an example of a case wherein the beacon transmission point-in-time have collided between the STA0 and the STA2, while the STA0 is continuing to transmit data to the STA1.

Upon the TBTT for both the STA0 and the STA2 arriving at point-in-time T0, beacon transmission processing is activated for both. Now, let us say that the TBTT offset selected at the STA2 is a relatively larger value that the TBTT offset of the STA0.

The STA0 transmits the beacon as planned (B0 in the drawing). Since the STA2 operates the receiving device before and after beacon signal transmission, it can recognize that the STA0 is transmitting beacons at a TBTT point-in-time close to that of itself. Further, the STA2 follows CSMA/CA procedures to set a NAV while signals of other stations are present, and refrains from signal transmission. Consequently, even in the event that there was a schedule to transmit a beacon at point-in-time T1, this is delayed.

The STA0 continues to transmit data to the STA1 (D0 in the drawing). The duration to the point-in-time of receiving the ACK is written to the Duration field for the data for the purpose of virtual carrier sense, and the STA2 interprets this an refrains from transmitting signals until the point-in-time T2.

Subsequently, the STA2 makes transition to a signal transmittable state following elapsing of PIFS (or SIFS)+a random delay amount from point-in-time T2, and transmits a beacon at point-in-time T3 (B2 in the drawing).

Since the STA0 operates the receiving device before and after signal transmission, it can recognize that the STA2 is transmitting beacons at a TBTT point-in-time close to that of itself.

The STA2 determines to change its own TBTT, i.e., beacon transmission position, the reason being that a beacon of another station has been received immediately prior to transmission of its own beacon. On the other hand, at the STA0, a beacon has been received close to the TBTT point-in-time of its own, but the beacon was received following transmission of its own beacon, so no TBTT change is performed.

In the case of changing the beacon transmission position, the STA2 makes notification to the nearby stations that it is going to change the TBTT, using the ALERT field of the beacon to be transmitted, performs a scan, finds a new available TBTT where collision will not occur, and changes the TBTT of the local station to the available TBTT.

On the other hand, the STA0 continues beacon transmission as if nothing had happened, but there are cases wherein the STA0 performs scanning processing to know the state of the network, having recognized that the networks have crossed from reception of the beacon of the STA2.

Figure 34:
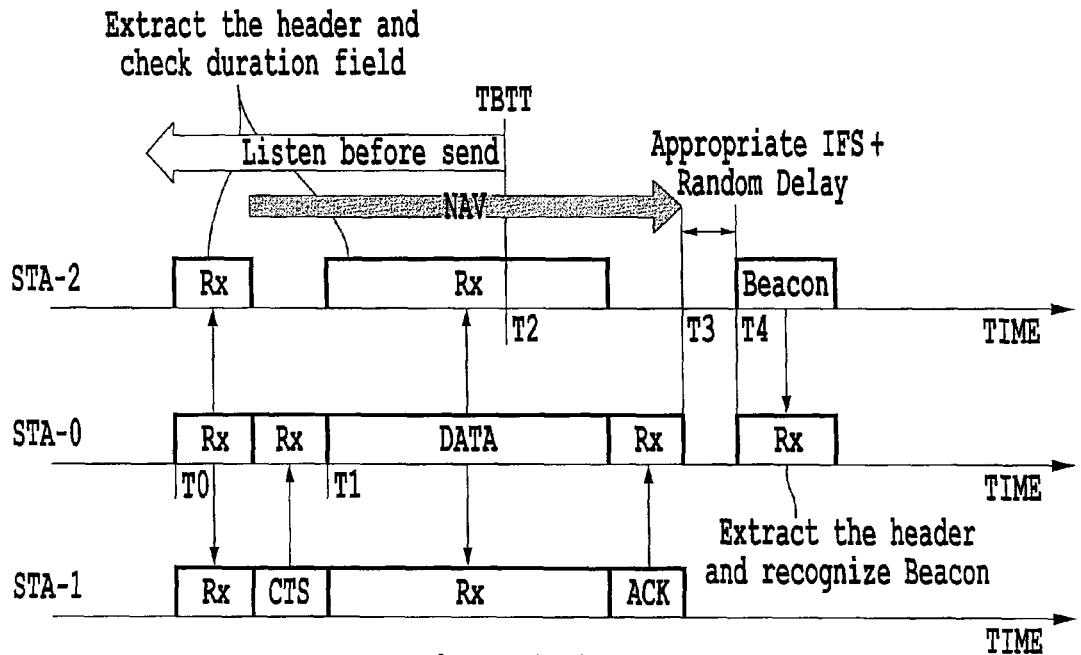
FIG. 34 is a diagram for describing collision detection means in a case wherein beacons of communication stations transmitting and receiving data have collided.

FIG. 34 illustrates an example of a case wherein collision has occurred between the transmitted signal of the STA0 and the beacon transmission point-in-time of the STA2.

The STA0 transmits an RTS to the STA1 at point-in-time T0, and data at the point-in-time T1. The STA2 is attempting to transmit the beacon at point-in-time T2, and accordingly is operating the receiving device according to Listen Before Send, and thus can receive signals of the STA0. Also, the STA2 follows CSMA/CA procedures and refrains from signal transmission while signals of other stations are present. Further, the STA2 analyzes the Duration field of the received signals, and accordingly refrains from transmission of signals upon point-in-time T3 where an ACK is received. Consequently, the scheduled transmission of a beacon at point-in-time T2 is delayed.

At this point, the STA2 has already detected that signals periodically transmitted are colliding. Following elapsing of PIFS (or SIFS)+a random delay amount (e.g., TBTT offset) from point-in-time T3, the STA2 makes transition to a signal transmittable state, and transmits a beacon at point-in-time T4. At this time, the STA2 lists in the TOIS field that it could not transmit a beacon at the point-in-time intended by the local station.

The STA0 operates the receiving device before and after signal transmission, and recognizes by Listen After Send that the STA2 has transmitted a beacon immediately following signals of the local station, thereby confirming the presence of the STA2. Also, the fact that the transmitting station was not able to transmit at the intended point-in-time can be recognized by referencing the TOIS field in the beacon received form the STA2, and determines that the signal transmitted from itself has interrupted the beacon transmission point-in-time, thereby detecting signal collision.

In the event that the STA2 recognizes for some reason that the signals of the STA0 are being received in a TPP (such as being transmitted following an auxiliary beacon, or description being made in a part of the transmitted signals to the effect of a TPP), there are cases wherein the STA2 may change the TBTT of itself. On the other hand, in the event that the STA2 does not change the TBTT due to the signals of the STA0 not being received in a TPP or the like, the STA0 recognizes that beacons of the STA2 are being transmitted near this TBTT, and accordingly the STA0 forbids transmission in order to not obstruct beacon transmission of the STA2 from now on.

The STA0 and the STA2 can recognize that networks have crossed, by detecting mutual collision. In such cases, the stations may perform scan processing to know the state of the network.

Figure 35:
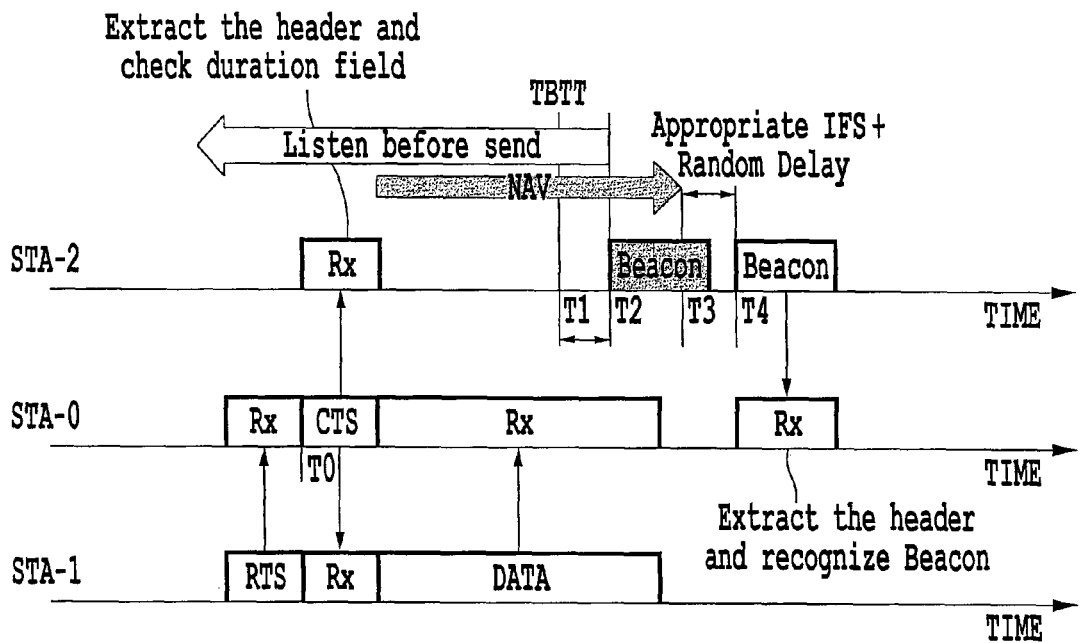
FIG. 35 is a diagram for describing collision detection means in a case wherein beacons of communication stations transmitting and receiving data have collided.

FIG. 35 illustrates an example of a case wherein collision has occurred between signal reception of the STA0 and the beacon transmission point-in-time of the STA2.

The STA0, which is the data originator, transmits a CTS to the STA1 at point-in-time T1. with point-in-time T1 as a TBTT, the STA2 is attempting to transmit the beacon at point-in-time T2 which is later than this point-in-time by a TBTT offset, and is operating the receiving device according to Listen Before Send, and thus can receive CTS signals. The STA2 follows CSMA/CA procedures and refrains from signal transmission while signals of other stations are present. Further, the STA2 analyzes the Duration field of the received signals, and accordingly refrains from transmitting signals upon point-in-time T3 where data is received. Consequently, the beacon which was originally scheduled to be transmitted at point-in-time T2 is delayed.

At this point, the STA2 has already detected that signals periodically transmitted are colliding. Following elapsing of PIFS (or SIFS)+a random delay amount (e.g., TBTT offset) from point-in-time T3, the STA2 makes transition to a signal transmittable state, and transmits a beacon at point-in-time T4. At this time, the STA2 lists in the TOIS field that it could not transmit a beacon at the point-in-time intended by the local station.

The STA0 operates the receiving device before and after signal transmission, and recognizes by Listen After Send that the STA2 has transmitted a beacon immediately following reception of the signals of the local station, thereby confirming the presence of the STA2. Also, the fact that the STA2 was not able to transmit at the intended point-in-time can be recognized by referencing the TOIS field in the beacon received form the STA2, and determines that the signal transmitted from itself has interrupted the beacon transmission point-in-time of the STA2, thereby detecting signal collision.

In the event that the STA2 recognizes for some reason that the signals of the STA0 are being received in a TPP (such as being transmitted following an auxiliary beacon), there are cases wherein the STA2 may change the TBTT, i.e., beacon transmission position of itself. On the other hand, in the event that the STA2 does not change the TBTT due to the signals of the STA0 not being received in a TPP or the like, the STA0 recognizes that beacons of the STA2 are being transmitted near this TBTT, and accordingly activates procedures for forbidding transmission to the STA1 in order to not obstruct beacon transmission of the STA2 from now on, so that the STA0 does not perform reception in this time span.

The STA0 and the STA2 can recognize that networks have crossed, by detecting mutual collision, and may perform scan processing to know the state of the network.

Figure 36:
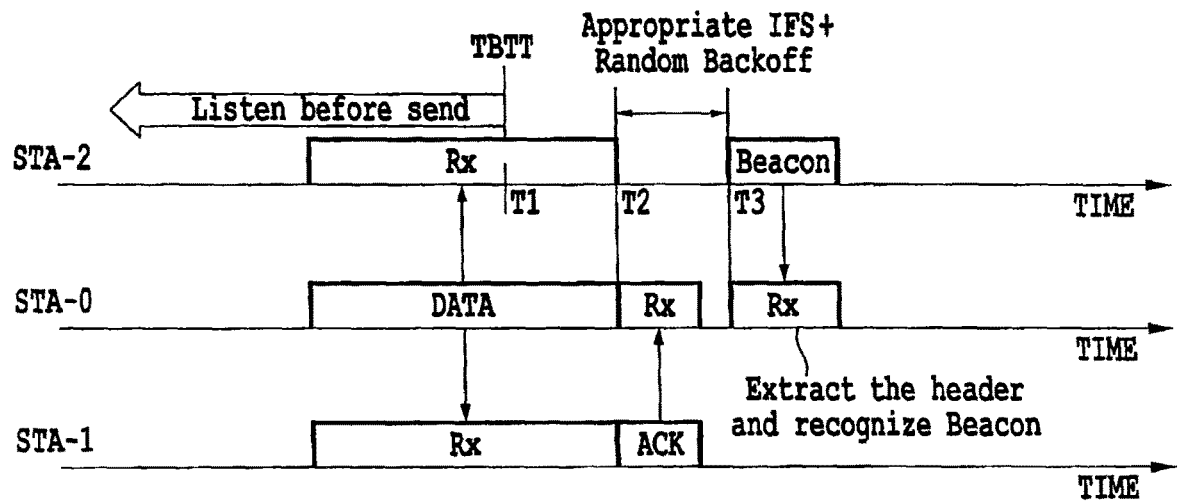
FIG. 36 is a diagram for describing collision detection means in a case wherein beacons of communication stations transmitting and receiving data have collided.

With the example described with reference to FIG. 34, description has been made assuming that the communication stations recognize the Duration field. Though recognition of the Duration field is preferable processing, a description will be made of collision detection regarding a case wherein recognition of the Duration field is not performed. FIG. 36 illustrates an example of a case wherein the signal transmission of the STA0 and the beacon transmission point-in-time of the STA2 have collided.

The STA0 transmits data, and the TBTT of the STA2 (point-in-time T1 in the drawing) arrives while performing this data transmission. The STA2 attempts beacon transmission at point-in-time T1, and receives signals from the STA0 since the receiving device is operating in accordance with Listen Before Send. The STA2 follows the CSMA procedures to refrain from signal transmission while signals of other stations are present, and transmission is forbidden to point-in-time T2. Consequently, the beacon transmission that was originally schedule for point-in-time T1 is delayed.

At this point, the STA2 has already detected that signals periodically transmitted are colliding. Following elapsing of DIFS+a random delay amount (e.g., TBTT offset) from point-in-time T2, the STA2 makes transition to a signal transmittable state, and transmits a beacon at point-in-time T3. At this time, the STA2 lists in the TOIS field that it could not transmit a beacon at the point-in-time intended by the local station.

The STA0 receives an ACK from the STA1 during this time, and in the event that the DIFS is longer than the time necessary for receiving the ACK, a situation wherein the STA2 obstructs reception of the ACK will not occur. The STA0 operates the receiving device before and after signal transmission, and accordingly receives the beacon which the STA2 transmits at point-in-time T3 by Listen After Send, and thus can confirm the presence of the STA2. Also, the STA0 can recognize by referencing the TOIS field of the beacon received from the STA2 that the STA2 is not able to transmit at the point-in-time intended, judges that the signal transmitted from itself has obstructed the beacon transmission point-in-time of the STA2, and thus detects signal collision.

In the event that the STA2 recognizes for some reason that the signals of the STA0 are being received in a TPP (such as being transmitted following an auxiliary beacon, a description being made in a part of the signals transmitted from the STA0 to the effect that transmission is being made in a TPP, etc.), there are cases wherein the STA2 may change the TBTT, i.e., beacon transmission position of itself. On the other hand, in the event that the STA2 does not change the TBTT due to the signals of the STA0 not being received in a TPP or the like, the STA0 recognizes that beacons of the STA2 are being transmitted near this TBTT, and accordingly transmission is forbidden for the STA0 to transmit in this time span, in order to not obstruct beacon transmission of the STA2 from now on.

The STA0 and the STA2 can recognize that networks have crossed, by detecting mutual collision, and may perform scan processing to know the state of the network.

Note that with the above-described processing, the rule is that at the time of beacons colliding, a communication station which has received a beacon from another station immediately prior to its own beacon transmission point-in-time is to change its own beacon transmission point-in-time, however, a reverse arrangement may be made wherein a communication station which has received a beacon from another station immediately following its own beacon transmission point-in-time is to change its own beacon transmission point-in-time.

Example of Operation of Collision Avoiding Procedures

Figure 37:
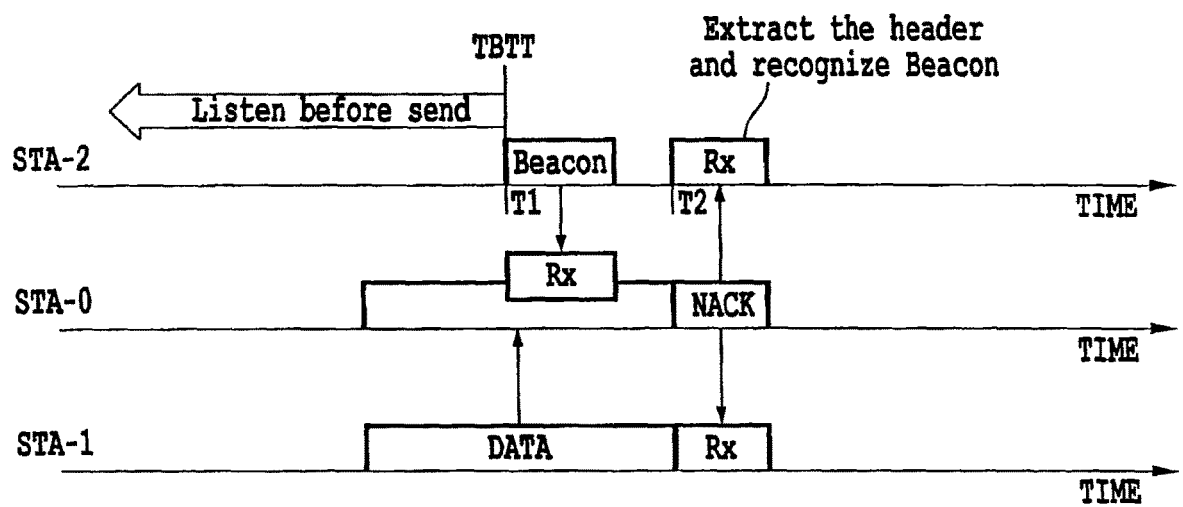
FIG. 37 is a diagram for describing collision detection means in a case wherein beacons of communication stations transmitting and receiving data have collided.

Next, another example will be given to describe collision detection in a case wherein Duration field recognition is not performed or RTS/CTS procedures as not used together, as with the operation example shown in FIG. 36. FIG. 37 illustrates an example of a case wherein the signal reception of the STA0 and the beacon transmission point-in-time of the STA2 have collided.

The STA0 receives data from the STA1 which is the data originator. The TBTT of the STA2 (point-in-time T1 in the drawing) arrives in the midst of this data transmission. The STA2 is operating the receiving device before signal transmission (beacon transmission) due to Listen Before Send, but cannot directly receive transmitted data from the STA1 which is a hidden terminal, and accordingly has not yet detected the presence of the STA0, and accordingly transmits a beacon at point-in-time T1 on schedule.

The STA0 receives interference in the signals reception from the STA1 due to the beacon signal transmission from the STA2, and cannot receive the data correctly. Following data reception, the STA0 returns a message to the STA1 to the effect that the data could not be received, in the form of a NACK.

The STA2 operates the receiving device for a certain while following signal transmission according to Listen After Send, and accordingly can receive the NACK of the STA0. The STA2 judges that the STA1 has failed in data reception due to its own signal transmission, from receiving the NACK from the STA1 immediately following signal transmission from itself, and thereby detects that the beacon from itself has collided with signal reception at another station.

Immediately following this, the STA2 may transmit signals (not shown) to the STA0 to notify the STA0 "that this time span is being used for beacon transmission of the STA2", so as to prompt changing of the signal reception timing of the STA0. On the other hand, in the event that the STA2 does not perform this, there a cases wherein the STA2 autonomously changes the TBTT.

The STA2 (and the STA0) can recognize that networks have crossed, by detecting mutual collision, and may perform scan processing to know the state of the network.

While description has been made with reference to FIG. 33 through FIG. 37 regarding cases of collision between signals of other stations and beacons, exactly the same procedures are performed in cases of collision between signals of other stations and signals of preferential transmission/reception performed periodically.

In a case wherein beacon collision has occurred due to change in the range of reach of airwaves, the following supplementary items are further taken into consideration in the event of performing collision avoidance using the above procedures wherein one of the communication stations which has caused collision moves the beacon transmission point-in-time (TBTT change) as described above.

In the above-described example, upon receiving a beacon of another station immediately prior to transmission of its own beacon, the STA0 activates TBTT changing processing immediately, but an arrangement is made wherein TBTT changing processing is not activated as an exception in the event that the STA0 has just recently set a new TBTT. The phrase "just recently" as used here is equivalent to 1 through 3 super frames following setting the new TBTT, for example. The reason is that, in the event that relatively large networks collide, there is the possibility that collision will be avoided by TBTT change performed by other communication stations, and standing by until the abnormal situation is stabilized is appropriate. Also, there is also the possibility that the network with which collision is occurring will go away, the abnormal situation thereby being stabilized.

Further, TBTT changing processing is not activated as an exception in the event that a beacon of another station is received immediately prior to beacon transmission of the local station but the ALERT field in the received beacon notifies information to the effect that the TBTT of the beacon is going to be changed. This is because the beacon collision will be solved by itself due to the TBTT changing processing.

Taking into consideration these supplementary items contributes to preventing oscillation in TBTT changing in the event of multiple communication stations simultaneously changing their TBTTs.

Also, TBTT changing processing is not activated as an exception in the event that a beacon of another station is received immediately prior to beacon transmission of the local station but the priority value indicated in the TYPE field of the received beacon is lower than the priority value of the beacon of the local station transmitted at the TBTT. In this case, this means that the station transmitting the beacon with lower priority value activates TBTT changing processing instead. For example, in the event a normal beacon of one communication station collides with an auxiliary beacon of another communication station, the TBTT for the auxiliary beacon needs to be moved. Also, in the event that auxiliary beacons collide one with another, the one with higher traffic priority is given preference, and the one with lower priority should be moved (or eliminated).

Figure 13:
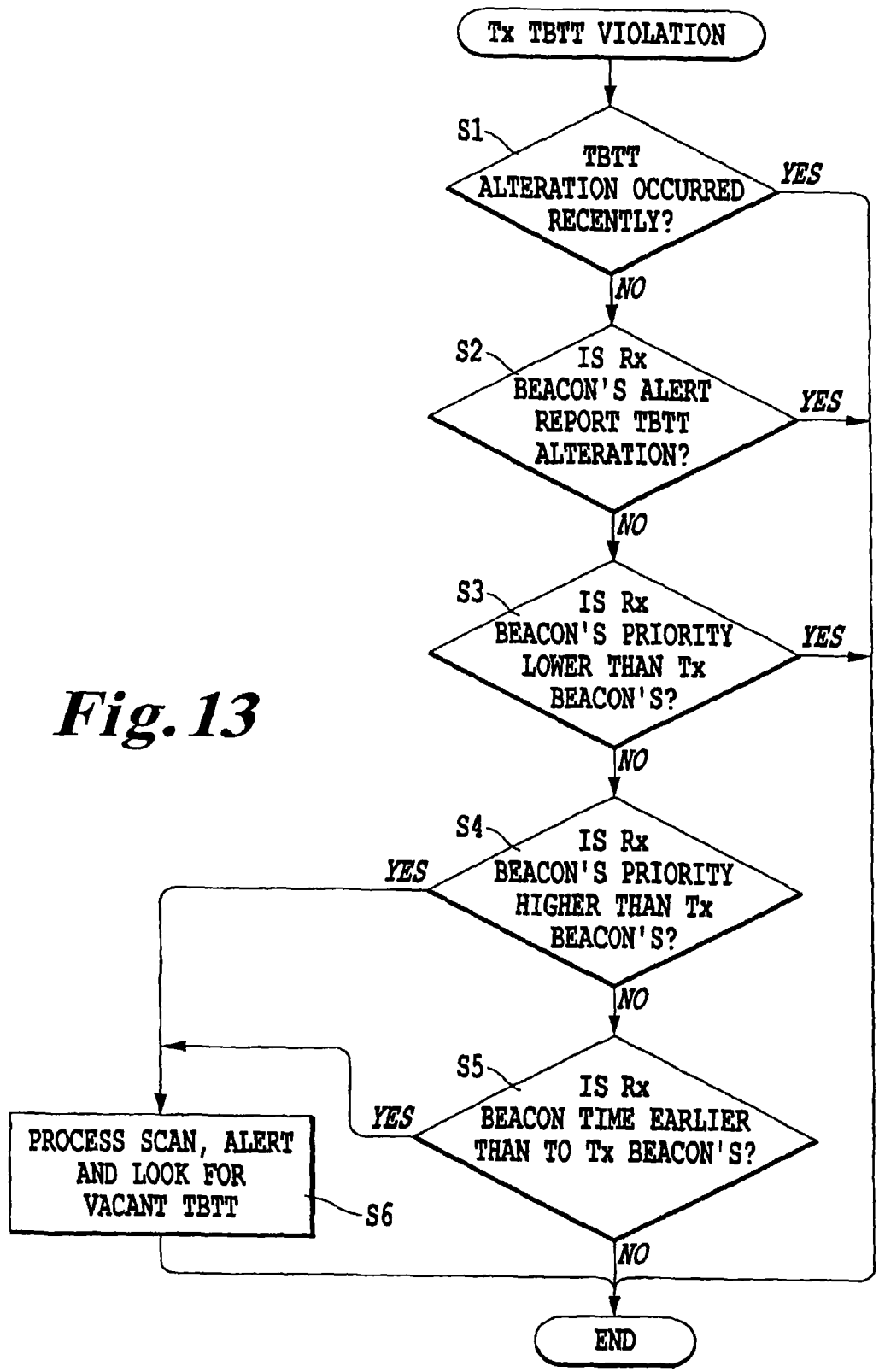
FIG. 13 is a flowchart illustrating device operations executed at each communication station in order to avoid beacon collision upon beacon collision occurring due to change in the range of reach of airwaves or the like, by one of the communication stations of which the beacon has collided changing the beacon transmission point-in-time (TBTT change).

FIG. 13 illustrates, in the form of a flowchart, device actions executed at each communication station, in a case wherein beacon collision has occurred due to change in the range of reach of airwaves, to avoid beacon collision by one of the communication stations which has caused the collision moving the beacon transmission point-in-time (TBTT change). Such device actions are actually realized in the form of executing a predetermined execution command program at the central control unit 103 within the wireless communication device 100.

The actions are activated in response to the communication station detecting collision of beacons transmitted from the local station. First, the local station checks whether or not a TBTT change has occurred recently within itself (step S1).

In the event that no TBTT change has been made recently, a check is further made regarding whether or not a description is made in the ALERT field of the received beacon to the effect that the TBTT is going to be changed (step S2).

In the event that no recent TBTT change has been confirmed at the local station or at nearby stations in steps S1 and S2, the priority of the transmitted beacon of the local station side and the priority described in the Type field of the received beacon are compared (step S3).

In the event that the priority of the beacon received from the other station is not lower than the priority of the transmitted beacon of the local station side, a check then is conversely made regarding whether or not the priority of the beacon received from the other station is higher than the priority of the transmitted beacon of the local station side (step S4).

In the event that the priority of the beacon received from the other station is higher than the priority of the transmitted beacon of the local station side, determination is made to change the TBTT, i.e., the beacon transmission position, of the local station. In this case, the communication station executes scanning for at least one super frame to collect information for determining the new TBTT, and makes notification to the nearby stations with a beacon describing in the ALERT field a message to the effect that the TBTT will be changed, as described with reference to FIG. 11, and further, discovers an available TBTT with the procedures described above with reference to FIG. 9, so as to detect a destination to move the beacon (step S6). Transmission is made with a beacon from the new TBTT, thereby notifying the nearby stations of the relocated beacon transmission timing.

Also, in step S4, in the event that the priority of the beacon received from the other station is not higher than the priority of the transmitted beacon of the local station side, i.e., in the event that the priority of both beacons matches, a check is made regarding whether or not the reception point-in-time of the received beacon is earlier than the beacon transmission point-in-time of the local station (step S5).

In the event that the timing of the beacon received from the other station is earlier, the local station determines to change its own TBTT, i.e., beacon transmission position, the reason being that a beacon of another station has been received immediately prior to transmission of its own beacon. That is to say, the communication station executes scanning for at least one super frame to collect information for determining the new TBTT, makes notification to the nearby stations with a beacon describing in the ALERT field a message to the effect that the TBTT will be changed, and further discovers an available TBTT so as to detect a destination to move the beacon (step S6). Transmission is then made with a beacon from the new TBTT, thereby notifying the nearby stations of the relocated beacon transmission timing.

Collision Avoiding Procedures in Case that Signal Transmission Timings Completely Match:

So far, description has been made under the assumption that beacon transmission and transmission/reception prioritized periods TPPs start with a slight random delay from a point-in-time based on a TBTT. A classical case enables the signals of both to be discovered at the time of collision even in the event that the transmission timing TBTTs of the signals within the super frame are the same, due to this random delay. However, a situation can occur wherein, in some cases, in addition to the TBTTs of the colliding signals, even the random values completely match. In such a case, the colliding signals are always transmitted at the same timing, and the communication stations which have caused the collision cannot detect the signals of each other since both are performing transmission operations, and accordingly cannot recognize that the signals are colliding at this time span.

In such a case, the quality of the signals transmitted/received in the particular time span where collision is occurring markedly deteriorates, so communication cut-off occurs in this time span alone. Accordingly, there are cases wherein, upon a communication station judging that the quality of signals transmitted from the TPP in a particular time span have markedly deteriorated, collision of signals can be resolved by releasing the TPP at this time span.

Examples of phenomenon used for judging marked deterioration is signal quality include a great number of errors occurring in only a particular time span leading to a continued communication cut-off state, no ACKs being returned during only the particular time span, communication being requested at a low data rate during only the particular time span, and so forth.

A communication station which has released the TPP due to such a reason continues transmission/reception of data with access method based on CSMA/CA with a random backoff, and also activates scanning processing by continuously operating the receiving device, to attempt detection of beacon signals and the like of another station which may be hidden. Upon discovering the beacon of a new communication station is this process, the above-described procedures are followed to analyze the information described in the beacon, extract the media occupation state of the neighboring communication stations, and effect collision avoidance.

Figure 38:
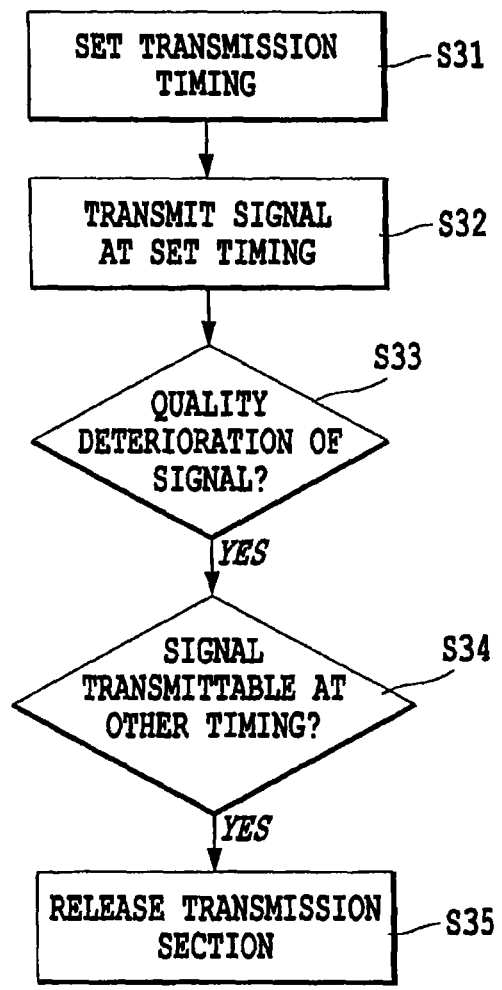
FIG. 38 is a flowchart illustrating communication procedures including collision avoiding operations in a case wherein, in addition to the TBTTs of colliding signals matching, even the random values thereof have completely matched.

FIG. 38 illustrates, in flowchart form, the communication procedures including collusion avoiding operations in the case in which even the random values in addition to the TBTTs of colliding signals completely match.

The communication station sets the signal transmission timing TBTT of the beacon or Transmission Prioritized Period TPP in the super frame (step S31), and performs signal transmission/reception based on the set transmission timing (step S32).

The communication station performs transmission operations at the transmission timing TBTT, and accordingly cannot detect collision by itself in the event that not only TBTTs but also the random values, i.e., the TBTT offsets completely match. Accordingly, periodic transmission operations of the signals continues over several super frames. Consequently, the situation in which the signal quality has markedly deteriorates is detected (step S33). Deterioration of quality as used here is detected by symptoms such as a great number of errors occurring in only a particular time span leading to a continued communication cut-off state, no ACKs being returned during only the particular time span, communication being requested at a low data rate during only the particular time span, and so forth.

Upon detecting such signal quality deterioration, the communication station searches the transmission/reception timings for others which can be used within the super frame (step S34), if found releases the transmission section with deteriorated quality (step S35), and sets the deteriorated periodic transmission signals to the new transmission timing TBTT.

the new transmission timing TBTT can be notified to nearby station by describing in a beacon, and also by transmitting periodic signals with the new transmission timing TBTT itself.

Collision Avoiding Procedures in Case that Normal Beacon Cannot be Received:

There are cases wherein not all the information described in the normal beacon is included in auxiliary beacons or signals periodically transmitted and received using Transmission Prioritized Periods TPPs (see FIG. 7). In this case, even in the event that the is collision between auxiliary beacons one with another, collision between signals periodically transmitted and received using Transmission Prioritized Periods TPPs and beacons, or collision between signals periodically transmitted/received one with another, media occupation information for other time spans cannot be detected. Also, cases can be conceived wherein normal beacons cannot be received even by performing scanning processing, due to transmitting other signals at the normal beacon transmission time span of the communication station owing to even the TBTT offsets coincidentally completely matching.

In such a case, an arrangement may be made wherein a Serial field is provided in the auxiliary beacons or signals periodically transmitted using Transmission Prioritized Periods TPPs to describe relative point-in-time information indicating what number in order TBTT the signal is being transmitted at based on the normal beacon of the local station, whereby a communication station which has received auxiliary beacons or signals periodically transmitted can extract the normal beacon transmission point-in-time of the auxiliary beacon transmitting station.

Figure 39:
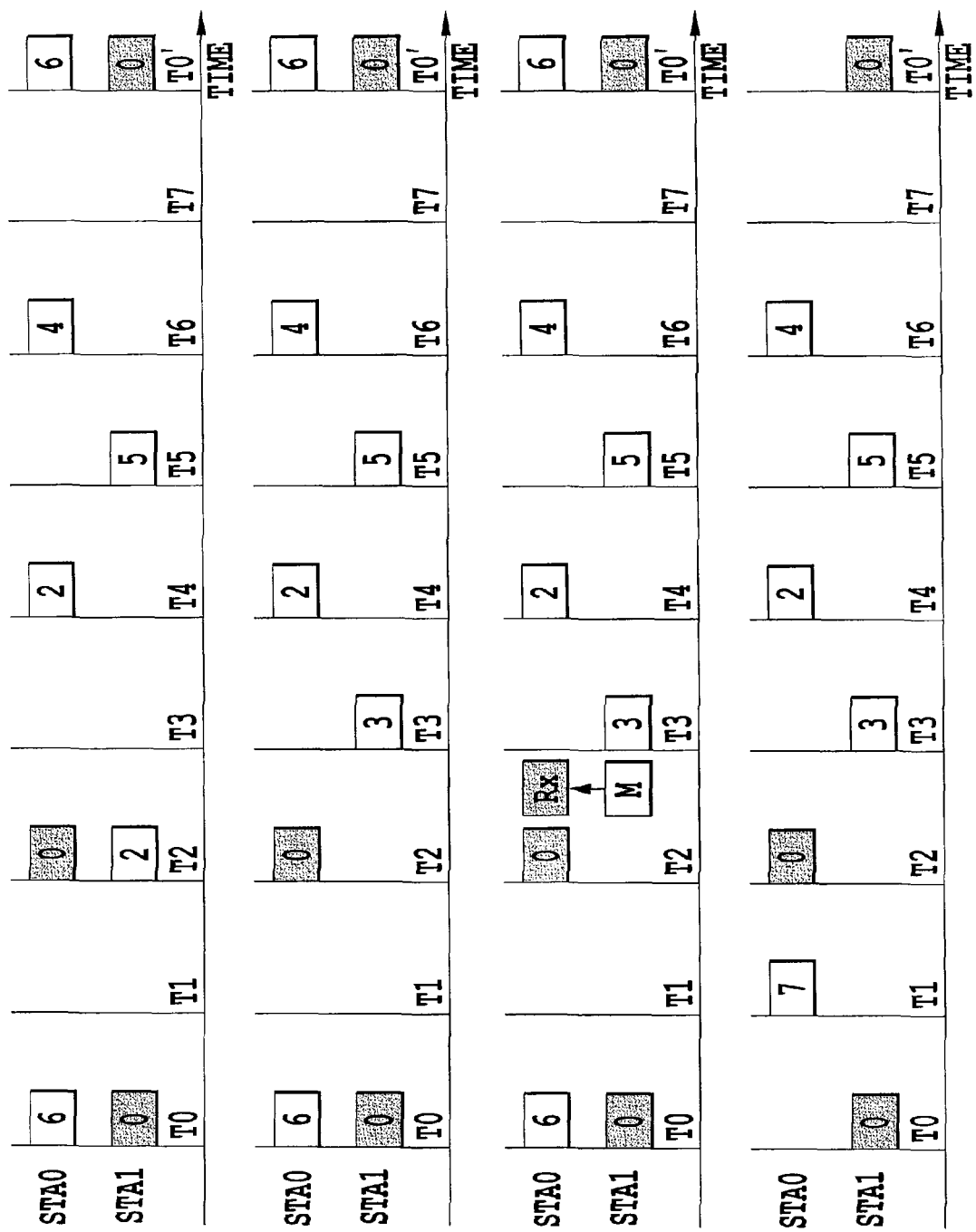
FIG. 39 is a diagram illustrating an example of communication operations for performing signal collision avoidance based on the contents described in the Serial field appended to an auxiliary beacon or periodically-transmitted signals.

FIG. 39 illustrates a communication operation example for performing signal collision avoiding, based on the contents of the Serial field added to the auxiliary beacons or periodically-transmitted signals. In the drawing, the assumption is that the STA0 and the STA1 are in communication with other unshown communication stations, and have been operating as mutually independent networks, but the STA0 and the STA1 have come into the range of reach of airwaves due to the communication stations moving or an obstacle shielding the networks one from another being removed. Also, in the drawing, 8 TBTTs are set in the super frame, T0 through T7.

The top tier in FIG. 39 is the initial state. At point-in-time T0 and point-in-time T2, the normal beacons of both sides are colliding with the auxiliary beacons of the other. Now, let us assume a case wherein reception of the normal beacons of each other is continuously impossible due to a reason such as the TBTT offset continuing to match. In this case, the STA1 cannot receive the normal beacons of the STA0, and neither can the STA0 receive the normal beacons of the STA1.

Subsequently, the STA1 can receive auxiliary beacons and signals periodically transmitted using Transmission Prioritized Periods TPPs from the STA0, transmitted at point-in-time T4 and point-in-time T6. In this case, upon the STA1 receiving an auxiliary beacon transmitted from the STA0 at point-in-time T4 and point-in-time T6, the STA1 analyzes the description in the Serial field, and extracts information regarding how much of a relative time difference the auxiliary beacon is being transmitted at from the normal beacon transmission point-in-time, thereby recognizing that the normal beacon of the STA0 is being transmitted near the point-in-time T2. Further, the STA1 recognizes that it is transmitting signals near the point-in-time T2 itself, and accordingly cannot receive the normal beacons of the STA0.

Subsequently, as shown in the upper-middle tier in the drawing, the STA1 releases the TPP used near the point-in-time T2 and repositions to another TBTT (point-in-time T3 in the drawing), so as to be capable of receiving the normal beacons of the STA0. The STA1 can tell the resource usage state of the STA2 by receiving the normal beacons of the STA2.

The STA0 can also receive the auxiliary beacons of the STA1 transmitted at point-in-time T5, and by performing processing the same as that of the STA1 described above, can receive the normal beacons of the STA1 by releasing its own TPP at point-in-time T0. Finally, the placement of normal beacons and auxiliary beacons (periodic signal transmission using Transmission Prioritized Periods or TPPs) such as shown at the bottom tier in FIG. 39 is achieved.

On the other hand, in the event that the STA0 does not autonomously release the TPP, such as the STA0 not noticing the auxiliary beacon of the STA1 at point-in-time T5, a message may be transmitted from the STA1 to the STA0 to the effect that it should release the TPP, as show at the lower-middle tier in FIG. 39, for example. In this case, upon receiving this release request message, the STA0 changes the transmission point-in-time of the auxiliary beacon which had been transmitted at point-in-time T0, and finally, the placement of normal beacons and auxiliary beacons such as shown at the bottom tier in FIG. 39 is achieved. Accordingly, the STA0 can receive the normal beacons of the STA1, and thereby can tell the resource usage state of the STA1.

Note that the TPP section changing procedures by auxiliary beacon are performed according to already-described procedures. Following detection of an available slot by scanning operations, TPP placement is performed at a point-in-time where collision does not occur.

Other Scan Triggers

Description of scanning operations has been made so far regarding scanning performed periodically, and scanning performed due to detection of collision. With the present embodiment, there are cases wherein signals of a communication station which had not been recognized as a neighboring station so far can be detected by signal detection/reception processing performed before signal transmission (Listen Before Send) and signal detection/reception processing performed after signal transmission (Listen After Send), even in the event that collision is not detected. There are cases wherein scanning processing is activated due to such signal detection/reception processing, beacons of the communication station are searched for, and acquisition of media occupation information of the communication station is attempted.

Also, the signal detector and receiving device are continuous operated during scanning processing in time spans when signals are not being transmitted, but signal transmission is given preference during the time span for transmitting signals, and the receiving device may be stopped for just the duration of signal transmission.

F. Other Beacon Collision Scenarios and Collision Avoiding Procedures

In the above section E, description has been made regarding processing procedures for avoiding beacon collision in a case wherein the range of reach of airwaves changes due to communication stations moving and so forth. Besides, this, a case can be conceived wherein the electric power of a new communication station turns on, thereby exposing collision of beacons transmitted by the communication stations.

FIGS. 14A-14D illustrate the way in which beacons transmitted by the communication stations collide due to the power of a new communication station being turned on. The drawings illustrate an example wherein systems configuring networks already existing independently are merged due to the emergence of a new communication station. Also, even if a new communication station does not emerge, there are cases wherein systems configuring already-existing networks are merged due to a third communication station coming therebetween. In such a case as well, the same processing as described below can be performed.

Figure 14A:
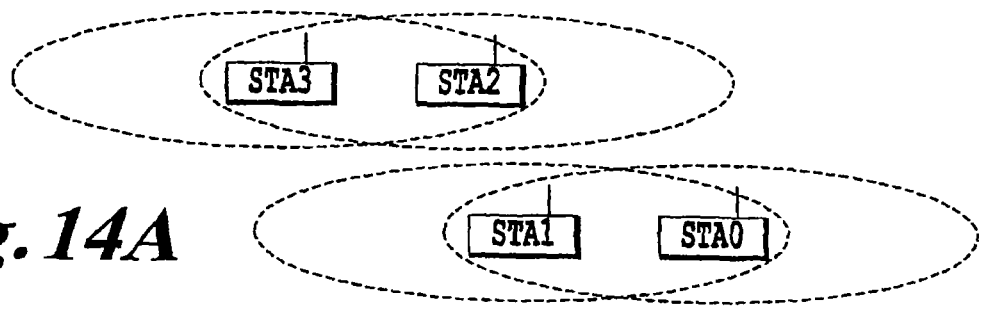
Figure 14B:
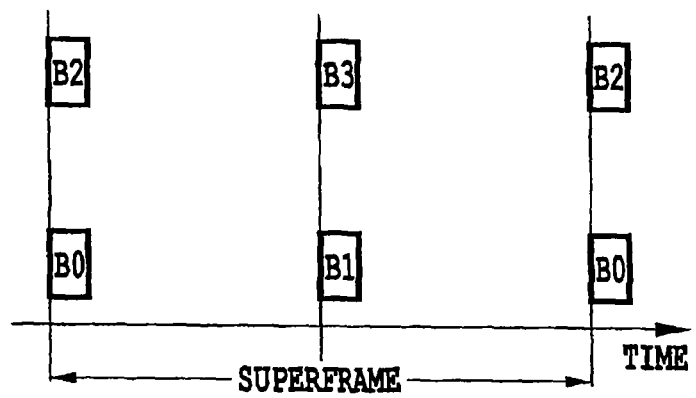

At FIG. 14A, communication stations the STA0 and the STA1 exist in a range where airwaves from communication stations the STA2 and the STA3 cannot reach, with the STA0 and the STA1 performing communication. Also, the STA2 and the STA3 perform communication completely independent from these. In this case, the beacon transmission timings are set for each communication station in a independent manner for each system, but as shown in FIG. 14B, beacon transmission timings which unfortunately match have been set between the stations which do not recognize each other.

Figure 14C:
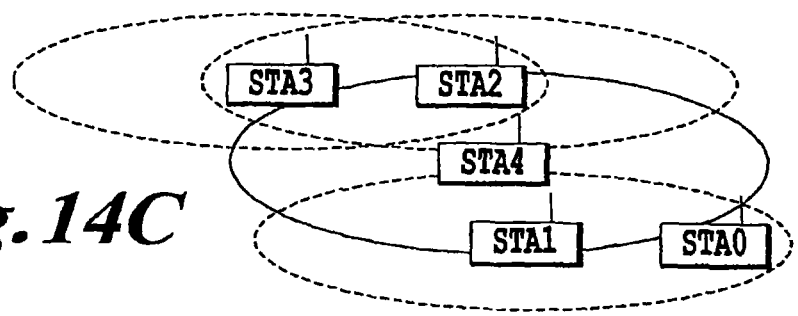
Figure 14D:
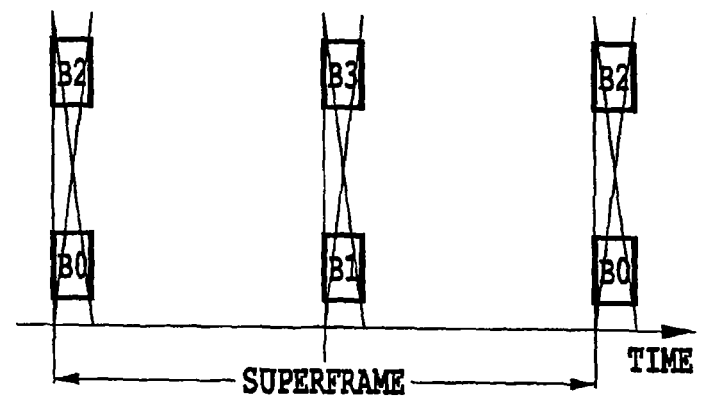

Subsequently, upon the communication station the STA4 newly emerging between these communication station, and assuming that the stations the STA0, the STA1, the STA2, and the STA3 have become capable of transmission/reception with the STA4, as shown in FIGS. 14C-14D, the beacons of the stations collide as far as the STA4 is concerned. In such a case, there is the need for at lease one of the sets of stations of which the beacons are colliding to change the beacon transmission timing TBTT, otherwise, the beacons cannot be heard correctly. In other words, the STA4 cannot participate in the network.

Figure 15:
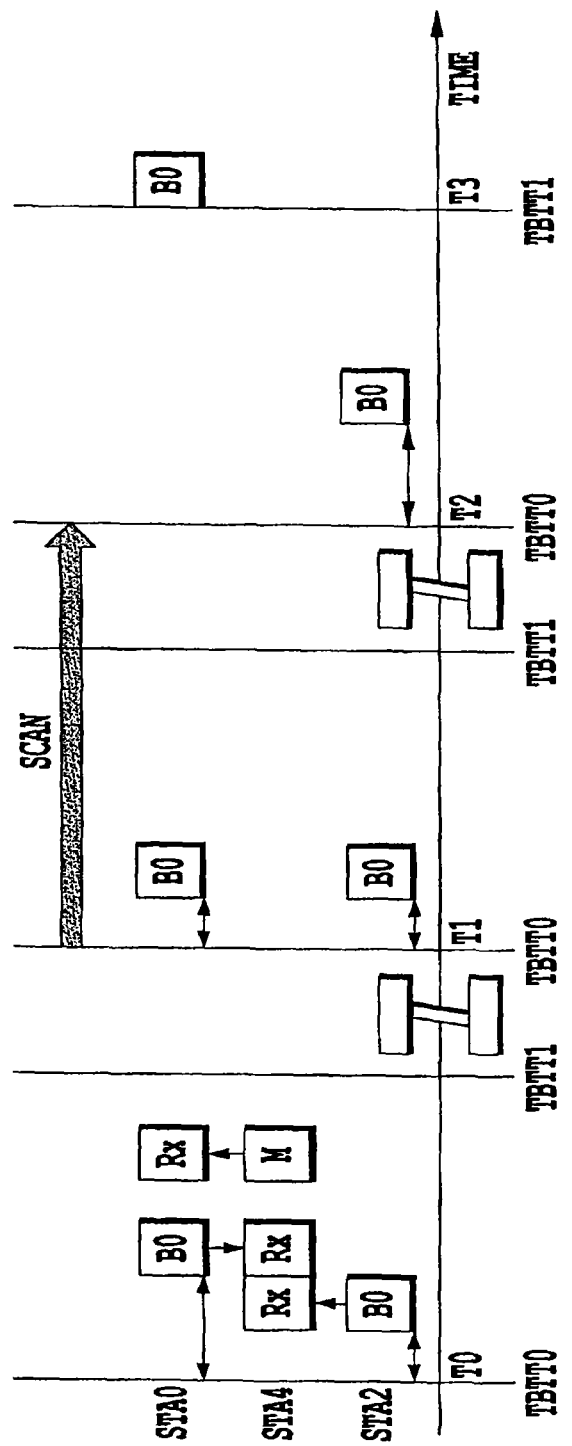
FIG. 15 is a diagram illustrating an example of TBTT changing procedures in the event that collision of beacons being exposed due to participation of a new communication station.

In such a case as well, there is the need for a station to change the transmission point-in-time. FIG. 15 shows an example of TBTT changing procedures in the event that beacon collision has been exposed due to participation of a new communication station. The example shown here is a case wherein the TBTT of the beacon transmitted by the STA0 and the TBTT of the beacon transmitted by the STA2 have approximately matched the TBTT0, but the TBTT of the STA0 is slightly later. Also, we will say that the STA4 is capable of communication with either of the STA0 and the STA2, but the STA0 and the STA2 are in a state wherein direct communication cannot be made (hidden terminals from each other).

At point-in-time T0, the beacon transmission TBTT for both the STA0 and the STA2 arrives, so each transmit beacons at a point-in-time shifted from the point-in-time T0 by a TBTT offset. At point-in-time T0, the TBTT offset of the STA0 and the TBTT offset of the STA2 happen to be different values, with a small TBTT off set value being selected for the STA2, and a large TBTT off set value being selected for the STA0.

The STA4 can receive beacons transmitted from both the STA0 and the STA2. Now, the STA4 has received beacons from these two station within the TBTT incrementation of itself (i.e., within the range of $\pm B_{min}/2$), and accordingly can detect that beacons are colliding. Next, determination is made on which communication station a message should be transmitted regarding requesting changing of the TBTT. With the example shown in the drawing, the beacon of the STA0 was received later, so the STA4 determines to have the STA0 to change the TBTT, and transmits the STA0 a message M requesting changing of the TBTT. Now, even in the event that the STA0 and the STA2 are not transmitting or receiving data and are in a power saving state, as described earlier both are required at the time of signal transmission to perform reception operations for a predetermined period before and following transmission of signals from the local station, (Listen Before Send/Listen After Send), so the STA0 can receive this message.

Note that the STA4 does not simply compare the beacon reception point-in-time as such to determine which of the received beacons that have collided is later, but rather makes reference to the TOIS fields of the beacons, and subtracts the pseudo-random sequence used, thereby calculating the TBTT of the beacon itself. Of course, an agreement may be made wherein the TBTT changing message is transmitted to the side with the earlier beacon reception point-in-time or TBTT, so long as the same agreement is held among all of the communication stations, but description will proceed here with the example of an agreement wherein the message is sent to the later one.

Upon receiving the TBTT change request message and recognizing that it must change its TBTT, the STA0 activates the TBTT changing processing from point-in-time T1. In this case, with these processing procedures, the STA0 first makes notification to the nearby stations that it is going to change the TBTT, using the ALERT field of the beacon to be transmitted (the ALERT field is a field for storing information to be transmitted to the nearby stations in an abnormal situation). Further, the STA0 executes scanning for at least one super frame, to collect information for determining the new TBTT. With the example shown in FIG. 15, the TBTT changing processing is immediately activated from point-in-time T1, but this processing may be executed after a delay of one or two super frames, due to delay in processing within the communication station.

Upon the STA0 finding an available TBTT by the procedures described with reference to FIG. 9, the TBTT1 is set as the new TBTT, and does not perform beacon transmission at point-in-time T2 but instead performs beacon transmission at point-in-time T3 instead, and subsequently periodically performs beacon transmission at the timing of TBTT1 with a TBTT offset.

On the other hand, the STA2 transmits its beacon at point-in-time T2 as if nothing had happened, and subsequently continues to transmit its beacon at the timing of TBTT0 with a TBTT offset.

In the event that a communication station recognizes a beacon notifying in the ALERT field that the TBTT is to be changed, or recognizes that no beacon is being transmitted near the TBTT of beacons received so far, a scan is executed to tell where the new TBTT of the beacon has been determined at (not shown).

In a case wherein beacon collision has become exposed due to participation of a new communication station or the like, the following supplementary items are further taken into consideration in the event of performing collision avoidance using the above procedures wherein the newly-participating station requests one of the communication stations which has caused collision to change the beacon transmission point-in-time as described above.

In the above-described example, upon receiving a TBTT change request from the STA4, the STA0 activates TBTT changing processing immediately, but an arrangement is made wherein TBTT changing processing is not activated as an exception in the event that the STA0 has just recently set a new TBTT. The phrase "just recently" as used here is equivalent to 1 through 3 super frames following setting the new TBTT. The reason is that, in the event that relatively large networks collide, there is the possibility that collision will be avoided by TBTT change performed by other communication stations, and standing by until the abnormal situation is stabilized is appropriate. Also, there is also the possibility that the network with which collision is occurring will go away, the abnormal situation thereby being stabilized.

Further, with the above example, the STA4 transmits a TBTT change request message to the communication station with the later collision beacon reception point-in-time or the later TBTT, but in the event that the ALERT field in one of the colliding beacons notifies information to the effect that the TBTT of the beacon is going to be changed, this beacon is not counted as a colliding beacon, so the TBTT change request message transmission processing is activated only in the event that there are colliding beacons excluding these. This is because the beacon collision will be solved by itself due to the TBTT changing processing.

Taking into consideration these supplementary items contributes to preventing oscillation in TBTT changing in the event of multiple communication stations simultaneously changing their TBTTs.

Also, in the event that the priority values indicated in the TYPE fields of the colliding beacons differ, the TBTT change request message transmission processing is activated excluding beacons indicating a priority value greater than the lowest priority value thereof from stations to which the message is to be transmitted to. For example, in the event a normal beacon of one communication station collides with an auxiliary beacon of another communication station, the TBTT for the auxiliary beacon should be moved. Also, in the event that auxiliary beacons collide one with another, the one with higher traffic priority is given preference, and the one with lower priority should be moved (or eliminated).

Figure 16:
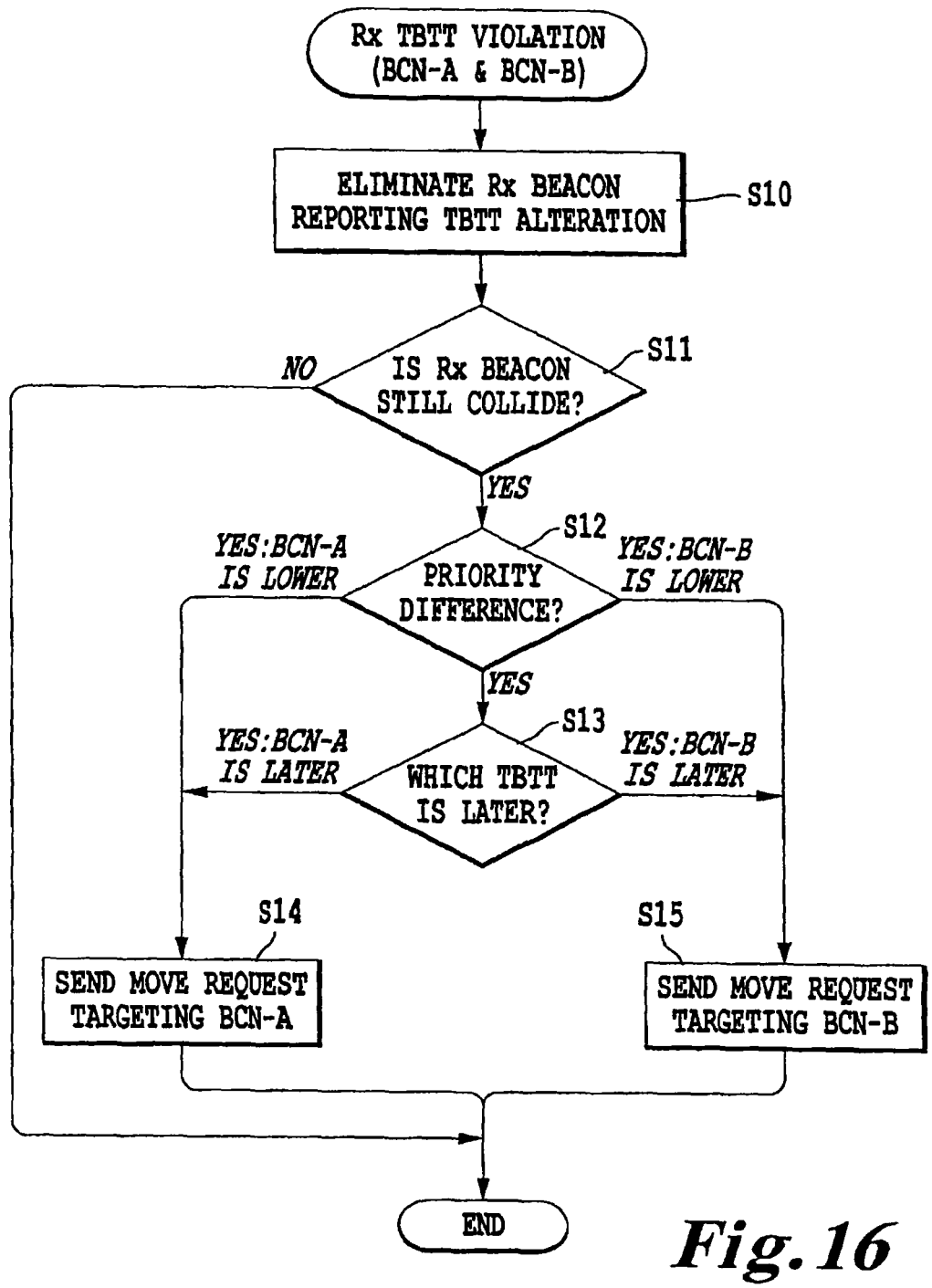
FIG. 16 is a flowchart illustrating device operations executed at each communication station in order to avoid beacon collision upon beacon collision occurring due to emergence of a newly-participating station, by requesting one of the communication stations of which the beacon has collided to change the beacon transmission point-in-time (TBTT change).

FIG. 16 illustrates, in the form of a flowchart, device actions executed at each communication station, in a case of beacon collision being exposed due to participation of a new communication station or the like, wherein the newly-participating station requests one of the communication stations which has caused collision to change the beacon transmission point-in-time (TBTT change), to avoid beacon collision. Such device actions are actually realized in the form of executing a predetermined execution command program at the central control unit 103 within the wireless communication device 100.

The actions are activated in response to the communication station detecting collision of beacons transmitted from the local station. We will say here that reception of beacon A and beacon B have collided.

First, a check is made regarding whether or not one of the received beacons A or B has described in the ALERT field that the TBTT will be changed, and beacons with this description are deleted from colliding beacons (step S10).

Now, following deleting beacons having described in the ALERT field that the TBTT will be changed from colliding beacons, determination is made once more regarding whether or not there are colliding beacons (step S11). In the event that colliding beacons are found to exist as a result of the determination, the later-described processing of step S12 and on is performed, and in the event that no colliding beacons are found to exist, this processing routine ends.

In the event that colliding beacons still exist even following the processing in step S10, the TYPE fields of each of the received beacons are referred to, and the difference in traffic priority is compared (step S12).

Now, in the event that the priority of beacon A is lower, a TBTT change request message is transmitted to the originator of the beacon A (step S14), and this processing routine ends. Also, in the event that the priority of beacon B is lower, a TBTT change request message is transmitted to the originator of the beacon B (step S15), and this processing routine ends.

Also, in the event that there is no difference in the priority of the received beacons, determination is further made with regard to which received beacons has arrived later (step S13). The beacon reception point-in-time as such is not compared to determine which of the received beacons that have collided is later, but rather reference is made to the TOIS fields of the beacons, and subtracts the pseudo-random sequence used, thereby calculating the TBTT of the beacons themselves.

Now, in the event that beacon A has arrived later, a TBTT change request message is transmitted to the originator of the beacon A (step S14), and this processing routine ends. Also, in the event that beacon B has arrived later, a TBTT change request message is transmitted to the originator of the beacon B (step S15), and this processing routine ends.

Collision Avoiding Procedures in Case that Normal Beacon Cannot be Received:

There are cases wherein not all the information described in the normal beacon (see FIG. 7) is included in auxiliary beacons or signals periodically transmitted and received using Transmission Prioritized Periods TPPs (same as above). In this case, even in the event that the is collision between auxiliary beacons one with another, collision between signals periodically transmitted and received using Transmission Prioritized Periods TPPs and beacons, or collision between signals periodically transmitted/received one with another, media occupation information for other time spans cannot be detected. Also, cases can be conceived wherein normal beacons cannot be received even by performing scanning processing, due to coincidental transmission of other signals at the normal beacon transmission time span of the communication station.

In such a case, an arrangement may be made wherein a Serial field is provided in the auxiliary beacons or signals periodically transmitted using Transmission Prioritized Periods TPPs to describe relative point-in-time information indicating what number in order TBTT the auxiliary beacon is being transmitted at based on the normal beacon of the local station, whereby a communication station which has received auxiliary beacons or signals periodically transmitted can extract the normal beacon transmission point-in-time of the auxiliary beacon transmitting station.

Figure 40:
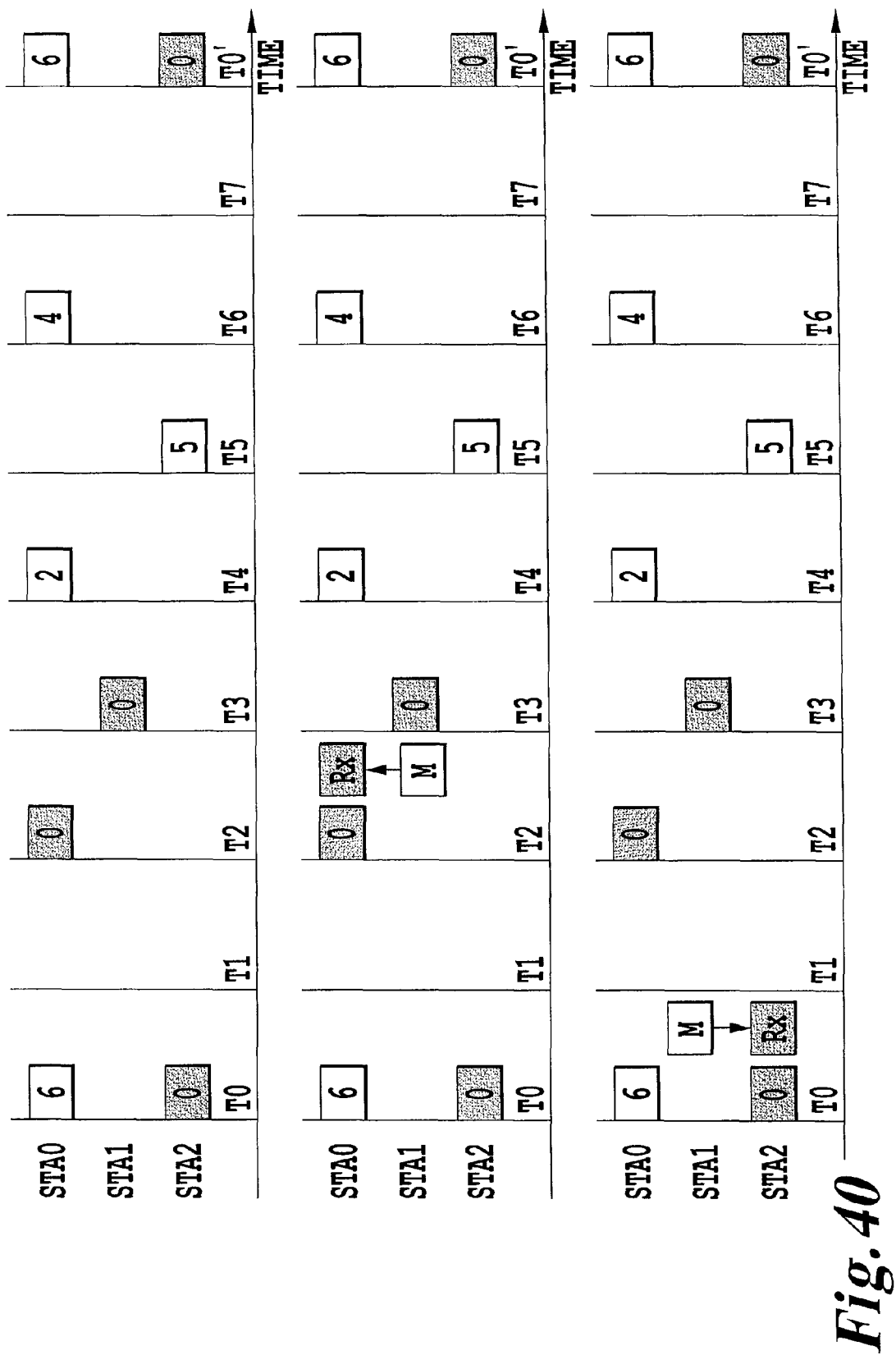
FIG. 40 is a diagram illustrating an example of communication operations for performing signal collision avoidance based on the contents described in the Serial field appended to an auxiliary beacon or periodically-transmitted signals.

FIG. 40 illustrates a communication operation example for performing signal collision avoiding, based on the contents of the Serial field added to the auxiliary beacons or periodically-transmitted signals. In the drawing, the assumption is that the STA0 is in communication with another unshown communication station, the STA2 is also in communication with another unshown communication station, and both have been operating as mutually independent networks, but the STA1 has come into the range of reach of airwaves of the STA0 and the STA2 due to communication stations moving or an obstacle shielding the networks one from another being removed. Also, in the drawing, 8 TBTTs are set in the super frame, T0 through T7.

The top tier in FIG. 40 is the initial state. At point-in-time T0, the auxiliary beacons of the STA0 and the normal beacon of the STA2 are colliding. Now, the STA1 cannot receive the normal beacons of the STA2 at point-in-time T0, due to the auxiliary beacons or signals periodically transmitted using Transmission Prioritized Periods TPPs transmitted from the STA0. However, the auxiliary beacons of the STA2 transmitted at point-in-time T5 can be received. In this case, upon the receiving an auxiliary beacon transmitted from the STA2 at point-in-time T5, the STA1 analyzes the description in the Serial field thereof, and extracts information regarding how much of a relative time difference the auxiliary beacon is being transmitted at from the normal beacon transmission point-in-time, thereby recognizing that the normal beacon of the STA2 is being transmitted near the point-in-time T0. Further, the STA1 recognizes that the STA0 is transmitting signals near the point-in-time T0, and accordingly cannot receive the normal beacons of the STA2.

Subsequently, as shown in the middle tier in FIG. 40, the STA1 transmits a message to the STA0 to release the Transmission Prioritized Period TPP acquired by the STA0 near the point-in-time T0. Upon receiving this message, the STA0 releases the TPP held at the point-in-time T0. Accordingly, only the normal beacon of the STA2 is transmitted as a periodic transmitted signal at point-in-time T0, and the STA1 can receive the normal beacons of the STA2. The STA1 can tell the resource usage state of the STA2 by receiving the normal beacons of the STA2.

On the other hand, as shown in the bottom tier in FIG. 40, there are cases wherein the STA1 transmits a message requesting normal beacon transmission point-in-time change to the STA2. In this case, upon receiving this message, the STA2 activates transmission changing procedures for the normal beacon which had been transmitted at point-in-time T0, and following detection of an available slot by the already-described procedures, normal beacon transmission is started at a point-in-time where collision does not occur. Accordingly, the STA1 can receive the normal beacons of the STA2, and the STA1 can tell the resource usage state of the STA2.

Other Scan Triggers:

Description of scanning operations has been made so far regarding scanning performed periodically, and scanning performed due to detection of collision. With the present embodiment, there are cases wherein signals of a communication station which had not been recognized as a neighboring station so far can be detected by signal detection/reception processing performed before signal transmission (Listen Before Send) and signal detection/reception processing performed after signal transmission (Listen After Send), even in the event that collision is not detected. There are cases wherein scanning processing is activated due to such signal detection/reception processing, beacons of the communication station are searched for, and acquisition of media occupation information of the communication station is attempted.

Also, the signal detector and receiving device are continuous operated during scanning processing in time spans when signals are not being transmitted, but signal transmission is given preference during the time span for transmitting signals, and the receiving device may be stopped for just the duration of signal transmission.

G. Setting TBTT of Auxiliary Beacon Based on Priority

At the time of transmitting beacons, a communication station performs scanning, finds available TBTTs by referring to the NBOIs of received beacons, and sets its own new TBTT.

However, situations can be conceived wherein the super frame is already saturated with normal beacons and auxiliary bacons of other stations in the processing of setting the new TBTT, so that there is no available TBTT. In this case, the communication station can solve the situation by abandoning sending traffic out on this system, or by competing for resources used for transmitting traffic with lower order of preference, so as to transmit traffic if the local station with high order of preference. The wireless network according to the present embodiment takes the latter method, and accordingly is permitted to request another communication station to stop transmitting auxiliary beacons with low order of preference.

Figure 17:
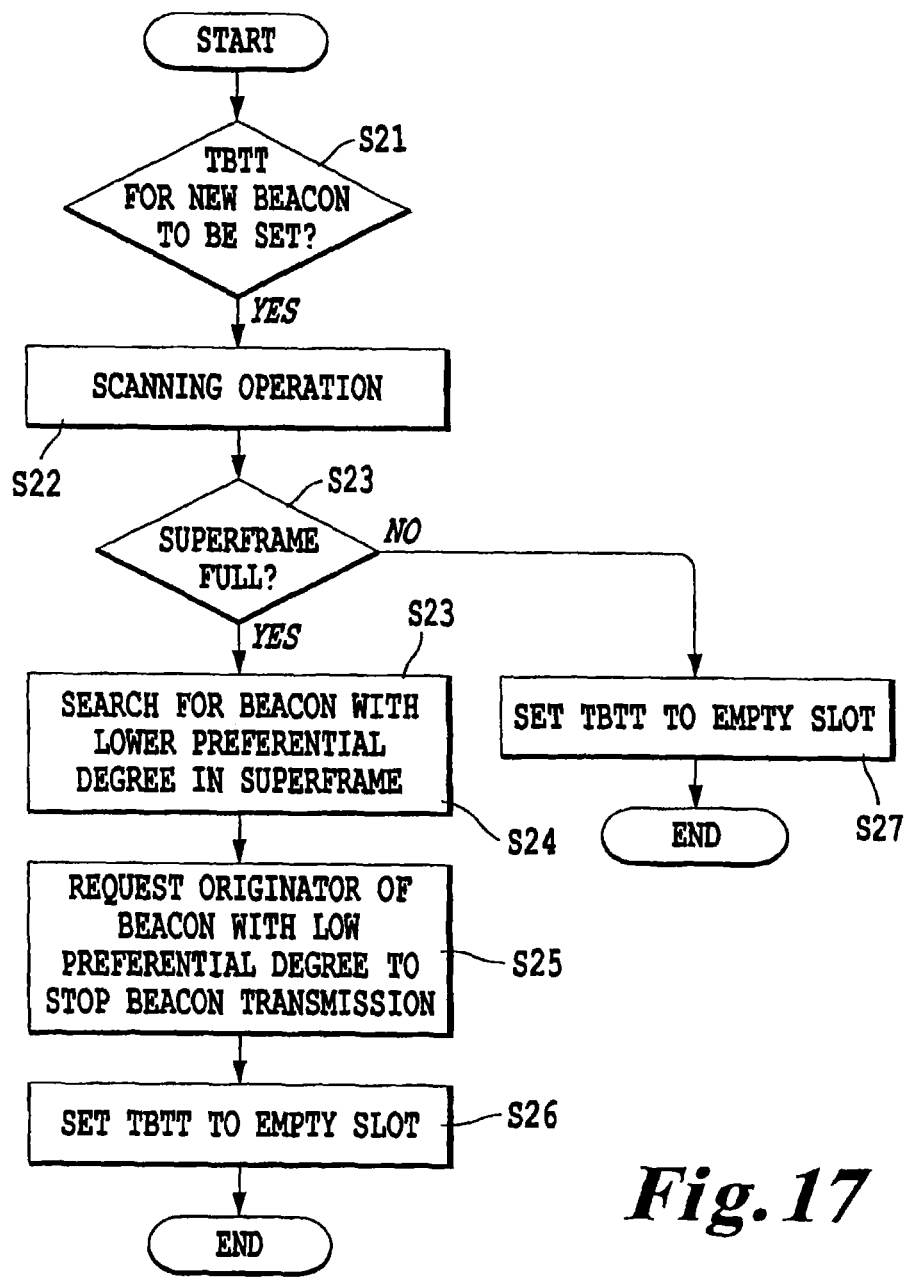
FIG. 17 is a flowchart illustrating procedures for a communication station to set a new TBTT within the super frame cycle.

FIG. 17 illustrates, in the form of a flowchart, the procedures for a communication station to set a new TBTT within a super frame cycle. Such device actions are actually realized in the form of executing a predetermined execution command program at the central control unit 103 within the wireless communication device 100.

These procedures are activated for setting a TBTT for a normal beacon within the super frame at the time of new participation, or for setting a TBTT for an auxiliary beacon within the super frame in order to acquire traffic resources (step S21). We will say that the priority of the beacon for which the local station is attempting to set a TBTT has been set at this point.

The communication station performs a scanning operation for at least one super frame (step S22), and searches for an available new TBTT slot within the super frame (step S23). In the event that an available slot has been found here, the new TBTT is set following the procedures described with reference to FIG. 9 (step S27), and this entire processing routine is ended.

On the other hand, in the event that an available slot cannot be detected within the super frame, i.e., in a full state, the communication station searches the beacons which have TBTTs paced within the super frame for one which has an order of preference lower than that of the beacon for which the local station is attempting to set a TBTT (step S24).

In the event that a desired number of beacons with low order of preference has been detected, a stop request for the beacon transmission is performed to the originators of the beacons (step S25).

Subsequently, the communication station sets the TBTT for its own normal beacon or auxiliary beacon at the position which has become an available slot due to the beacon transmission stopping (step S26), and the entire processing routine ends.

Figure 18:
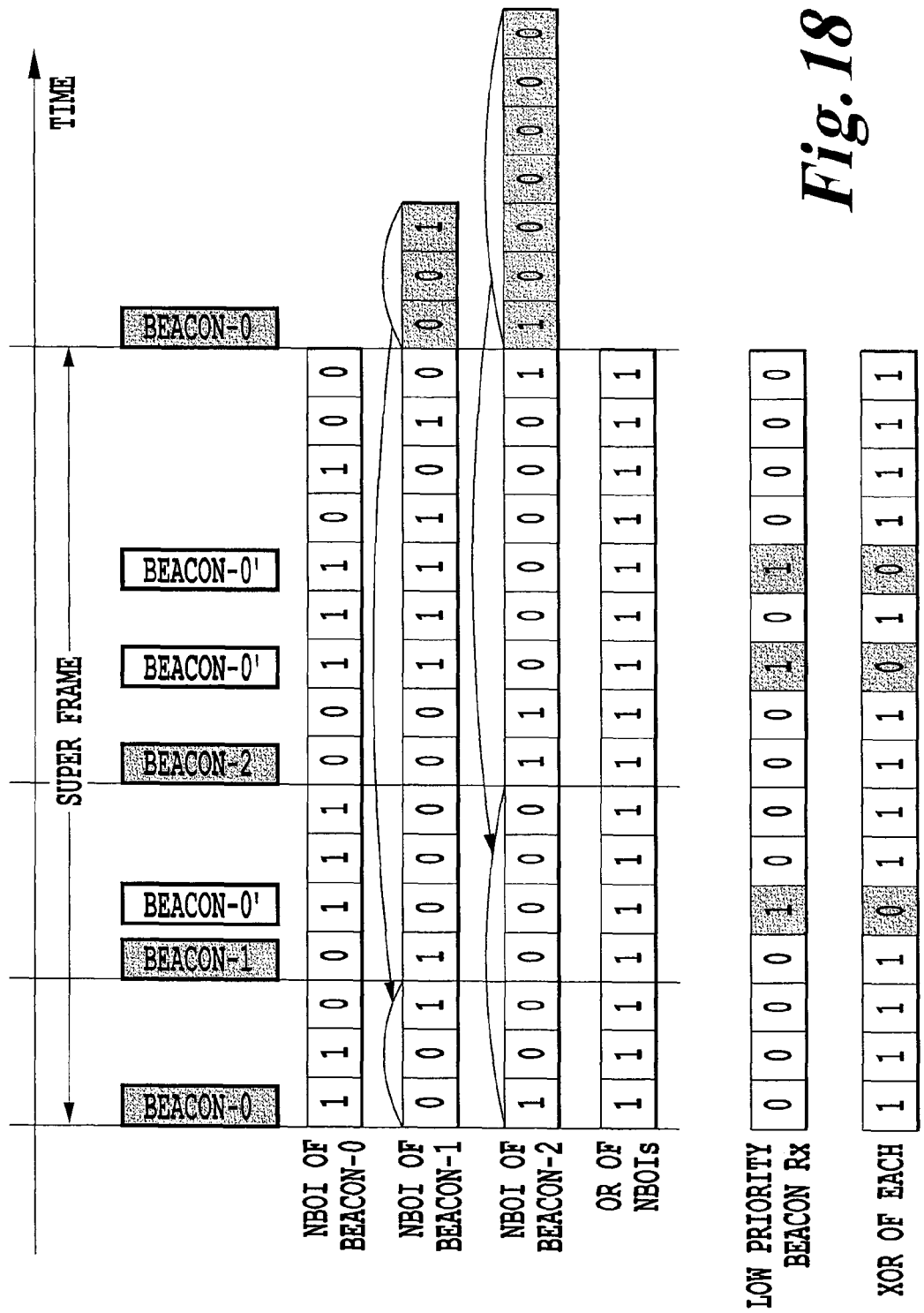
FIG. 18 is a diagram for describing the procedures for searching the beacons with TBTTs placed within a super frame for those with low order of preference, and setting TBTTs for the local station.

FIG. 18 illustrates the procedures for searching for the beacon with the lowest order of preference from the beacons with TBTTs placed in the super frame, and setting a TBTT for the beacon of the local station. Now, the TBTTs of the beacons which the nearby stations set are recognized by referencing the NBOI field described in each beacon. Also, the priority of the beacon is described in the TYPE field of the beacon.

The example shown in FIG. 18, is described from the perspective of a communication station A which desires to newly transmit traffic with higher order of preference, with a communication environment wherein nearby the communication station A are a communication station 0, communication station 1, and communication station 2. Let us say that the communication station A is capable of receiving beacons from the three stations 0 through 2 within a super frame.

The beacon reception points-in-time of the nearby stations are described as relative positions to the normal beacon of the local station in the NBOI field in bitmap format (described above). At the communication station A, the NBOI fields of the three beacons received from the nearby stations are shifted according to the reception point-in-time of the beacons so as to match the corresponding position of bits on the time axis, and the OR is obtained of the NBOI bits for each timing for reference.

The sequence obtained as a result of integrating and referencing the NBOI files of the nearby stations is indicated by "OR of NBOIs" in FIG. 16. 1 indicates the relative position of a timing regarding which a TBTT has already been set in the super frame, and 0 indicates the relative position of a timing regarding which a TBTT not yet been set. In the example shown in the drawing, the sequence is "1111,1111,1111,1111", i.e., all timings in the super frame have been marked, indicating that there are no more available TBTTs.

In such a case, the communication station A makes reference to the TYPE fields in the beacons received within the super frame, and obtains the priority of the traffic of each. The communication station finds beacons to which a priority lower than the order of preference of the traffic which it is attempting to transmit is set, and clears the bit in the "OR of NBOI" corresponding to the reception point-in-time of such a low-priority beacon.

With the example shown in FIG. 18, let us say that the TYPE of Beacon-0' has been set to a low order of preference. In this case, an Exclusive OR XOR is taken between the "Low Priority Beacon Rx" where the bit position corresponding to the beacon transmission timing for the low order of preference beacon is set to 1 and the "OR of NBOIs", and the 5th bit, 10th bit, and 12th bit, corresponding to the point-in-time where the beacon-0' is received in the "OR of NBOIs", are cleared. Consequently, the sequence indicated by "XOR of Each" in the drawing is taken to be the NBOI tally, and is taken as beacon transmission point-in-time candidates for the communication station A. Subsequently, the communication station A can find an available TBTT according to the procedures described above with reference to FIG. 9, and set the TBTT for the new beacon.

As described above, performing processing procedures for eliminating a beacon with low order of preference from the NBOI and setting a TBTT for a new beacon for the local station means that the local station is setting the same TBTT as another station, and accordingly beacon collision temporarily occurs. However, response is made to the collision within the system to avoid collision, and accordingly the TBTT changing processing shown in FIG. 13 and FIG. 16 occur. Consequently, TBTT changing processing is executed for low-priority beacons, and low-priority beacons are gradually eliminated from the system.

Figure 19:
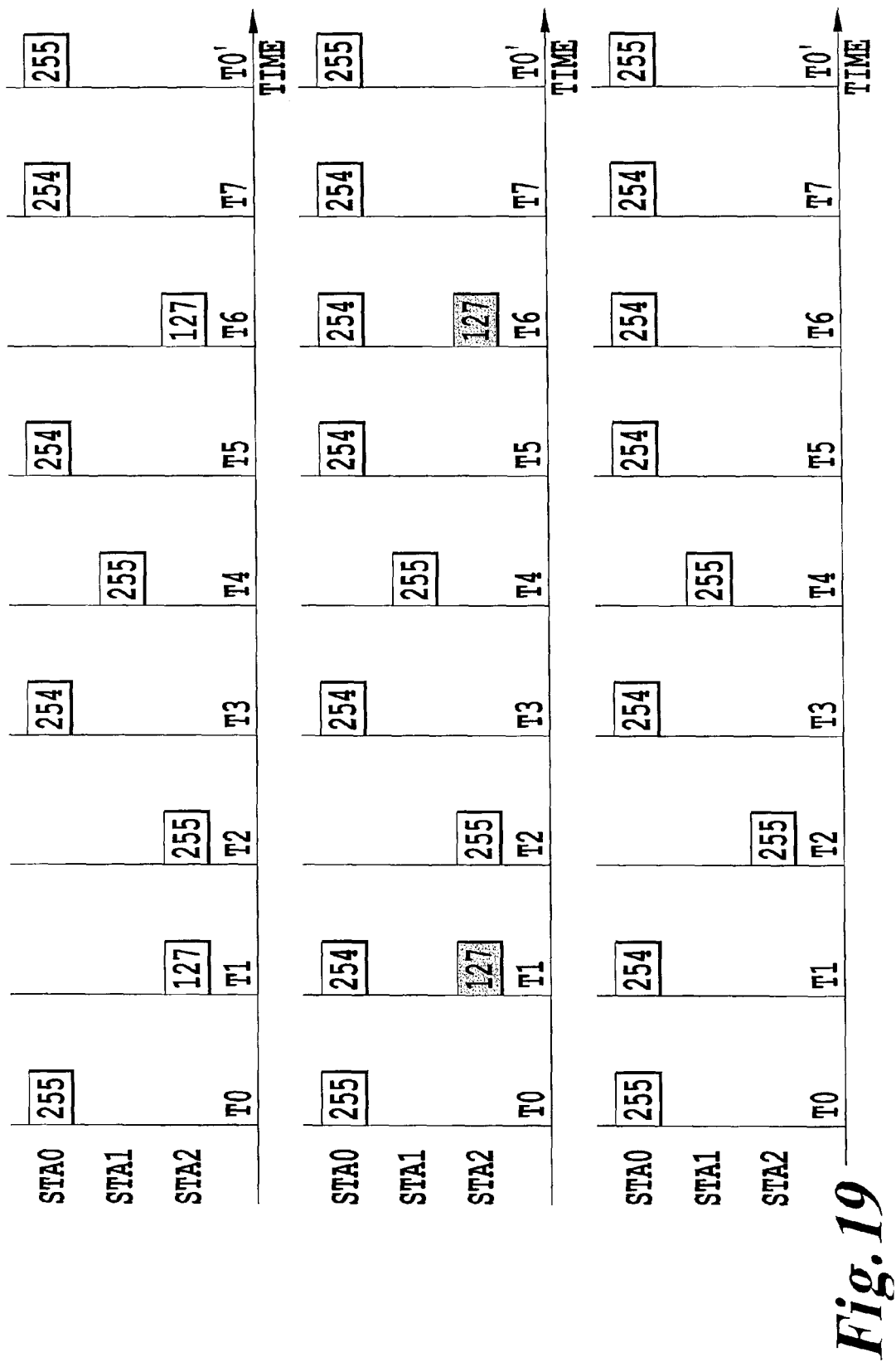
FIG. 19 is a diagram illustrating the manner in which a communication station eliminates low order of preference beacons of other stations in a state wherein the super frame is full of beacons with TBTTs already set, and sets a new TBTT.

FIG. 19 illustrates the way in which the communication station eliminates beacons of other stations with low order of preference and sets a new TBTT, in a state wherein the super frame is already full of beacons for which TBTTs have been set. In the drawing, from point-in-time T0 to point-in-time T0' represents one super frame, and the upper tier, middle tier, and lower tier illustrate the time-sequence transmission of the beacons over three super frames. Note that three communication stations, the STA0, the STA1, and the STA2 exist here, with at least the STA0 and the STA2 being within the range of reach of airwaves so as to have a communication environment wherein signals can be directly transmitted and received therebetween.

With the state shown at the upper tier in FIG. 19, the STA2 transmits in the super frame a normal beacon (TYPE=255) and two auxiliary beacons with order of preference (TYPE=) 127. Also, the STA0 transmits in the super frame a normal beacon (TYPE=255) and three auxiliary beacons with order of preference (TYPE=) 254. The TBTT timings within the super frame are all occupied, and there are no available time spans.

Under such a situation, in the event that the STA0 wants to additionally transmit two auxiliary beacons, the STA0 first performs a scanning operation (not shown), and finds the auxiliary beacons transmitted by the STA2 with the order of preference 127, as beacons having lower order of preference than the beacons regarding which TBTTs are to be set by the local station. Then, the Exclusive OR XOR of the "Low Priority Beacon Rx) and "OR of NBOIs" is taken according to the procedures described with reference to FIG. 18, and the NBOI invalidates the transmission timings of the auxiliary beacons from the STA2 and handles these as available TBTTs. Further, the STA0 determines to transmit auxiliary beacons with an order of preference of 254 at point-in-time T1 and point-in-time T6 corresponding to the invalidated TBTT timings.

The middle tier in FIG. 19 illustrates the way in which the beacons of the STA0 and the STA2 are colliding, due to the STA0 transmitting the auxiliary beacons at point-in-time T1 and point-in-time T6. At this time, the STA0 and the STA2 perform processing following TBTT changing procedures shown in FIG. 13 or FIG. 16. Consequently, the STA2 which is transmitting auxiliary beacons with low order of preference starts the TBTT changing processing.

The STA2 performs a scanning operation to set TBTTs for the two auxiliary beacons having the order of preference of 127, and searches for available time within the super frame (not shown), but no available time is found (or no auxiliary beacons with a lower order of preference are found), so the STA2 abandons transmitting of the auxiliary beacons. Accordingly, the situation settles down to that shown in the bottom tier in FIG. 19.

Repeating the above-described operations wherein the TBTTs of beacons with low order of preference are eliminated from the super frame and TBTTs of beacons with high order of preference are set enables resources for high priority to be ensured.

Now, the example described here is a case of containing newly-generated high priority traffic, with high-priority traffic seizing the resources of low-priority traffic. There may be cases wherein a policy is instead wherein TPPs already being serviced are given preference, regardless of how high or low the priority is. In such cases, the above processing for seizing low-priority TPPs is not activated, but in the event that a traffic group already being serviced falls into a collision state due to moving of a communication station, there may be cases wherein one of the TPPs already being serviced must be eliminated. In such a case as well, high-priority traffic can be preferentially utilized by applying procedures the same as those described above.

H. Setting TBTT of Auxiliary Beacons Based on Priority (Remote Operations)

According to the procedures described in Section G above, in the event that a communication station which transmits low-priority traffic exists nearby the communication station A which desires to set a TBTT for a beacon anew, the advantage can be obtained that resources for high priority can be secured.

On the other hand, in the event that there are no communication stations which transmit low-priority traffic nearby the communication station A, and in the event that only communication stations which receive low-priority traffic exist, the same cannot be eliminated. The reason is that mutual beacon reception cannot be made with hidden terminals, and even in the event that the communication station A invalidates the low-priority traffic in the NBOI of the local station, this does not reach the hidden terminal side, so TBTT changing procedures such as shown in FIG. 13 and FIG. 16 cannot be directly activated.

Accordingly, in the event that the beacon transmission point-in-time still cannot be found even with the means described with FIG. 18, the communication station which desires setting of a TBTT for a new beacon has a nearby station to search for whether or not there is a communication station transmitting low-priority traffic, and request stopping of the transmission, thereby performing "remote operations" of the hidden terminal.

Figure 20:
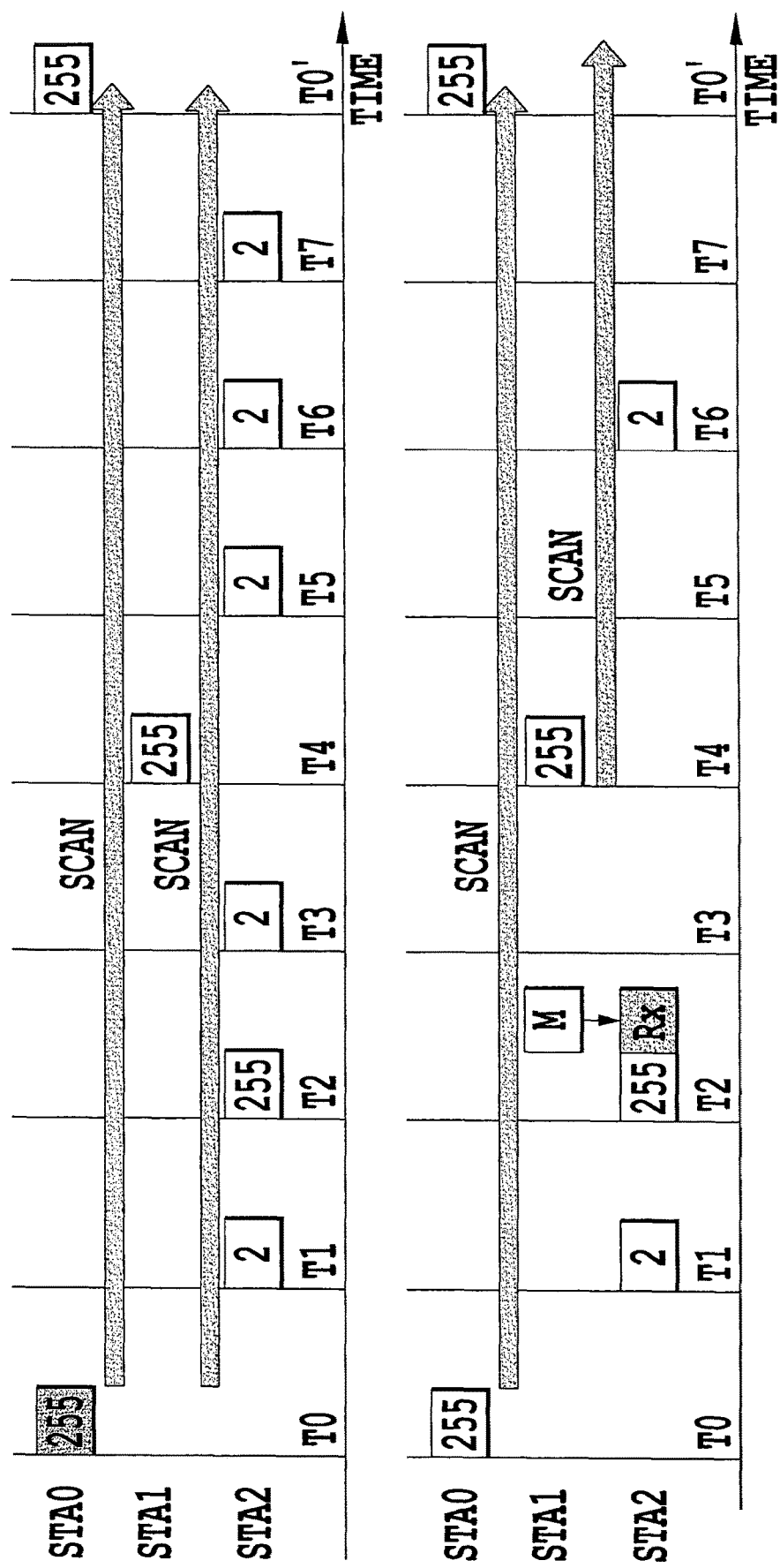
FIG. 20 is a diagram illustrating the manner in which a communication station which desires to set a TBTT for a new beacon stops beacon transmission by remote operations via nearby stations, and sets TBTTs for itself.
Figure 21:
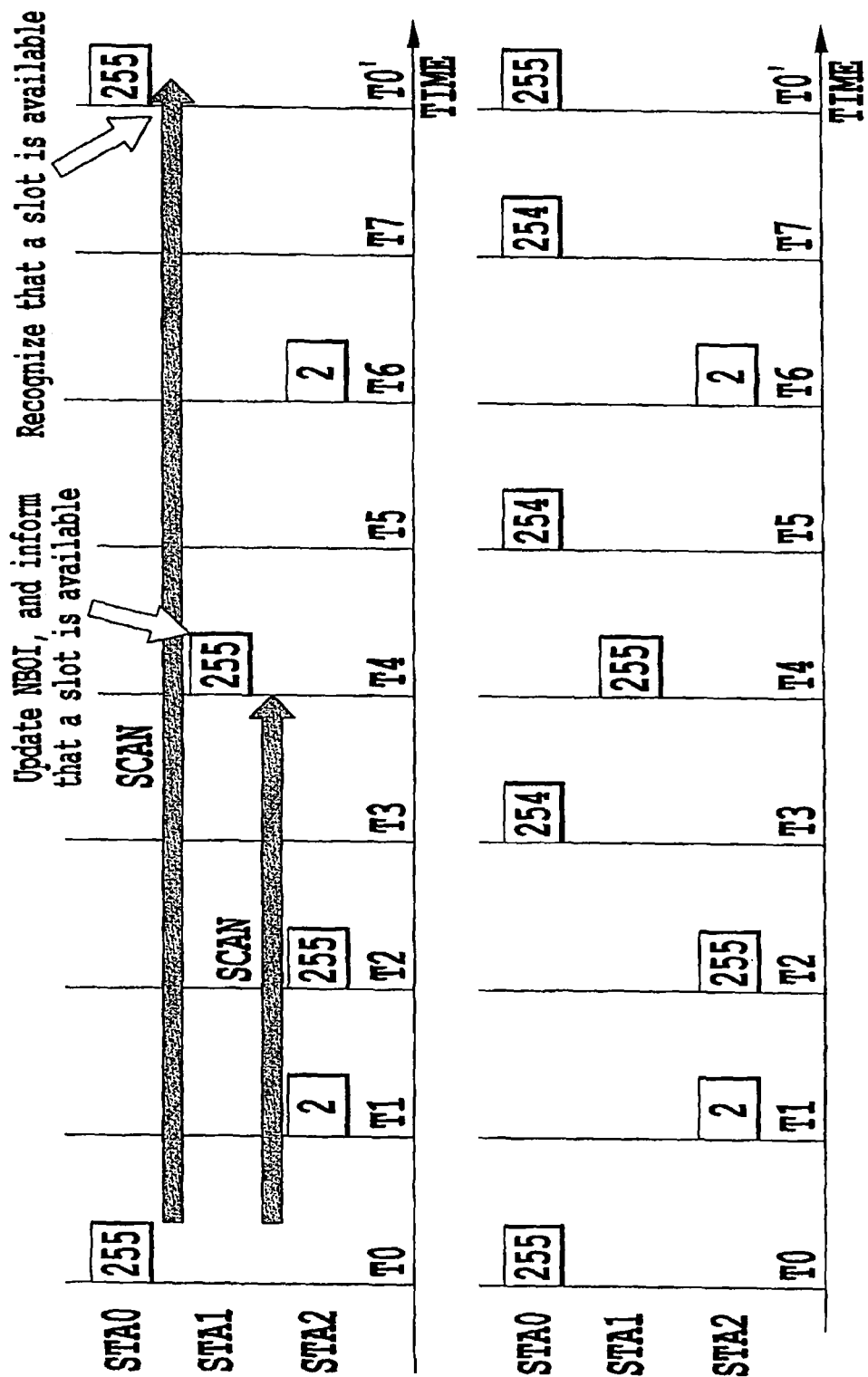
FIG. 21 is a diagram illustrating the manner in which a communication station which desires to set a TBTT for a new beacon stops beacon transmission by remote operations via nearby stations, and sets TBTTs for itself.
Figure 25:
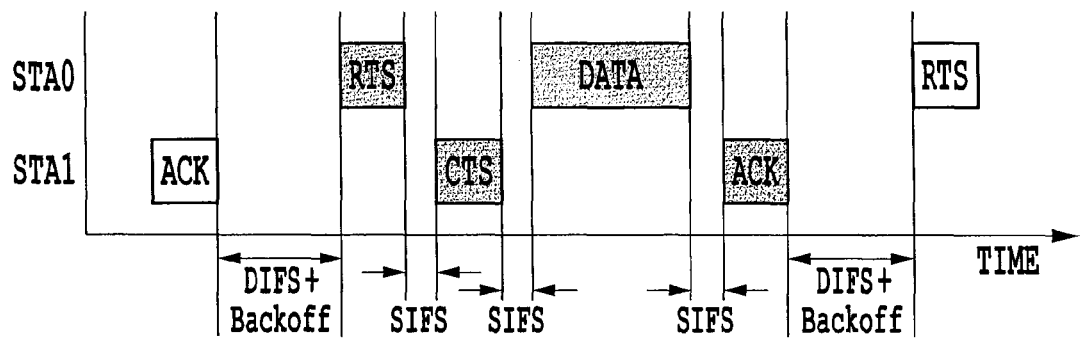
FIG. 25 is a chart illustrating an example of access operations by RTS/CTS procedures.
Figure 26:
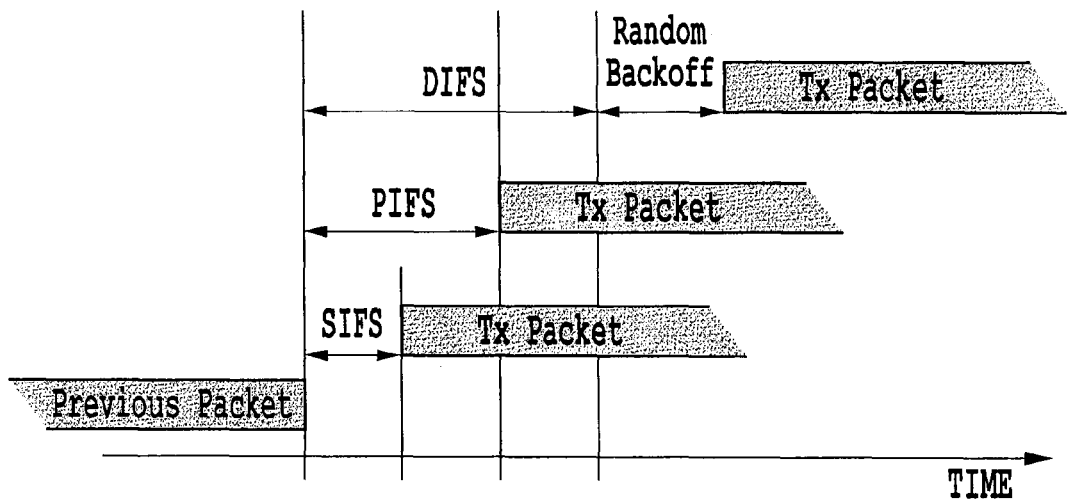
FIG. 26 is a diagram illustrating packet interval IFS defined in IEEE 802.11.
Figure 27:
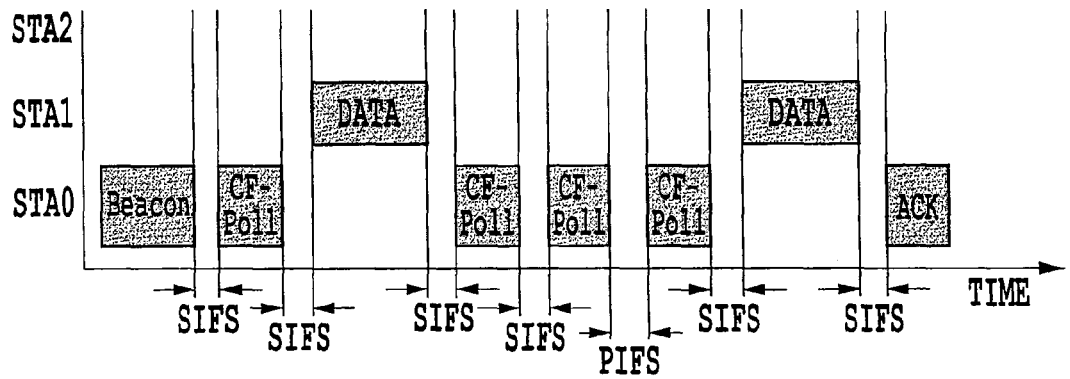
FIG. 27 is a diagram for describing PCF (Point Coordination Function) operations.
Figure 28:
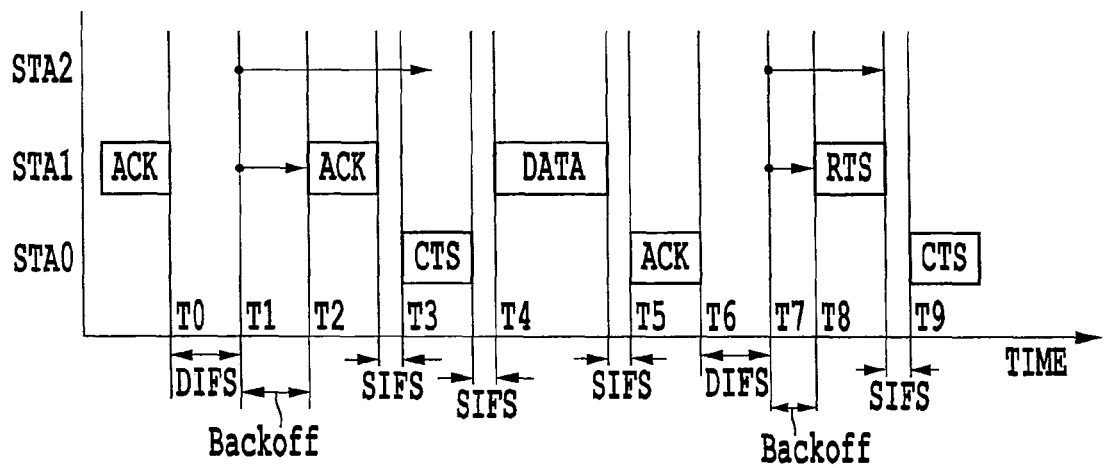
FIG. 28 is a diagram illustrating the way in which preferential transmission is provided to band-ensured traffic by EDCF operations.

FIG. 20 and FIG. 21 illustrate the way in which a communication station which desires setting of a TBTT for a new beacon stops transmission of beacons by remote operations via a nearby station, and sets a TBTT for a local station beacon. In the drawing, from point-in-time T0 to point-in-time T0' represents one super frame, showing the sequence transition of beacon transmission over four super frames. Also, a communication environment is assumed here wherein three communication stations, the STA0, the STA1, and the STA2 exist, with at least the STA0 and the STA2 being out of the range of reach of airwaves, so that transmission and reception of signals cannot be directly performed.

In the state shown at the top tier in FIG. 20, the STA2 is transmitting a normal beacon (TYPE=255) and five auxiliary beacons with an order of preference of (TYPE=) 2 within the super frame. Also, the STA0 and the STA1 are each only transmitting normal beacons (TYPE=255) in the super frame. Thus, the TBTT timings within the super frame are all occupied.

Now, at point-in-time T0, the STA0 desires to transmit three auxiliary beacons for transmitting traffic with an order of preference of 254, but recognizes that the TBTT timings within the super frame are all occupied. Further, even though the STA0 attempts to activate procedures for eliminating the low-priority traffic shown in FIG. 18, the auxiliary beacon transmission timing cannot be found. Accordingly, the STA0 describes information to the effect that "I want to transmit three beacons with an order of preference of 254" in the ALERT field of the normal beacon transmitted at point-in-time T0, and notifies this to surrounding stations. The beacon in which such information is described in the ALERT field is equivalent to a remote beacon stopping request to surrounding stations. Also, following notification of the beacon stop request with the ALERT, the STA0 goes into a scan state for a while, to search for whether or not available slots can be created by remote operations with nearby stations.

Note that the ALERT field is a field for storing information to be transmitted to the nearby stations in an abnormal situation. In the above descriptions the ALERT field is used for describing information to be notified to the nearby stations that the local station is going to change a TBTT. Here, the ALERT field has multiple definitions for notifying multiple abnormal states. FIG. 22 schematically illustrates the configuration of the ALERT field in this case. As shown in the drawing, the ALERT field is sectioned into a type field which indicates the type of definition, and the main field for describing the abnormal state. In the event that the type is changing of the TBTT of the local station, information relating to the TBTT changing is described in the main field. Also, in the event of the type of a remote operation, the order of preference of the beacons which the local station wants to set and the number of beacons are described in the main field.

Upon receiving the beacon with information to the effect that "I want to transmit three beacons with an order of preference of 254" described in the ALERT field, the STA1 performs a scanning operation for at least one super frame, in order to confirm whether or not there are beacons having an order of preference below 254 being transmitted nearby. Simultaneous with completion of the scan, the STA1 recognizes that the STA2 is transmitting five auxiliary beacons with a lower order of preference of 2 in the super frame.

Next, as shown at the bottom tier in FIG. 20, the STA1 transmits a beacon stop request message M to the STA2 to the effect that "I want you to temporarily stop transmission of three beacons with an order of preference lower than the order of preference of 254". During this while, the STA0 remains in a scanning state to search for whether or not available slots can be created by remote operations with nearby stations.

In response to reception of the beacon stop request message M, the STA2 stops transmission of the three auxiliary beacons transmitted at point-in-time T3, point-in-time T5, and point-in-time T7, of the auxiliary beacons with an order of preference of 2 that are being currently transmitted.

Next, at the top tier in FIG. 21, the STA1 performs a scanning operation for at least one frame, thereby detecting that point-in-time T3, point-in-time T5, and point-in-time T7, are available. Or, the fact that point-in-time T3, point-in-time T5, and point-in-time T7, are available, is notified by the NBOI of a beacon transmitted by the STA2 or other nearby stations. Note that during this while, the STA0 remains in a scanning state to search for whether or not available slots can be created by remote operations with nearby stations.

Next, at the bottom tier in FIG. 21, the STA0 makes reference to the NBOI of the beacon received from the STA1 or another nearby station, and upon recognizing that point-in-time T3, point-in-time T5, and point-in-time T7, are available, sets the TBTTs for the auxiliary beacons each having order of preference of 254 at these timings, and starts beacon transmission.

On the other hand, after stopping beacon transmission temporarily, the STA2 searches for available TBTTs within the super frame to attempt auxiliary beacon transmission with an order of preference of 2 again. However, the STA0 is already occupying these time spans with beacons having a higher order of preference, so no available points-in-time can be found, and auxiliary beacon transmission is abandoned.

Thus, performing remote operations for setting TBTTs for beacons with higher order of preference by eliminating beacons with lower order of preference in the super frame enables resources to be secured for high priority.

Note that a communication station, which has received information to the effect that "I want to transmit a beacon with an order of preference of XX" described in the ALERT field, performs beacon stopping processing by the above-described remote operations, and also temporarily stops transmission processing of auxiliary beacons of itself lower than the order of preference of XX indicated.

INDUSTRIAL APPLICABILITY

The present invention has been described in detail with reference to particular embodiments. However, it is self-evident that one skilled in the art can be various modifications and substitutions to the embodiments without departing from the essence of the present invention.

With the present specification, in an autonomously-dispersed wireless network, the present invention has been described with primary embodiments in application to a communication environment wherein communication stations each notify each other with beacons at predetermined frame cycles, but the essence of the present invention is not restricted to this.

For example, the present invention can be similarly applied to a communication system of another arrangement wherein beacons are transmitted from multiple communication stations within communication range, or to a communication system of another arrangement wherein each communication station operates in predetermined tame interval increments, so as to perform signal processing by periodically setting bands using reservation or preferentially, for each of the time intervals.

In conclusion, the present invention has been disclosed in the form of examples, and the descriptions in the present specification are not to be interpreted restrictively. The Claims should be referenced to determine the essence of the present invention.

REFERENCE NUMERALS 100 wireless communication device
101 interface
102 data buffer
103 central control unit
104 beacon generating unit
106 wireless transmission unit
107 timing control unit
109 antenna
110 wireless reception unit
112 beacon analyzing unit
113 information storage unit

The invention claimed is:

1. A wireless communication device for operating with a first wireless communication device and a second wireless communication device, the wireless communication device comprising:
　circuitry configured to
　　generate a first signal that indicates first time information relating to the wireless communication device;
　　based on a timing set by the circuitry, transmit the first signal to the first wireless communication device, the first wireless communication device and a second wireless communication device being in power saving states prior to transmission of the first signal;
　　receive a second signal, from the first wireless communication device, that indicates second time information relating to the first wireless communication device;
　　receive a third signal, from the second wireless communication device, that indicates third time information relating to the second wireless communication device;
　　analyze the second time information relating to the first wireless communication device and the third time information relating to the second wireless communication device; and
　　schedule transmission of a fourth signal by the wireless communication device according to a signal timing determined based on the second time information relating to the first wireless communication device and the third time information relating to the second wireless communication device.

2. The wireless communication device of claim 1, wherein the circuitry notifies the first wireless communication device prior to scheduling the transmission or reception signal timing using a time interval allocated for a signal of the wireless communication device.

3. A wireless communications method for a wireless communication device that operates with a first wireless communication device and a second wireless communication device, the wireless communication method comprising:
　generating a first signal that indicates first time information relating to the wireless communication device;
　based on a timing set by the wireless communication device, transmitting the first signal to the first wireless communication device, the first wireless communication device and a second wireless communication device being in power saving states prior to transmission of the first signal;
　receiving a second signal, from the first wireless communication device, that indicates second time information relating to the first wireless communication device;
　receiving a third signal, from the second wireless communication device, that indicates third time information relating to the second wireless communication device
　analyzing, by circuitry of the wireless communication device, the second time information relating to the first wireless communication device and the third time information relating to the second wireless communication device; and
　scheduling transmission of a fourth signal by the wireless communication device according to a signal timing determined based on the second time information relating to the first wireless communication device and the third time information relating to the second wireless communication device.

4. The method of claim 3, further comprising:
　notifying the first wireless communication device prior to scheduling the transmission or reception signal timing using a time interval allocated for a signal of the wireless communication device.

5. A wireless communication system, comprising:
a first wireless communication device; and
a second wireless communication device, wherein
the first wireless communication device includes circuitry configured to
　generate a first signal that indicates first time information relating to the first wireless communication device,
　based on a timing set by the first wireless communication device, transmit the first signal to the second wireless communication device, the second wireless communication device and a third wireless communication device being in power saving states prior to transmission of the first signal, receive a second signal, from the second wireless communication device, that indicates second time information relating to the second wireless communication device, receive a third signal, from the third wireless communication device, that indicates third time information relating to the third wireless communication device, analyze the second time information relating to the second wireless communication device and the third time information relating to the third wireless communication device, and schedule transmission of a fourth signal by the first wireless communication device according to a signal timing determined based on the second time information relating to the second wireless communication device and the third time information relating to the third wireless communication device.

6. The system of claim 5, wherein the circuitry notifies the second wireless communication device prior to scheduling the transmission or reception signal timing using a time interval allocated for a signal of the first wireless communication device.

* * * * *